US008949284B2

United States Patent
Zink et al.

(10) Patent No.: US 8,949,284 B2
(45) Date of Patent: Feb. 3, 2015

(54) INFORMATION POINT

(75) Inventors: Alexander Zink, Stegaurach (DE);
Fetim Fazlija, Bamberg (DE);
Negjmedin Fazlija, Bamberg (DE); Olaf Korte, Igensdorf (DE)

(73) Assignee: Fraunhofer-Gesellschaft zur Foerderung der Angewandten Forschung E.V., Munich (DE)

( * ) Notice: Subject to any disclaimer, the term of this patent is extended or adjusted under 35 U.S.C. 154(b) by 2178 days.

(21) Appl. No.: 11/724,993

(22) Filed: Mar. 16, 2007

(65) Prior Publication Data
US 2007/0288511 A1 Dec. 13, 2007

Related U.S. Application Data

(63) Continuation of application No. PCT/EP2005/009616, filed on Sep. 7, 2005.

(30) Foreign Application Priority Data

Sep. 16, 2004 (DE) .................. 10 2004 045 010

(51) Int. Cl.
*G06F 17/30* (2006.01)
*G01C 21/36* (2006.01)
*G01C 21/20* (2006.01)

(52) U.S. Cl.
CPC ...... *G06F 17/30864* (2013.01); *G01C 21/3682* (2013.01); *G01C 21/20* (2013.01)
USPC ............................ 707/803; 707/604; 707/822

(58) Field of Classification Search
CPC . G01C 21/20; G01C 21/3682; G06F 17/3087
USPC ................. 707/102, 604, 803, 822; 701/202; 705/59
See application file for complete search history.

(56) References Cited

U.S. PATENT DOCUMENTS

| | | | | |
|---|---|---|---|---|
| 6,070,176 A | * | 5/2000 | Downs et al. | ................. 715/234 |
| 6,247,019 B1 | | 6/2001 | Davies | |
| 6,321,158 B1 | * | 11/2001 | DeLorme et al. | ............ 701/201 |
| 6,385,541 B1 | | 5/2002 | Blumberg et al. | |

(Continued)

FOREIGN PATENT DOCUMENTS

| | | |
|---|---|---|
| DE | 19841169 | 3/2000 |
| EP | 1156464 | 11/2001 |

(Continued)

OTHER PUBLICATIONS

Utopia on the sidewalk, PD Smith, Jun. 16, 2008, pp. 1-9.*
Roebke-Doerr, Peter "Ditigal Walk—Walkers' maps on pocket PCs." Magazine fur Computer und Techni, Fubmarsch digital. Heise 13/2004.

(Continued)

*Primary Examiner* — Shahid Alam
(74) *Attorney, Agent, or Firm* — Michael A. Glenn; Perkins Coie LLP

(57) ABSTRACT

Information point having a provider for providing a data structure having entries about different objects, wherein a limited geographical area is associated to every object, and wherein object information is associated to every object, a determiner for determining a geographical position of the information point, an examiner for examining whether the geographical position of the information point lies in the geographical area associated to an object, and a provider for providing object information associated to an object, if the examiner has determined that the information point lies in the geographical area of the object.

14 Claims, 46 Drawing Sheets

(56) References Cited

U.S. PATENT DOCUMENTS

| | | | |
|---|---|---|---|
| 6,950,828 B2* | 9/2005 | Shaw et al. | 707/103 R |
| 7,257,236 B2* | 8/2007 | Yukhin et al. | 382/103 |
| 7,292,250 B2* | 11/2007 | Sepulveda | 345/473 |
| 2002/0052674 A1 | 5/2002 | Chang | |
| 2003/0036848 A1 | 2/2003 | Sheha | |
| 2004/0148277 A1 | 7/2004 | Gray | |
| 2004/0267444 A1* | 12/2004 | Coatantiec et al. | 701/202 |
| 2005/0041324 A1* | 2/2005 | Tateishi et al. | 360/77.12 |
| 2005/0280657 A1* | 12/2005 | Hori et al. | 345/619 |
| 2007/0027903 A1* | 2/2007 | Evans et al. | 707/102 |
| 2009/0281950 A1* | 11/2009 | Iga | 705/59 |

FOREIGN PATENT DOCUMENTS

| | | |
|---|---|---|
| EP | 0985906 | 12/2004 |
| EP | 0672890 | 9/2005 |
| WO | WO0195152 | 12/2001 |
| WO | WO03081463 | 10/2003 |

OTHER PUBLICATIONS

Nuria, Juan L. "Specification, implementation and evaluation of an auto-adaptive dynamic parameterization mechanism for a universal mobile information system." Friedrich-Alexander University Erlangen-Nuernberg, Aug. 2002.

* cited by examiner

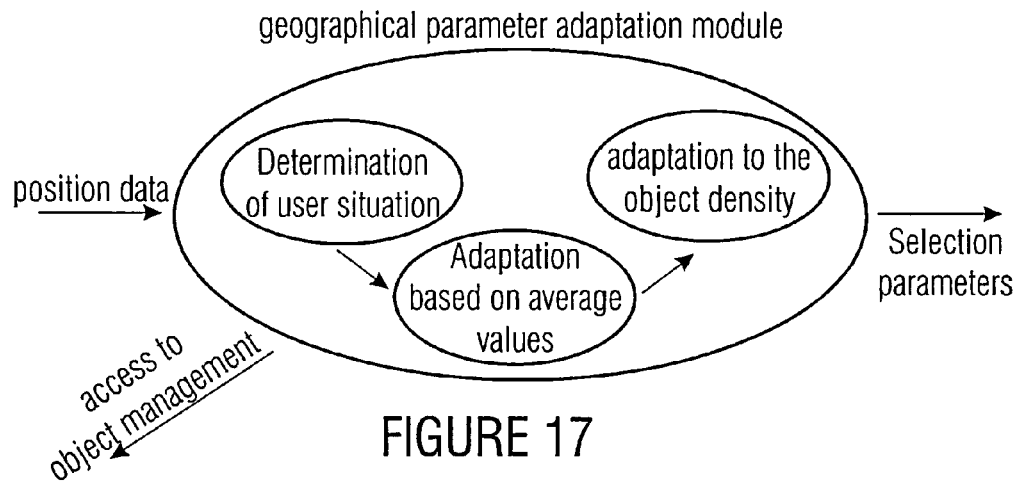
FIGURE 17
| | average speed $\bar{V}\,[\frac{km}{h}]$ | stop duration $D\,[\%]$ | number of stops $N$ |
|---|---|---|---|
| City | $0 \leq \bar{V} \leq 35$ | $10 \leq D$ | $3 \leq N$ |
| Road | $35 \leq \bar{V} \leq 80$ | $0 \leq D \leq 10$ | $0 \leq N \leq 3$ |
| Motorway | $80 \leq \bar{V}$ | 0 | 0 |
FIGURE 18
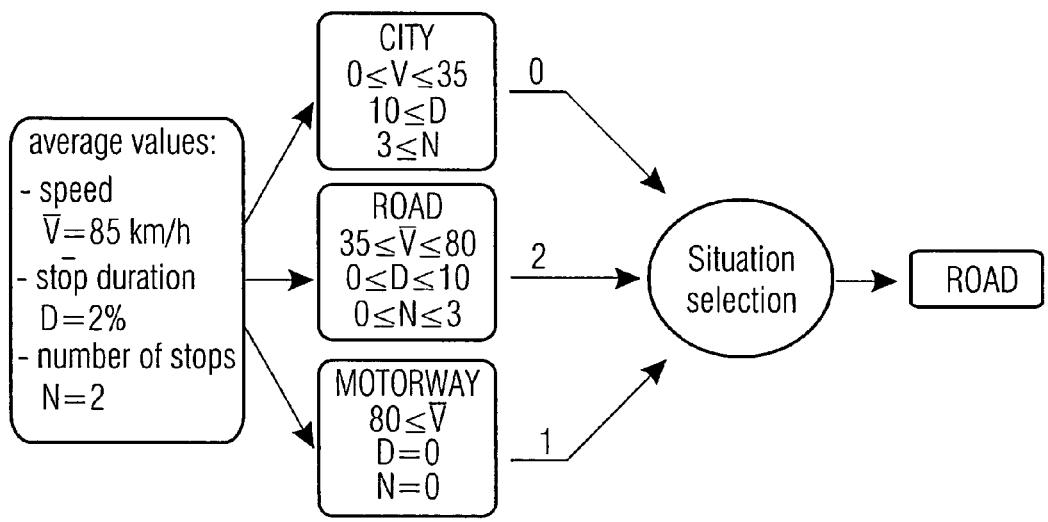
FIGURE 19

```
Category      = building\nchurch\nbarock
Position      = (49*48'49"N;11*13'19"E)
Situation     = city, walking
Importance    = 100
MaxReptitions = 1
```

| | average speed $\bar{V}\left[\frac{km}{h}\right]$ |
|---|---|
| city | $0 \leq \bar{V} \leq 35$ |
| road | $35 \leq \bar{V} \leq 80$ |
| motorway | $80 \leq \bar{V}$ |

FIGURE 69

INFORMATION POINT

CROSS-REFERENCE TO RELATED APPLICATIONS

This application is a continuation of copending International Application No. PCT/EP2005/009616, filed Sep. 7, 2005, which designated the United States and was not published in English.

TECHNICAL FIELD

The present invention relates to the field of information technology, particularly to the field of providing information.

BACKGROUND

For displaying information about objects, for example buildings, located in the surroundings, mobile information terminals can be used, for example PDAs (PDA=personal digital assistant) having information about the objects stored therein. Thereby, the information is displayed in dependence on a position (location) of a user of the mobile terminal.

Existing location-based information systems mainly consider the geographical location of the user for selecting information objects, or for geographically weighting the relevance of an information object, respectively, for example a historical building. For this purpose, in many cases, these information objects include apart from further non-location related parameters merely the geographical coordination of the location and the information to be actually displayed.

The geographical description of the information objects by the mere indication of the location does not allow, however, the consideration of a specific condition and the geographical surroundings of the different types of information. During selection, all information objects are treated the same according to geographical aspects, because at the time of selection merely their geographical position is known.

SUMMARY

According to an embodiment, an information point may have a means for providing a data structure having entries about different objects, wherein a limited geographical area is associated to every object, and wherein object information is associated to every object, and wherein the limited geographical area defines a relevance area, in which the information point has to be so that the object information to which the relevance area belongs can be selected; a means for determining a geographical position of the information point; a means for examining whether the geographical position of the information point lies in the geographical area associated to an object; and a means for providing object information associated to an object, if the means for examining has determined that the information point lies in the geographical area of the object.

According to another embodiment, a method for information selection may have the steps of: providing a data structure having entries about different objects, wherein a limited geographical area is associated to every object, and wherein object information is associated to every object, and wherein the limited geographical area defines a relevance area, in which the information point has to be so that the object information to which the relevance area belongs can be selected; determining a geographical position of an information point; examining whether the geographical position of the information point lies in the geographical area associated to an object; and providing object information associated to an object if it has been determined that the information point lies in the geographical area of the object.

According to another embodiment, the present invention provides a computer program for performing the above-mentioned method when the computer program runs on a computer.

The present invention is based on the knowledge that the selection of information about objects can be performed in an efficient way, when object-related relevance areas are associated to the objects, and when the information associated to the objects is linked to the relevance areas.

According to one aspect, the present invention provides an information point comprising a means for providing a data structure having entries about different objects, wherein a limited geographical area is associated to every object, and wherein object information is associated to every object, a means for determining a geographical position of the information point, a means for examining whether the geographical position of the information point lies in the geographical area associated to an object, and a means for providing, e.g. displaying, object information associated to an object, if the means for examining has determined that the information point lies in the geographical area of the object.

According to the invention, the information point can be an information terminal, which can, for example, be set up in the surroundings, a mobile information terminal used by a user, or a surroundings reference point with regard to which the information is to be displayed.

The means for providing object information can, for example, comprise a means for displaying object information, e.g. a screen.

According to a further aspect, the means for providing object information can comprise an interface for outputting object information, to which, for example, a means for displaying can be coupled for displaying the object information.

According to a further aspect, the means for providing object information can be a means for displaying object information.

If the information point is a mobile information terminal, the means for displaying can be part of the mobile information terminal, e.g. in the form of a screen.

However, the means for displaying object information can be spaced apart from the information point and be located, for example, at a different location. In this case, the means for providing the object information can comprise a transmission unit for transmitting information. In this case, the information point can further comprise a receive unit for receiving control commands.

The geographical position of the information point can be a real or virtual position. If the geographical position is a real geographical position, it is determined by the actual position of the information point in the real surroundings. In this case, a user can be supplied with information on location.

However, if the geographical position is a virtual position, the same is, for example, determined by a selection of a surroundings point, for example in a map of the surroundings. In this case, a user can be supplied with information independent of the position of the user in the surroundings.

For every object, e.g. for every historical building in the city, a geographical object area can be assigned, which can depend, for example, on the position of the other objects as well as their object areas.

Since an object area is limited, the object-related information can be displayed to a user after entering the object area. With decreasing distance to the object or in dependence on a speed of the user, different information about the object can be displayed, which are associated for example, to certain subareas of the object area.

Contrary to known geographical descriptions of information objects, which do not allow the definition of an individual and flexible geographical relevance area for an individual information object, according to the invention, the geographical relevance areas associated to the objects are linked to information about the objects, so that a flexible and user-specified information selection is allowed.

Conventional location-based information systems can, for example, not ensure that an information object, such as a building, is actually visible for the user at the selection time. For a specific display, considering the immediate surroundings, the visibility range and the spatial dimensions of the information object would be required.

The concept of object-related relevance areas allows the definition of a geographical area for every information object, from which the information object can be selected.

The object-related relevance areas allow, for example, the definition of different distance selections for an information object.

Through the object-related relevance areas, geographical areas, in which an information object is visible for the user at the time of the potential selection, can be specifically defined.

Further, by appropriate definition of an object-related relevance area, the selection of an information object can be limited to certain moving directions of the user.

Information objects that themselves have no geographical position ('unpositioned information objects'), but are only relevant for a well-defined geographical region, can be specifically determined to a potential selection from only this region by indicating an object-related relevance area.

The object of the invention is a method for information selection with the help of using object-related relevance areas. An object-related relevance area defines the geographical area, in which a reference point (e.g. the current user position) has to be, such that the information object to which the relevance area belongs can be selected or displayed, respectively. The definition of such an area is made by an unlimited number of arbitrary geometrical forms. For example, polygons, circles, angles and segments of a circle can be used as geometrical basic forms.

Above that, the geometrical forms can be possibly linked in an arbitrary way by a Boolean expression, to allow a detailed description of an object-dependent relevance area.

The selectable information can be stored in the form of independent information objects. An information object consists of the actual information to be displayed and of object-specific parameters (metadata). These parameters contain no, one or several geographical positions. These geographical positions can be the geo-referenced positions of an information object or any geographical positions belonging to an information object. Further, a specific relevance area can be defined for every location or position.

Additionally, there can be no position indication at all or the same can explicitly determine by a certain "position value" that this is an "unpositioned information object". In this case, the selection of this information object does not depend on its location, but on possible further selection criteria.

Primarily, in many cases, the geographical position of the user is relevant in the selection of an information object.

However, if an object-related relevance area is defined for a certain position of an information object, the information belonging to this object can only be selected or displayed, respectively, when the user is within the object-related relevance area at the time of the selection decision.

If apart from the position the moving direction of the user is also evaluated, a direction-dependent selection of this information object can be performed with the help of an appropriate object-related relevance area.

If a certain position indication of the information object indicates the characteristic "unpositioned information object", a geographical limitation of the possible selection area can still be given by the mechanism of the object-related relevance areas.

In the selection method with object-related relevance areas, a location-related information system continuously evaluates a position indication (e.g. GPS coordinates or WLAN positioning system). The position indication defines the current reference point for subsequent selection processes (e.g. the current location of the user). Formatting the position indication is not relevant—it can, for example, be performed in geographical standard coordinates. Above that, further parameters, which are relevant for geographical selection, can be detected: for example the current moving direction and speed of the reference point (which means, for example, the user). These indications can be provided to the location-related information system by dedicated hardware (for example a GPS receiver), by cooperating software (for example a navigation system) or in another way.

The information objects available for a selection can, for example, be stored as independent information objects, can be present in the form of a databank, can be fetched online individually, etc.

Information objects having a defined object-related relevance area are only selected when the reference point (which means for example the user) is within this defined area at the selection time.

Thereby, the object-related relevance areas can be defined as absolute positioned areas or in relation to the position of the information object. The latter is particularly useful when an information object belongs to a plurality of positions at the same time (example: all Bavarian motorway service areas are presented to the user by a uniform announcement).

A Boolean expression, which defines a geographical relevance area by linking geographical basic forms, is evaluated for the evaluation. For example, the logic operators AND "&", OR "|" and NONE "!" can be used. During the evaluation, every element of the Boolean expression, which means the representation of every geographical basic form, can assume the values "true" or "false". "True" means that the reference point is within the area defined by these geometrical basic forms at the selection time; otherwise the element has the value "false".

An information object is only selected when the whole Boolean expression has the value "true", and the reference point (which means the user) is thus in the defined object-related relevance area of the information object at the selection time.

Apart from the "manual" definition of an object-related relevance area, the author of the information objects can limit their selection release to general situations, in which the user has to be in at the selection time, so that a selection of the respective information object can be performed. The location-related information system must be able to detect these situations.

For example, a set of situations could be defined, which are referred to by "motorway", "road", "city" and "pedestrian". The location-related information system can now determine in which situation the reference point (which means for example the user) is, and can thus make a fast coarse selection of all information objects available for the selection. The situation detection could be performed, for example, by evaluating the moving pattern of the reference point or by deposited correspondingly marked map material.

The mechanism of the object-related relevance areas allows the flexible and individual definition of a geographical area for every position indication of an information object, in which a reference point has to be, so that the selection of this information object is allowed. This possibility is not included in the existing location-based information systems according to the prior art.

The method can use standardized display formats for defining an object-related relevance area. If needed, the same operates exclusively with the geographical standard coordinate system for position indications, as well as length and angle indications. The accuracy is only limited by the external source providing the position indications.

The field of usage of the method is not limited. The same can be used outdoors as well as indoors. It can be used for any location-determining systems.

The definition of object-related relevance areas is not limited to certain types of information. Information objects having, for example, one or several firmly defined positions, can also have object-related relevance areas, such as information objects, which are not associated to a fixed position (but are, for example, still only relevant in a well-defined geographical region).

A basic innovation of the mechanism of the object-related relevance areas and the situation-dependent selection release of information objects is that not only the position, moving direction, etc. of the user or the associated geographical selection parameters, respectively, can be selected and possibly optimized at runtime by the location-based information system. Rather, the author of the information objects does now have the possibility to intervene in the later selection processes in an optimizing way already when creating every individual information object.

BRIEF DESCRIPTION OF THE DRAWINGS

These and other objects and features of the present invention will become clear from the following description taken in conjunction with the accompanying drawings, in which:

FIG. 17 is a geographical parameter adaptation module;

FIG. 18 is a table of the characteristic average values;

FIG. 19 is a basic process in the situation selection;

FIG. 69 is average speeds for determining the current user situation;

DETAILED DESCRIPTION

Figure 1:
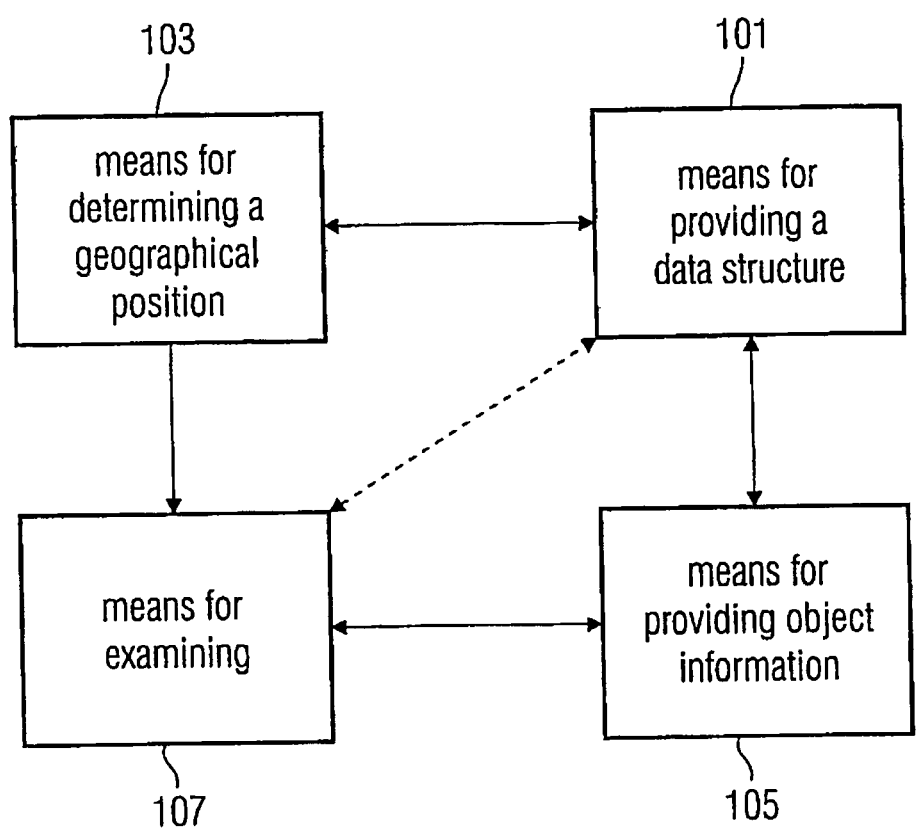
FIG. 1 is a block diagram of an information object according to an embodiment of the present invention.

FIG. 1 shows a block diagram of an information point according to an embodiment of the present invention.

The information point comprises a means 101 for providing a data structure, wherein the means 101 for providing is coupled to a means 103 for determining a geographical position of the information point, as well as to a means 105 for providing object information. The means 105 for providing object information can be or comprise, for example, a means for displaying object information.

Further, the information point comprises a means 107 for examining whether the geographical position of the information point lies in a geographical area associated to an object. The means 107 for examining is coupled to the means 103 for determining the geographical position of the information point, as well as to the means 105 for providing object information.

According to the present invention, the data structure provided by the means 101 comprises entries about different objects, wherein a limited geographical area is associated to every object, and wherein object information is associated to every object. The object information can be, for example, detailed object descriptions, or other information connected to the object.

The limited geographical area associated to an object is defined, for example, by geometrical basic forms and depends on other object-related areas (relevance areas).

The means for determining the geometrical position of the information point can comprise, for example, a GPS receiver (GPS: global positioning system), a compass or another means that is able to determine the position of the information point, e.g. a mobile information terminal, in a self-sufficient way.

The means 107 for examining is implemented to examine whether the geometrical position lies within the geographical area associated to an object, based on the detected geometrical position of the information point. As shown in FIG. 1, the means 107 for examining can be coupled to the means 101 for providing, for receiving both the form and extension of the respective object area.

If the means 107 for examining determines that the information point lies within the geographical area of the object, then the means 105 for providing object information is implemented to display the object information associated to the object. If the means 107 for examining has determined that the information point lies outside the object area, or if the object is not interesting for the user, the information about the object is not displayed.

Further, according to the present invention, an object attribute can be associated to every geographical area, which is associated to an object. The object attribute can, for example, represent the interests of the user of the information point. If the objects located in the surroundings are objects that are not of interest for the user, the object attribute can be set, for example, to zero, so that a display of the corresponding object is suppressed.

Above that, the object attribute can comprise a selectable object relevance, which indicates the relevance of the object for a user of the information point, e.g. a mobile terminal.

If the objects are, for example, foreign-language books of different publication dates in a library, then, for example, South American books of a later publication date are of more interest for the user than, for example, English books of an older publication date. In this case, the object attribute can, for example, indicate a higher relevance of the South American books of a later publication date and a lower relevance of the English language books of an older publication date.

As has already been mentioned, a geographical area associated to an object can depend on a topology of the surroundings where the object is located. Above that, a geographical area associated to an object can depend on a topology of the surroundings, where the object is located, and on a geographical area, which is associated to a further object. The geographical object areas are described, for example, with the help of the geometrical forms, such as segments of a circle, lines or rectangles. Above that, apart from a two-dimensional description of the geographical areas, a three-dimensional description of the geographical areas can also be provided. In this case, for example different heights of the objects can be considered, so that in the case that a further object hides an object, information about the hidden object is suppressed.

According to a further aspect of the present invention, the object areas can have several subobject areas, which lie, for example, in different distances to the object, wherein different information can be associated to every subarea.

Thus, for example, coarse information about the object can be associated to areas located at the edge of the geographical object area, and detailed object information can be linked to subareas, which are located close to the actual object. If the user comes closer, finer and finer information about the objects can be displayed in this way.

According to a further aspect of the present invention, the means 103 for determining the geographical object information can be implemented to detect a speed of the information point, e.g. the mobile information terminal and/or a speed direction of the information point.

In dependence on the speed of the information point, the means 107 for examining can be implemented to determine that the information point lies within the geographical area, when the information point lies within the object area within a predetermined time interval. If the user moves with too high speed, the means 107 for examining can determine that the user passes the respective object within a very short time interval. If the time interval is very short, e.g. two seconds, the information about the object can be suppressed.

If, for example, the speed direction of the information point is detected, the means 107 for examining can be implemented to determine that the information point lies within the geographical area, when an object is located in the speed direction and, for example, is located in front of the viewer, or can determine that the information point does not lie in the object area, when the object area lies, for example, behind the information point. In that way, it can be ensured that objects that the user have left behind are no longer taken into consideration.

According to a further embodiment of the present invention, the means 101 for providing can be implemented, for example, to provide object information in dependence on a speed and/or speed direction. Alternatively, the means 105 for providing object information can be implemented to provide and/or display information in dependence on the speed and/or speed direction.

The means 105 for providing object information can comprise, for example, a screen or loudspeaker to provide the information. Above that, the means 105 for providing object information can be implemented to provide the user with the possibility to input user-specified object attributes, so that the same can then, for example, be provided to the means 107 for examining, so that objects that are of no interest for the user are suppressed.

According to a further aspect, the present invention provides a means for generating a data structure having entries about different objects, wherein a limited geographical area is associated to every object and wherein object information is associated to every object. The means for generating the data structure comprises a means for calculating geographical object areas (areas) for different objects by using geographical forms, such as segments of a circle, rectangles, etc.

Further, the means for generating the data structure can have a means for linking the object information to the object areas to obtain the data structure, wherein the object information can, for example, be entered freely.

One example is the usage of the mechanism of the location-related relevance areas in a location-based information system, for example for tourist information. The existing information objects available for a selection can have individual object-related relevance areas. These location-related relevance areas can be defined such that the same describe the area where the information objects are visible for the user at the time of selection. Thus, if the user of the information system moves within an object-related relevance area, the associated information object is available for selection.

Figure 2:
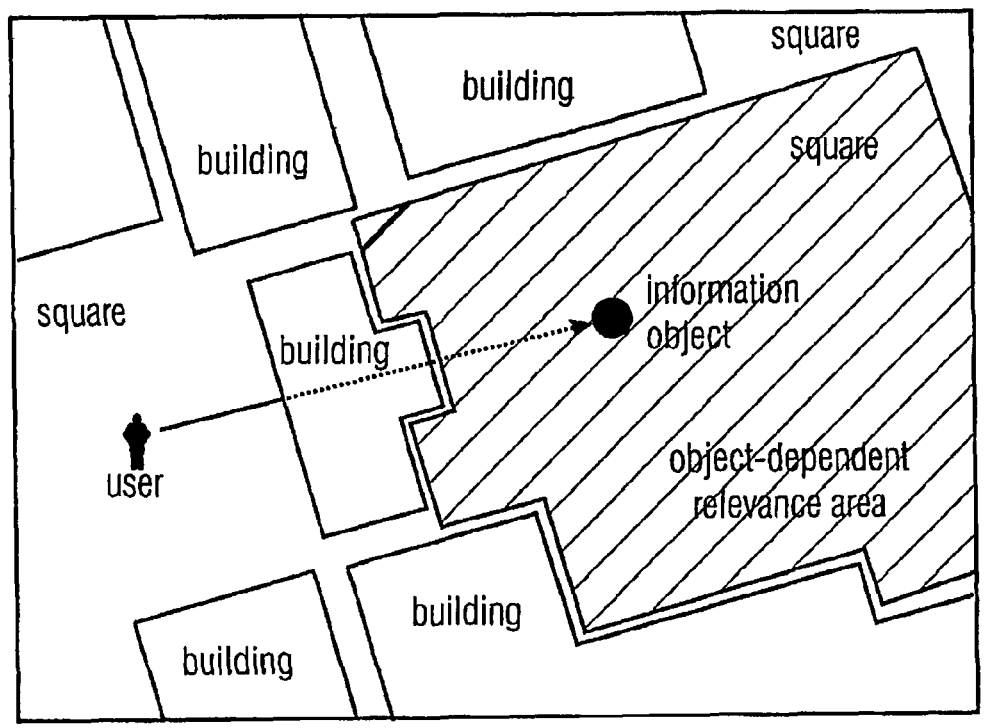
FIG. 2 is an object-related relevance area of a location-related information object.

Thus, this method allows that the author of the information objects can already ensure that the information objects are visible for the user at the beginning of the display, which is not possible in the existing location-based information systems. FIG. 2 shows a corresponding example representing the area of an information object, in which the same is visible. As long as the user is outside the marked relevance area, the information object is definitely not selected, independent of the current geographical selection parameters of the information system.

Figure 3:
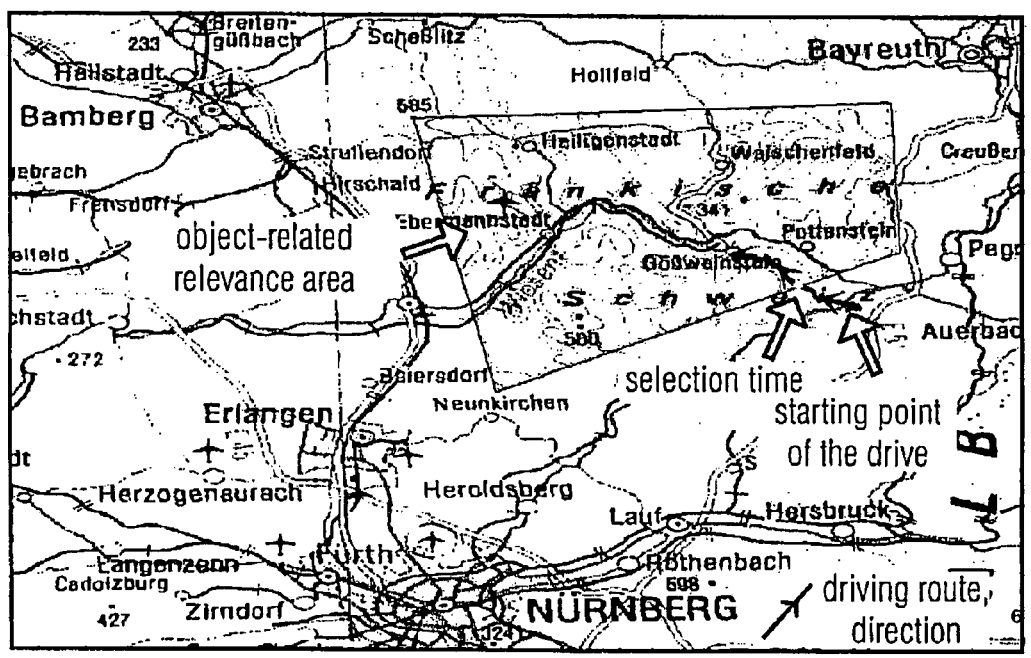
FIG. 3 is a limitation of an unpositioned information object to a geographical area.

A further application case is the specific display of information that itself cannot be associated to a position, but is still relevant in a well-defined geographical region. For example, the core region of "Fränkische Schweiz" (Franconian Switzerland) is defined in FIG. 3 by a respective relevance region. The associated information object (in this case a general introduction to "Fränkische Schweiz") is selected when the user moves into the defined relevance area. Thus, the information object has no fixed location but is geographically described and limited only by its relevance area.

This method works independent of the fact from which direction the user moves into the described region. Additionally, positioned information objects might be given priority in the selection by the information system, since their relevance is in many cases more fleeting for the (moving) user than the one of an "unpositioned information object".

A further example of the application is to define the selection of information objects to a certain direction from which the user approaches. Thus, it is for example possible to setup two information objects in one road with individual indications to the location of a place of interest. Depending on from which direction the user approaches these information objects, he only hears the version of the presentation adapted for him and his current moving direction.

Finally, with the help of object-related relevance areas, the definition of different detail stages of the presentation of an information object can also be realized. For example, there could be a version of the information object "Olympic Tower Munich", which describes this place of interest very briefly. This version has an object-related relevance area, which explicitly excludes the city center of Munich. For the same geographical position, a second information object with a detailed representation of the Olympic Tower is defined, whose relevance area comprises now the immediate surroundings of the place of interest.

If a driver moves on the motorway towards the city of Munich or merely bypasses the city, he receives short information about the "Olympic Tower Munich". However, if he immediately approaches the Olympic Tower or is walking in the city center of Munich, he receives the more adequate detailed representation of the place of interest, which is immediately in front of him.

This object can also be solved very elegantly and with a more global approach with the described situation-dependent selection releases.

In the following, further embodiments of the present invention will be described.

Figure 4:
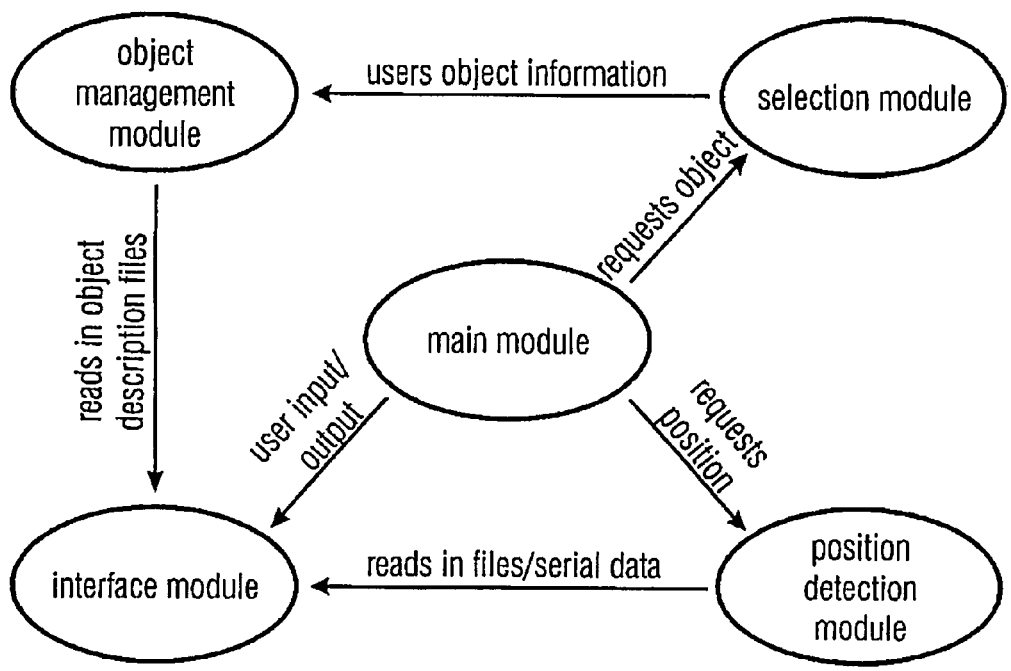
FIG. 4 is an overview over the modular structure of UMIS.

The inventive information point (universal mobile information system—UMIS) has been designed in a modular way. In this context, "modular" means that functional units are encapsulated and communicate with each other exclusively via exactly defined interfaces. In FIG. 4, the fixed division of the main components of the system as well as the global context of these units are represented.

The central module of UMIS is the main module, which is initialized first at the start of the program. The main module coordinates the communication of the present modules via the defined interfaces. The position detection module has the important task of determining the current user position, which is returned in response to a request of the main module. The selection module is responsible for selecting an information object. Based on predetermined geographical and abstract selection parameters, an information object is selected. The object information module specifically provides the available objects. At system start, this module searches any folders for valid object description files. The valid files are read in and stored in a multidimensional structure, to ensure short access times for specific requests. The input and output routines provided by the operating system are encapsulated in different interface modules, to obtain easy porting of UMIS to other platforms. These routines access, for example, the file system and hardware interfaces. Another task is the collection of user inputs and the output of audio and multimedia content.

Figure 5:
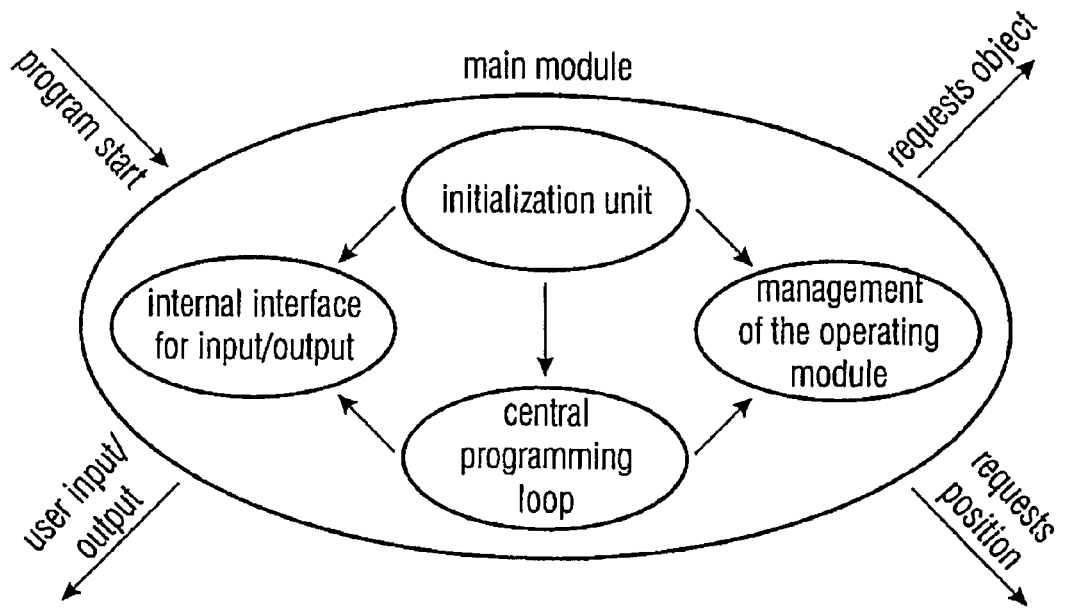
FIG. 5 is a UMIS main module.

The main module initializes all required operating modules after the program start. The program start is performed by the operating system Windows. After initialization it is responsible for the coordination of the individual operating modules. A further task of this unit is to control the user inputs as well as the outputs of audio and multimedia content. FIG. 5 shows the different components of the main module and their objects.

The execution of the main module is performed immediately after the start of UMIS. From this time onwards, it represents the program core. First, the initialization unit is invoked, which generates and initializes all required operating modules as well as the interfaces for input and output. Then, the central program loop is invoked, which makes all decisions at runtime from this call onwards. In the program loop, a cyclic query for possible user inputs is performed. If these are present, they are immediately processed to allow short reaction times. Further, the loop requests the current user position and provides the same to the object selection module, which selects a new information object based on the present selection parameters and the current location. The display of the selected object is then initiated in the program loop. The basic input/outputs are performed by the operating system Windows.

Figure 6:
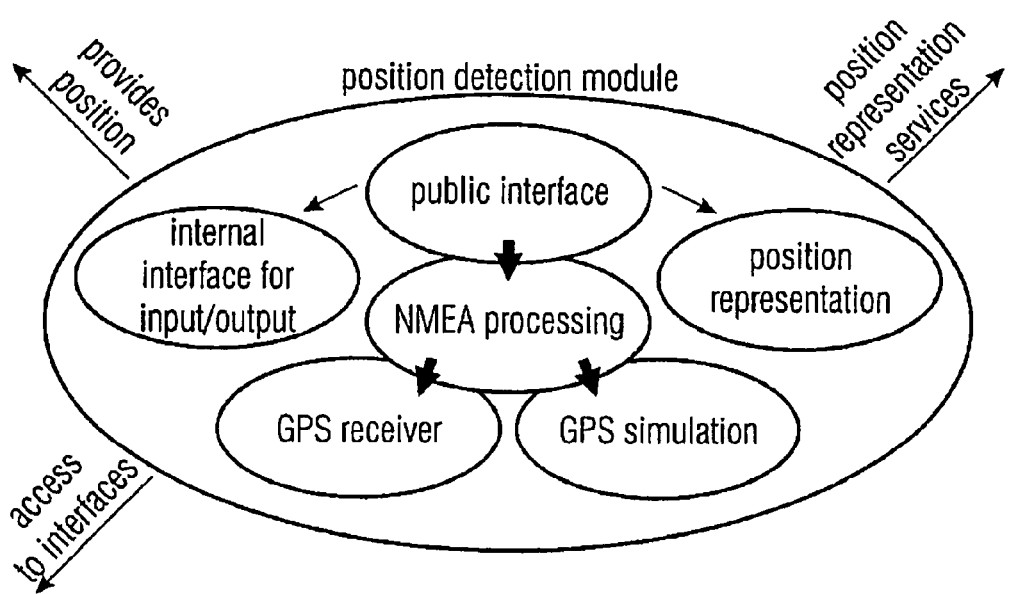
FIG. 6 is a position detection module.

The position detection module has the important task to detect the current position data of the user and to return them to the main module. Apart from the actual position, the position data contain the information for speed and moving direction of the user as longitude/latitude pair. In FIG. 6, the internal units of this module are illustrated.

The standardized access to the services of the position detection module is performed via the public interface. The same accesses the NMEA processing unit, to receive the current position data. The NMEA processing unit verifies and processes the position indications formatted in an "NMEA-compliant way" and output by many GPS receivers. The NMEA datasets can be evaluated independently of the actual source. One possibility to receive NMEA datasets is the usage of a real GPS receiver of the brand "Garmin". Another possibility is to read in recorded or synthetically generated GPS signals via the GPS simulation unit. In the simulation mode, UMIS operates analogously to the live usage, apart from reading in the GPS data. The hierarchical realization of the modules by derived submodules allows the detection of these data in different ways.

The primary object of the position representation unit is the storage of position data in the geographical standard coordinate system. Further, the same includes the whole input and output logic for processing coordinates in different formattings. One reason for the necessity of this unit is that UMIS operates internally with an abstract representation of the position data. In certain cases, this internal representation is not useful. One example is the output of the current location to the user, who expects the familiar geographical standard coordinates. The access to this possibility of position storage and representation is allowed for all areas and modules in UMIS.

Figure 7:
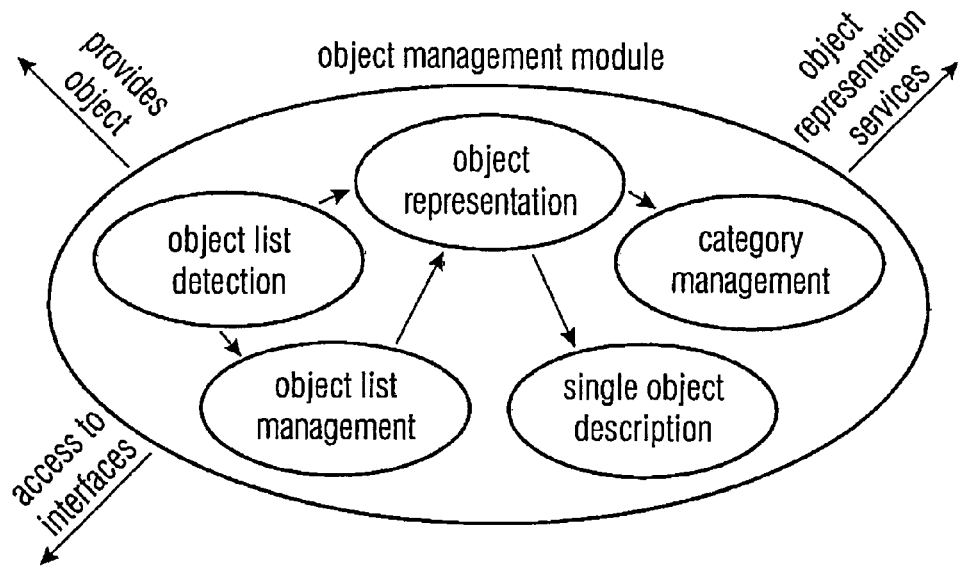
FIG. 7 is an object management module.

It is the object of the object management module to store detected information objects in a systematic structure and to thereby ensure fast access to these objects. An overview over the included components of this program part is shown in FIG. 7.

The systematic storage of the objects is performed in the object list management. Normally, the objects are uniquely determined by their geographical position. A three-dimensional database structure has been developed for internal storage of the objects, which uses the position indication for object selection as primary key. Further, the storage of unpositioned information objects is possible.

The object list detection is responsible for the initialization of this data structure. This unit searches a given branch of the file system for valid object description files. The parameters specified in the object files are used for registering the object in the three-dimensional structure.

Every registered object is represented by its object representation. The same includes all parameters required for the basic steps of the selection process, and a reference to the object description file. Access to this information is possible through the module of individual object description. The object representation services are accessible for all external units of UMIS. These services allow to specifically address or store objects.

An individual path in the dynamically generated category hierarchy is associated to every object. These paths consisting of category names are converted to index lists saving memory space for internal usage. The module for category management performs the unique bidirectional conversion between path name and index list.

Figure 8:
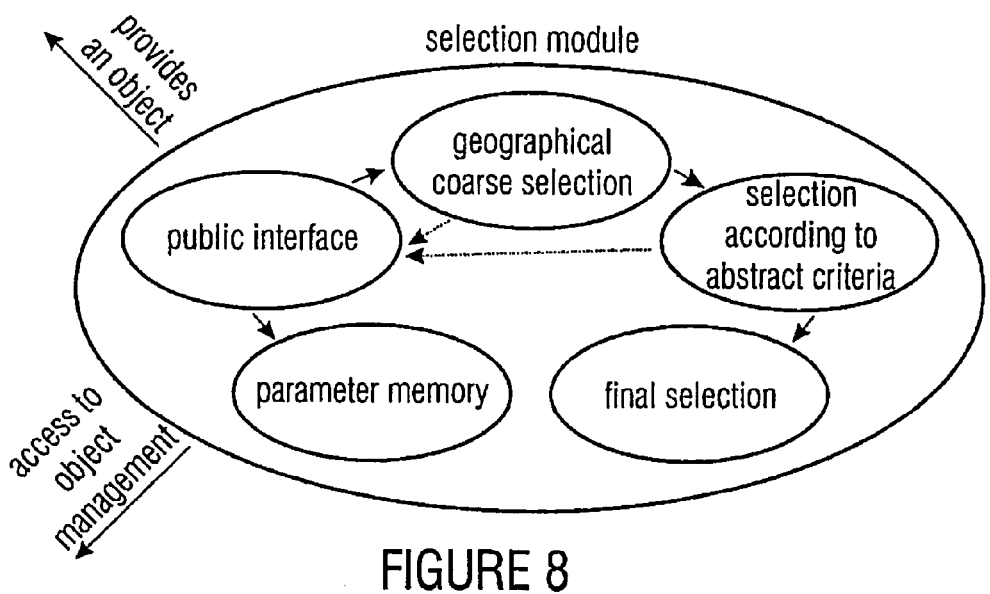
FIG. 8 is a selection module.

The primary object of the selection module is the selection of an information object. FIG. 8 shows the selection process, which is divided into several steps. In the following section, a detailed description of this process is discussed.

The selection module receives the instruction for selecting an object according to predetermined criteria via its public interface. Further, for performing an instruction, the position of the user is required.

Then, the geographical coarse selection determines the amount of objects that are basically available for selection.

For that purpose, the three-dimensional databank structure is accessed, which is stored in the object management module. The determined amount of information objects is transferred to the unit for selection according to abstract criteria. The same limits the amount of the possible objects by further applying abstract selection criteria. Part of the abstract criteria are, for example, the previous repetitions of an object, the maximum allowed number of repetitions, the category weighting determined by the user and many more.

If only one object remains from the selection process, the same is considered as selected. The module for final selection is activated when no clear selection can be made, although all relevant criteria are considered. In this case, an arbitrary selection is made from the list of the possible objects according to rules firmly fixed in the program. However, if no valid object is available after a selection process, the fixed geographical coarse selection limits are successively increased up to the absolute maximum values. Thereby, the selection process is restarted after every adaptation of the selection parameters.

The limiting values configurable by the user, which are required by the selection module for selection, are in the parameter memory. The limiting values determine, for example, the geographical position of the selection region based on minimum and maximum distances and opening angles as well as the lowest allowable limiting values for category evaluations.

Figure 9:
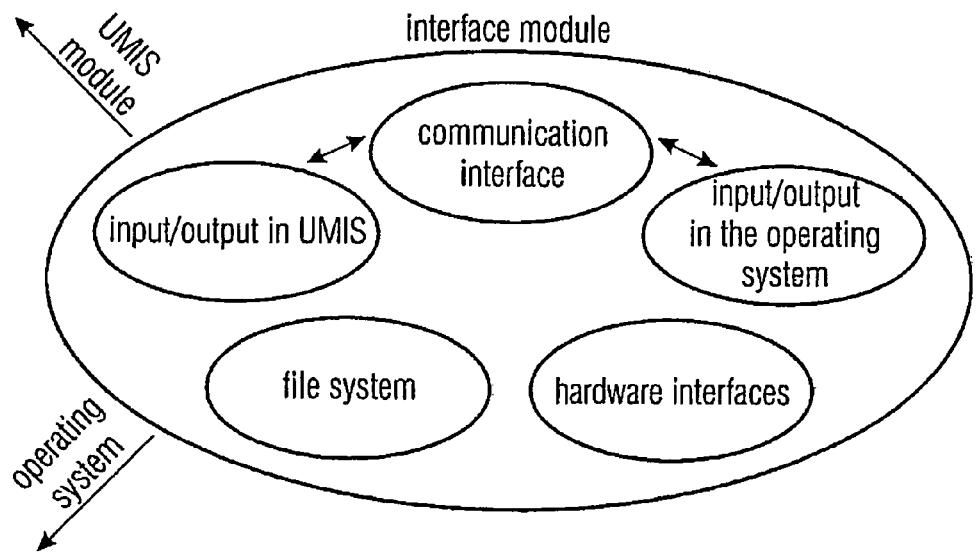
FIG. 9 is an interface module.

The interface module is partitioned into three separate functional groups, which are illustrated in FIG. 9. The access to the whole functionality of the file system required in UMIS is possible through the first module. Part of this are, for example, instructions for determining and setting directories as well as routines for reading in text files. Further, functions are present which unify the operation with directory and file names independent of the actual operating system.

Within the program, UMIS accesses the hardware interfaces at firmly defined positions. The functionality of the interface module is only required during realization of the position detection module for devices for location determination. The structure of the unit's inputs/outputs in UMIS, communication interface and inputs/outputs in the operating system, which seems complex at first, is responsible for communication with the interface. The advantage is the uncomplicated conversion of UMIS to other operating systems and user interfaces.

The module inputs/outputs in UMIS encapsulates inputs and outputs on the ANSI-compliant software side of the interface construction. Independent of the underlying operating system, it remains the same for the system. The functionalities realizing the direct inputs/outputs in the operating system are encapsulated in an individual module. The information exchange between the ANSI-compliant main module of UMIS and the operating system dependent part is taken over by a communication interface.

The object management has the task to detect the present information objects and store them in an ordered form. Fast access to objects that are relatively close to current user position is critical. For that reason, the geographical position of an information object has an important role in this systematical filing structure.

Figure 10:
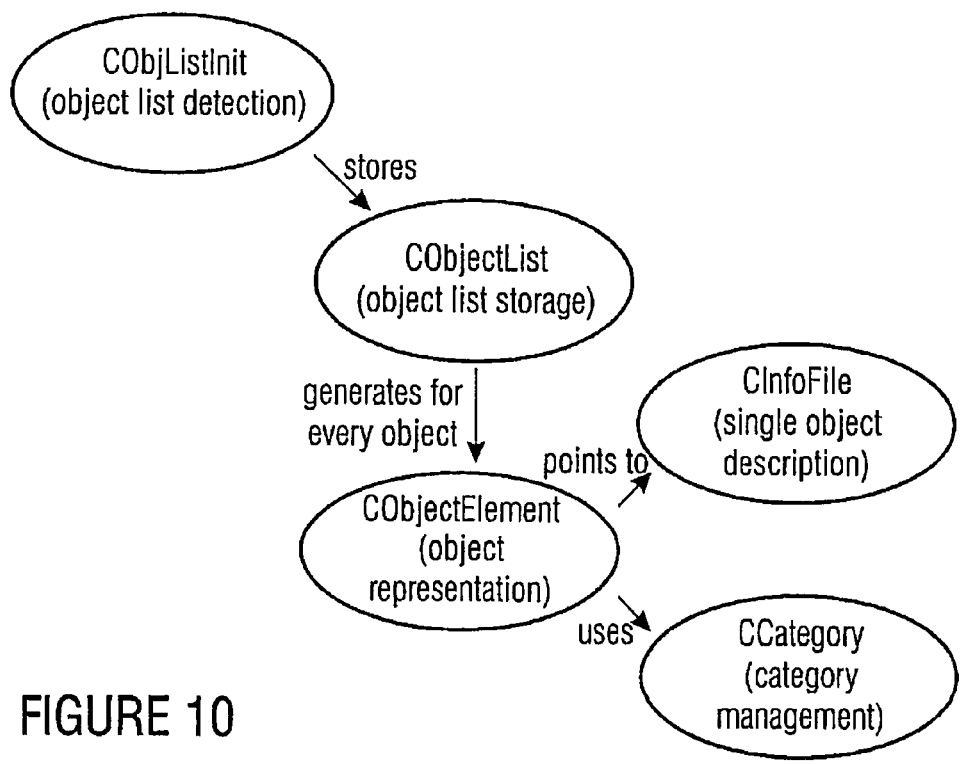
FIG. 10 is modules of the object management.

FIG. 10 shows the modules, which the object management is made up off, and gives an overview over the basic tasks and relations between these modules. The illustrated units will be described below in detail.

An object description file defines every information object. This file includes the following relevant data fields:

Title
This data field includes a short title of the information object.

Description
Here, the indication of a detailed description of the object is possible.

Address
The address data field is to give the user the possibility to independently get further information about the object. Thereby, the form of the address is not limited to a postal address. For example, the indication of an Internet address is possible.

Category
Every object has to be associated to a unique path by the category hierarchy. Thereby, the indication of at least one category stage is required. The internal category tree is structured dynamically based on this data field.

Position
The indication of the position of an information object is made in geographical standard coordinates (longitude/latitude). When several positions are indicated, an independent object is located for every position indication. If no position is indicated in this data field, or the specific pair of coordinates (90*s, 180*w) is included in the list of positions, the object will be registered as "unpositioned object". "Unpositioned objects" are considered during the selection when no objects with fixed positions are available.

Importance
This data field indicates the relative importance of an object in relation to the other available objects. A high value means a high relative importance.

MaxRepetitions
This value defines the maximum allowable number of repetitions for the display of an object. The indication of the value 0 means an unlimited number of possible repetitions. If no value is defined, the standard value 0 is assumed.

MediaFolder
In this data field, the folder including the audio and HTML pages is indicated. The indication of the path names of the folder can here be made in relation to the directory of the object description file (e.g. " . . . / . . . /Media4") or absolute (e.g. "C:\Media4").

SoundFileName
This field contains the name of the audio file to be replayed during the selection of the object.

HTMLFileName
The file name of the HTML file to be indicated at a successful selection of the object is defined in this data field. With wrong or missing indication, a standard HTML file is displayed.

NoInterruption
By indicating the value 1 the author of the information object can prevent an interruption of the display by "more relevant" objects.

The concept of the used file format allows an easy creation of the description files. Both the creation and access is possible without proprietary auxiliary programs.

The task of the module CObjListInit is the detection of all valid description files and the respective generation of an object representation CObjectElement. CObjListInit transfers the object representations to the object list storage tool CObjectList.

During the runtime of UMIS, an object representation contains all relevant data of an information object. The required information is listed below:
- geographical position of the object
- numerical internal representation of the category path
- maximum allowable number of repetitions
- relative importance of the object
- whole path of the associated object description file When executing the object representation module CObjectElement, two opposing criteria are decisive. On the one hand, all information required for the selection process has to be immediately available. For that purpose, these parameters are held in the working memory, whereby slow and power-consuming accesses to external data carriers are omitted. The second opposing criterion is to possibly keep the required working memory small. Therefore, the object representation includes only the selection parameters required for the actual selection process and a reference to the description file. By indicating the path name of the description file, the data required only after a successful selection of an object can be reloaded at any time. Further, a conversion of the category path into an internal index list saving memory space takes place.

Thus, the concept allows to detect a large amount of objects at system start and to keep them available during runtime.

The object representations are stored in an internal data structure. With the object management module CObjectList, fast and efficient access to those data is possible. When selecting an object, its position is the most important criterion. For that reason, CObjectList uses a three-dimensional data structure to store the objects. At first, the covered area is partitioned in a chequerboard way. All objects whose position falls within one of the generated rectangles are "stacked up" on the respective field similar to the stories of a multistory house. The first two dimensions represent the longitude and latitude portion indices of the rectangle, where the object is deposited. The third dimension designates the position of the object in a field and can be compared to the stories of a multistory house, because the object in a generated rectangle are "stacked up" similar to the stories of a multistory house. The limits of the covered area are not statical and can be defined when generating the data structure. The two coordinate areas of the defined area are typically partitioned into 100 sections.

Figure 11:
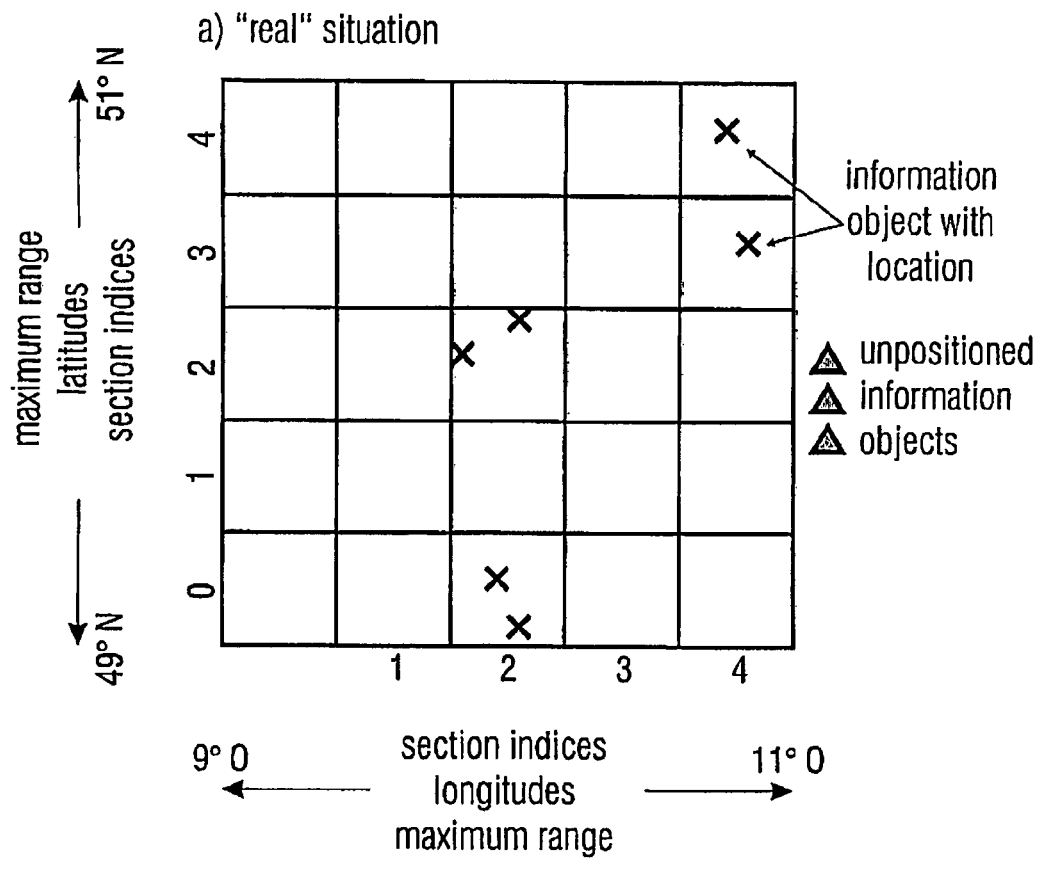
FIG. 11 is a three-dimensional memory structure of the object list management.
Figure 11:
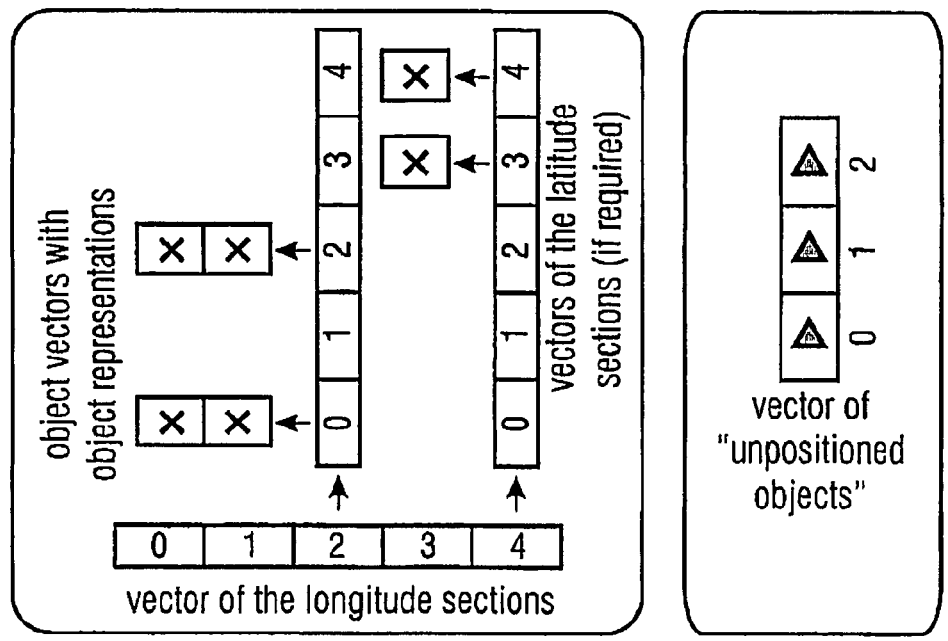

"Unpositioned" objects having no geographical position are stored in a separate one-dimensional structure. FIG. 11 illustrates the storage of objects on a partitioned area and shows their representation in the described three-dimensional memory structure.

For efficiency reasons, it is important to copy object representations not unnecessarily during processing and to keep them in the memory several times. With the help of "object handles", this problem can be avoided. The same have merely a reference to the underlying object representation, which only actually exists in the module CObjectList.

An "object handle" in the currently implemented form includes the following information:
- longitude index
- latitude index
- object vector index
- exact position
- validity seal In the three-dimensional memory structure, a memory location of an object is clearly defined by longitude, latitude and object vector index. If the indices of the already detected objects change due to new objects detected during runtime, the correct object representation to the respective "object handle" can be determined by the exact position. The validity seal determines whether an "object handle" represents a valid representation. The requirement to mark an "object handle" as invalid is, for example, used in the selection module. In this module, it can happen in the selection routines that no valid object can be determined.

The selection parameters can be partitioned into abstract and geographical parameters. In this paper, the emphasis is on the geographical parameters. The current position of the use is supplemented by the moving direction and the speed. The user can adapt the minimum and maximum distance that an information object is allowed to have from the current location. Further, he can adapt the minimum and maximum angle under which an object is allowed to appear in relation to the driving direction (applies mirror-symmetrically to both sides).

In the abstract selection parameters, the maximum allowable number of repetitions and the relative importance of an object is determined by the author of the information object. The user can adapt the other parameters. An object fulfills the minimum selection threshold for category evaluations when every individual category of the object-inherent category path is weighted higher than the selection threshold. At the medium weighting of the categories it is important that the average value of the evaluations of all individual categories of the category path is as high as possible. The number of repetitions of an object since the system starts is also considered in the selection.

Figure 12:
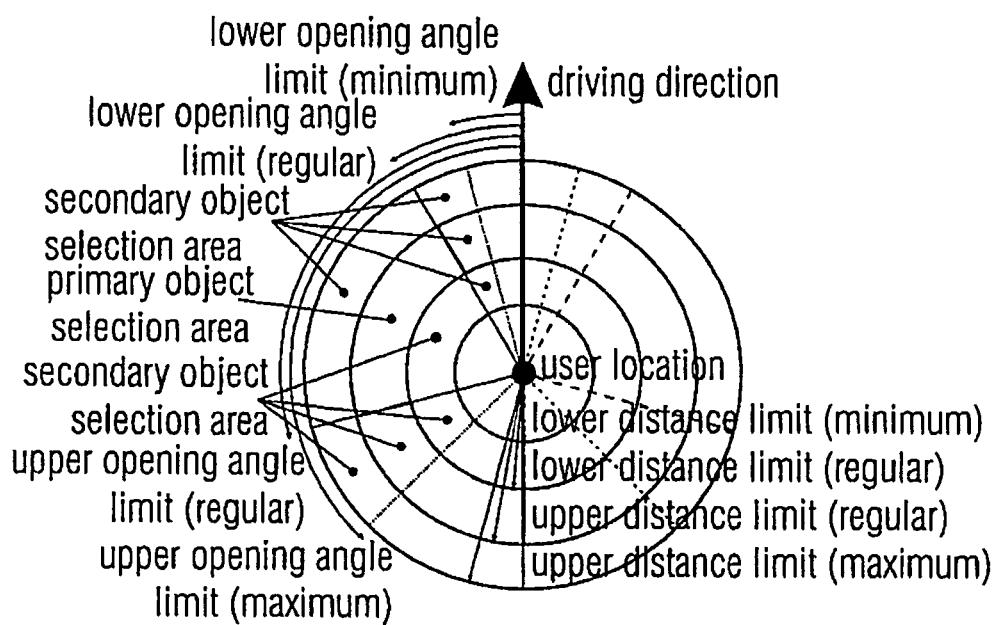
FIG. 12 is a specification of the primary and secondary selection areas.

Two geographical object selection areas are used in the selection process. The area more relevant for the user will be defined below as primary selection area. In an unsuccessful selection process in the primary selection area, the selection parameters are successively adapted to the secondary area. FIG. 12 represents the primary as well as the secondary selection area, which can be successively extended if needed.

Figure 13:
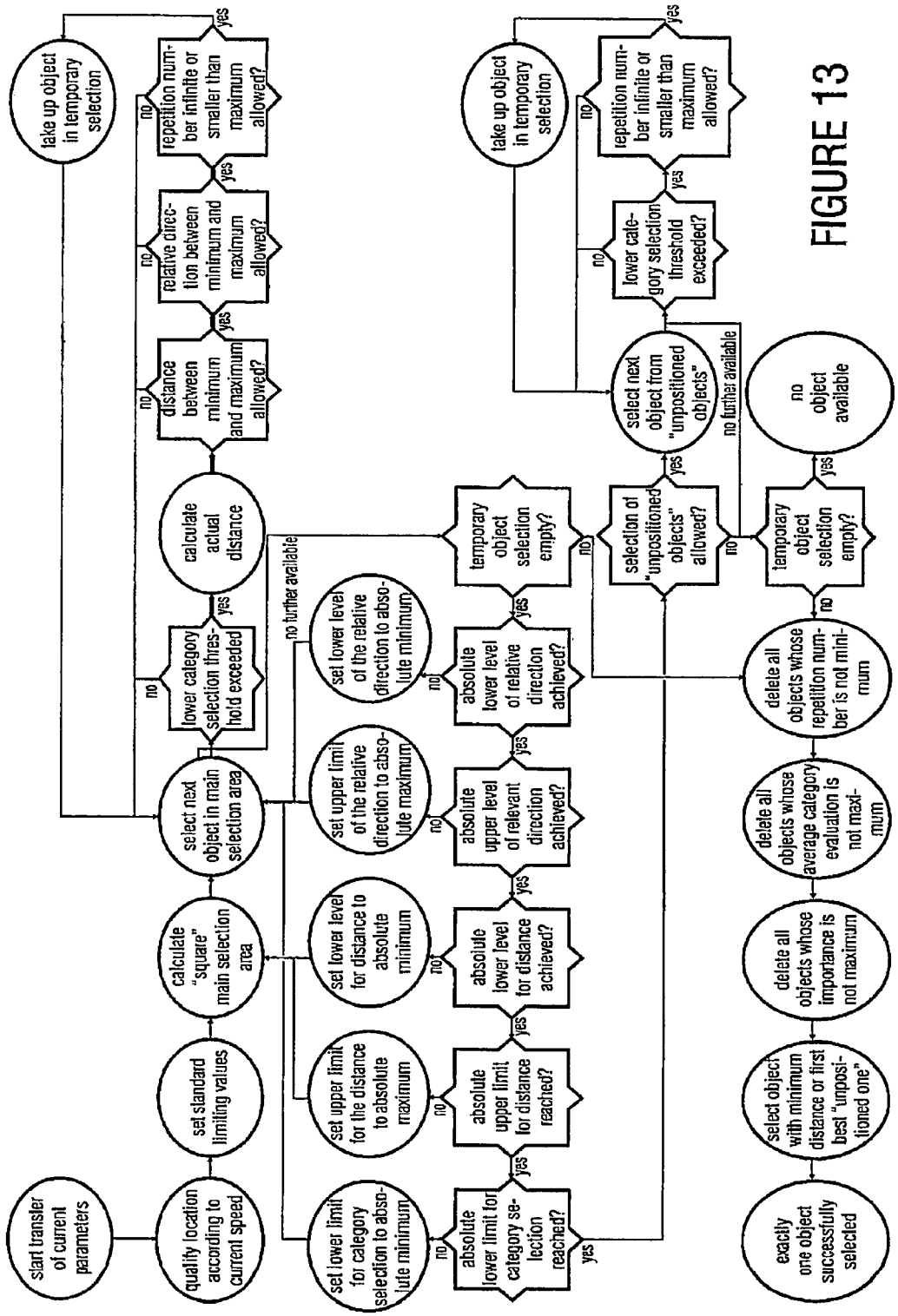
FIG. 13 is an overview over the steps occurring in the geographical selection.

An overview of all occurring steps and decision points is illustrated in FIG. 13. The process is partitioned into four larger units:

Initialization
During initialization, all parameters are set. Then the selection area is qualified in dependence on the current speed and driving direction. This measure prevents, for example, that the description of an object is presented during the drive on the motorway, although it can already lie behind the user at the time of the actual start of the audio replay, due to the high speed. The conversion of the qualification is based on shifting the reference point corresponding to the current speed ("virtual user position"). There is the possibility to state the lower and upper speed limit as well as the maximum adaptation distance for the qualification. Below this limit, no quantification is performed. The distance to be added is adapted in a proportional way within the minimum and maximum limit. The maximum qualification distance is used when the upper limit is exceeded.

Geographical Coarse Selection
From the amount of registered object representations, the geographical coarse selection provides those that are available at all for the geographical selection parameters. For that purpose, a "rectangular" geographical area is defined. The maximum distance that an object is allowed to have, is "added up" to the current position in every direction. Then, the rectangle defined by the minimum and maximum positions is transferred to the object list management module CObjectList. CObjectList successively returns only the possible objects.

Selection According to Geographical and Abstract Criteria

The preselected objects have now to be checked for the compliance with the geographical and abstract minimum requirements. One object fulfilling all these criteria is added to the temporary selection.

If no valid object from the amount of available objects could be found after the preselection, the selection parameters are raised to their maximum values in a fixed sequence. A new complete preselection process is run up to this point, when a newly set value is present. If no valid object is present, despite maximum selection parameters, the query is made whether the user has released "unpositioned objects" for selection. If "unpositioned objects" are allowed, then all these objects are checked for compliance with the abstract criteria, such as a maximum number of repetitions and category weighting. If again no object fulfills the requirements, or the user has forbidden the selection of "unpositioned objects", then the selection process for the current position is terminated unsuccessfully.

Final Selection

All objects that are in the temporary object selection at this time, fulfill the requested minimum requirements. The aim of the last selection step is to compare the preselected objects and to select one object based on relative criteria. Part of the relative criteria is the previous number of repetitions, the average weighting of the categories as well as the relative importance defined by the author.

The object remaining after the final step is returned to the requesting module for display.

When the geographical selection parameters are chosen, the surroundings play an important part. Thus, for example, it is recommended to define a larger selection area during the drive on a road or motorway. The larger selection area has two decisive advantages. If the user decides to view the information object on location, then he has the possibility, for example, to take the next convenient exit due to the timely indication. The second significant advantage is the spatial distribution of the objects in rural regions. The distances to information objects in such surroundings are higher than, for example, in the city where the density of objects is higher.

Within a city, a large selection area is inadequate due to the specific topology. As has already been pointed out, the density of information objects is typically significantly higher than outside a city and thus suggests a small selection area. Thereby, only those objects in close vicinity are offered to the user for selection.

In the first version of UMIS, the geographical selection was made based on statical parameters that could only be defined prior to the system start. The main problem with this solution are the constantly changing surroundings and thus the requirement to adapt the geographical parameters to the new situations of the user. The adaptation of the parameters to the new situation is only possible prior to a system start and thus a regular re-start is required. For that reason, a dynamical selection method has been developed, which continuously adapts the geographical parameters to the current situation of the user. The corresponding routines are implemented in the physical adaptation module.

Figure 14:
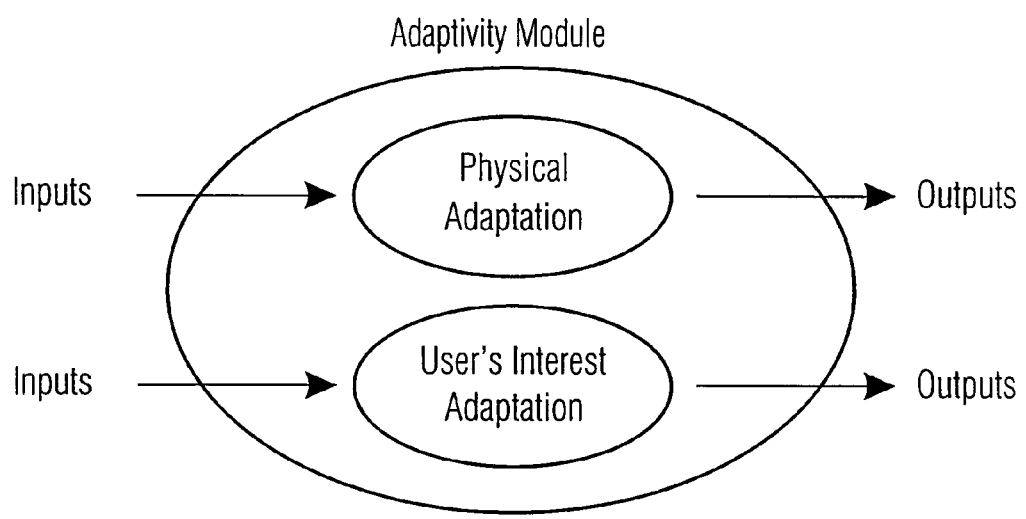
FIG. 14 is an overview over the adaptivity module.

Further, with this upgrade, a dynamical adaptation ability to the interests of the user has been developed. Based on the interaction of the user, during the display of an information object, this modules tries, to draw conclusions on his preferences and to evaluate the corresponding category paths higher or lower. An interaction of the user can for example, be the termination of a display of an object, which in this case means staging down the respective categories belonging to this object. The user's interest adaptation module includes the corresponding routines. These two units are, as illustrated in FIG. 14, encapsulated in the adaptivity module. The Physical Adaptation Module will be described in more detail in the following sections with regard to its functionality and structure.

The aim of the Physical Adaptation Module is the constant adaptation of the geographical selection parameters to the current surroundings of the user.

The adaptation is performed in two steps. First, the geographical situation has to be detected. Starting from the determined situation, the second step is the calculation of the parameters for the primary and secondary geographical selection area.

The Physical Adaptation Module differentiates three different "types of surroundings" or situations:

city
road
motorway

The names characterize typical situations in which the user can be. City represents, for example, a drive with a low average speed, frequent stops and many turning processes. Motorway, however, stands for a high average speed, no stops and no sharp bends. The criteria for the situation road lie between the two mentioned situations. For determining the most likely situation, the Physical Adaptation Module requires current position data. The position data structure calculated by the position detection module includes all required user data:

geographical position
driving direction
speed
time stamp of the position detection The module considers also the number of available objects. For that reason, the Physical Adaptation Module requires information about the geographical positions of all available objects provided by the object management module.

The adaptation has an effect on the geographical selection process. Based on the input parameters, the Physical Adaptation Module returns all required selection parameters for a primary and secondary selection area. The parameters have already been presented and are graphically illustrated in FIG. 12. These parameters are stored in a data structure Selection Limits, which is defined in the selection module.

Figure 15:
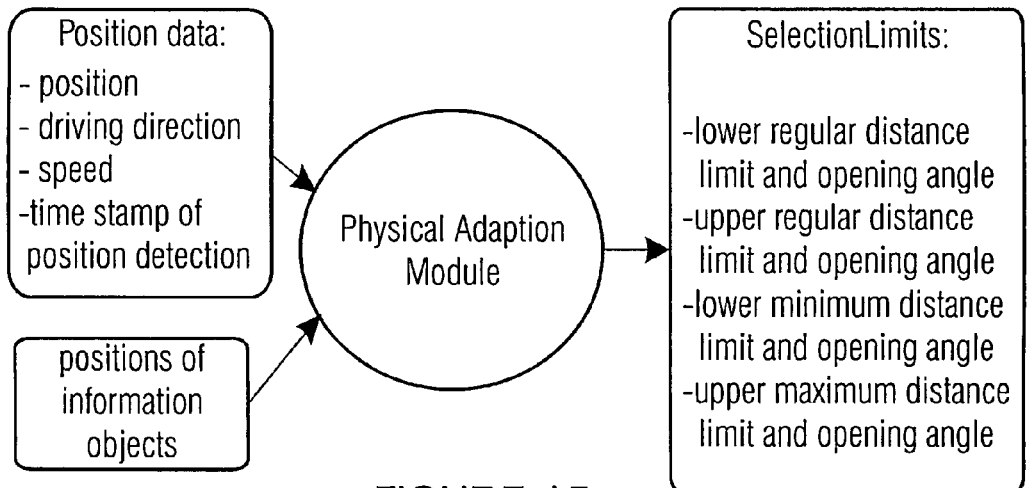
FIG. 15 is input and output parameters of the physical adaptation modules.

The process discussed in this section is shown in FIG. 15.

Figure 16:
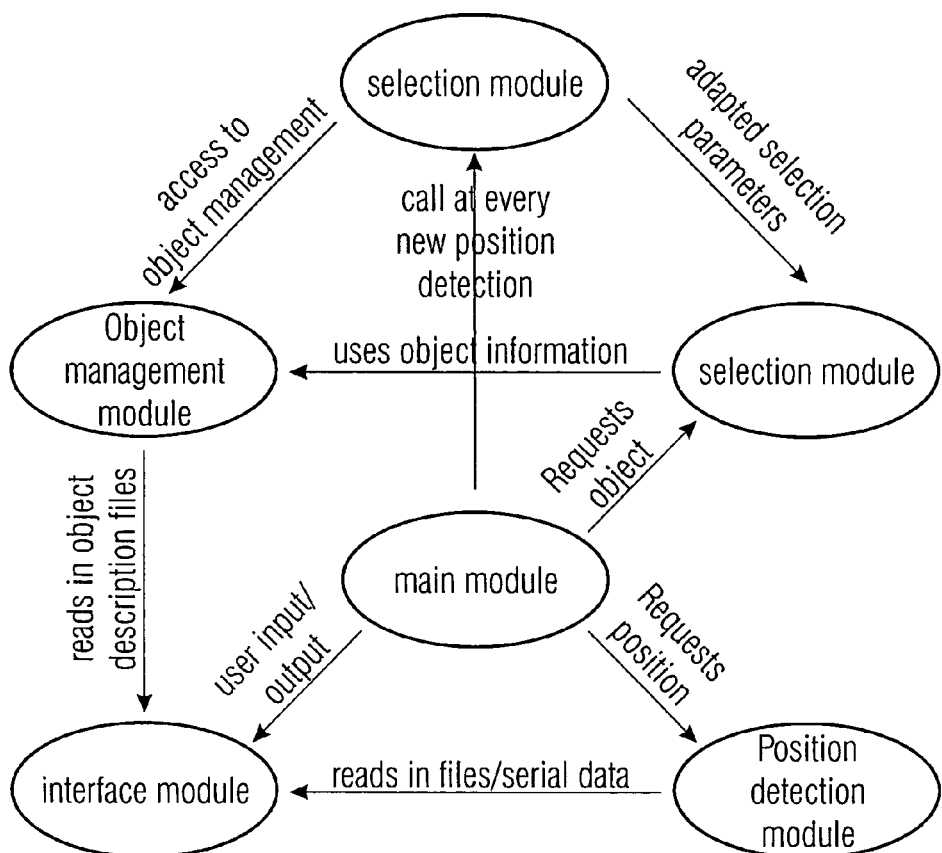
FIG. 16 is an interaction of the adaptation module with the main components of the UMIS system.

The interaction of the Physical Adaptation Module with the main components of the UMIS system is illustrated in FIG. 16.

The main module invokes the Physical Adaptation Module as soon as a new position from the position detection module is present. Based on the new input parameters and the earlier detected parameters, first, the situation of the user is determined and then the Selection Limits are calculated.

The Physical Adaptation Module is internally partitioned into two units. These units represent the two basic steps during the adaptation of the geographical selection parameters to the current user situation.

In a first step, the Style of Driving Analyzer to which the current position data are transferred as input parameters, determines the characteristic average values of the drive. Based on current and earlier position data, this unit calculates this average values, which are then transmitted to the Geographical Limits Adaptation unit for determining the situation.

The actual adaptation of the geographical selection parameters takes place in this unit, which performs the adaptation based on the determined situation type, the current position data and the positions of the objects.

It is the primary object of this module to calculate characteristic average values from the position data detected during the drive. These average values are required for determining the situation.

When selecting the criteria, emphasis was placed on the fact that the same have different average values in the different defined situations or types of surroundings, respectively. The Style of Driving Analyzer is implemented such that the same detects the presented three situations.

In the following, the selected characteristic criteria as well as their calculation are listed:

Speed Characteristic

The speed characteristic is the average speed of the user within a defined time window and is calculated according to the following formula:

$$S = \frac{(S_1 + S_2 + S_3 + \ldots + S_n)}{n} \left[\frac{m}{s}\right] \quad (3.1)$$

$s_i$ $$\left[\frac{m}{s}\right]$$

are the current speeds and n the number of detected position data within a time window.

Stop Characteristics

During a stop process, two parameters are determined. One parameter includes the number of stop processes within a time window. The other parameter proportionally represents the ratio of the time sum of all stop processes within a time window to the length of the used time window:

$$\overline{T} = \frac{(T_1 + T_2 + T_3 \ldots, + T_n)}{T_W} \left[\frac{°}{s}\right] \quad (3.2)$$

$T_i$ [s] are the time intervals between two times when the speed is 0 km/h. The overall length of the used time window is described by $T_W$ [s].

Change of Direction Characteristic

The change of direction characteristic tries to describe the intensity and the frequency of the changes of direction of the user.

A main problem in the calculation are the continuous turning processes, which make the detection of the end of a change of direction harder. This characteristic has the effect that only those changes of directions between two positions are determined. Further, a weighting of this change of direction is performed, because, for example, a change of direction of 1° in two seconds should have a higher evaluation than a change of direction of 1° within ten seconds. The parameter describing the change of direction characteristic is calculated according to the following formula:

$$\overline{A} = \frac{\left(\frac{A_1}{T_1} + \frac{A_2}{T_2} + \frac{A_3}{T_3} \ldots + \frac{A_n}{T_n}\right)}{n} \left[\frac{°}{s}\right] \quad (3.3)$$

$A_i$[°] is the change of direction between two subsequent positions and $T_i$[°] the corresponding time span between the two positions. The number of the detected positions within a time window is given by n.

Based on the determined characteristic average values of the Style of Driving Analyzer, the object positions and the position data, the geographical selection parameter is calculated by the Physical Limits Adaptation Module. The adaptation is performed in three steps. Every step is encapsulated in one unit, as illustrated in FIG. 17.

In the following, each of these steps is considered in detail.

For determining the user situation, the criteria calculated by the Style of Driving Analyzer are used.

When developing the Physical Adaptation Module, different test drives have been performed in advance and then the same were evaluated. Aim of these evaluations was to determine the characteristic average values that are typical for the three selected situations (city, road and motorway).

In the calculation of these values, a long-time window of six minutes was used. Using this minimum length in the calculations allows a good conclusion about the situation which the user is in. Under these basic conditions, the typical standard criteria shown in FIG. 18 result for the respective situation.

The characteristic average values calculated by the Style of Driving Analyzer module are compared to the values of the situation types illustrated in FIG. 18. The situation obtaining most matches is selected as current situation. The basic sequence is illustrated in FIG. 19.

If two situations obtain the same number of matches, the one closest in sequence to the current situation is selected. If, for example, the situations "road" and "motorway" have the same number of matches and "city" is the current situation, the situation "road" is selected. "Road" is closer in ranking order to "city". If the current situation is also included in the equal situations, then the current situation is not changed.

After the selection of a situation, the adaptation of the geographical selection parameters is performed. Parameterizable curves exist for every situation, which are the base for the calculation of the geographical selection parameters. Every parameter is adapted based on these curves due to characteristic driving values.

Figure 20:
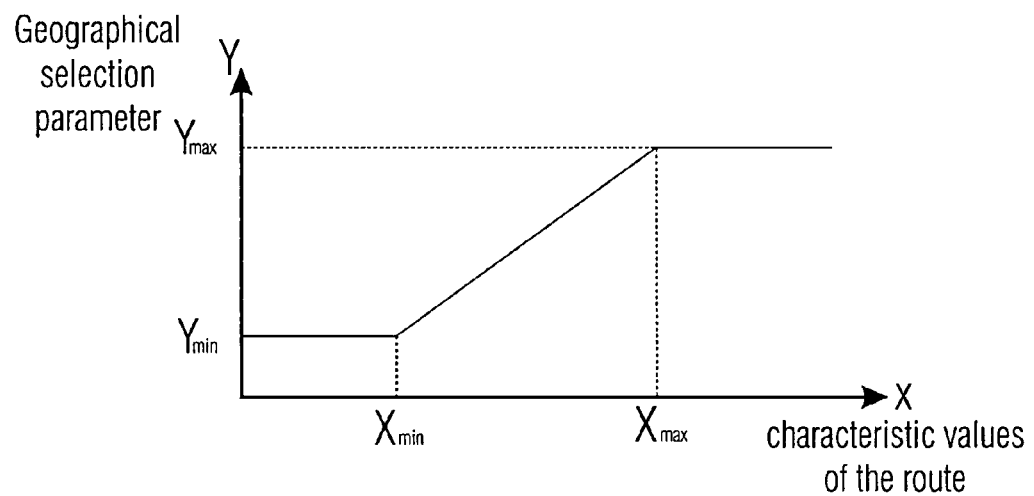
FIG. 20 is a curve shape of the adaptation curve.
Figure 20:
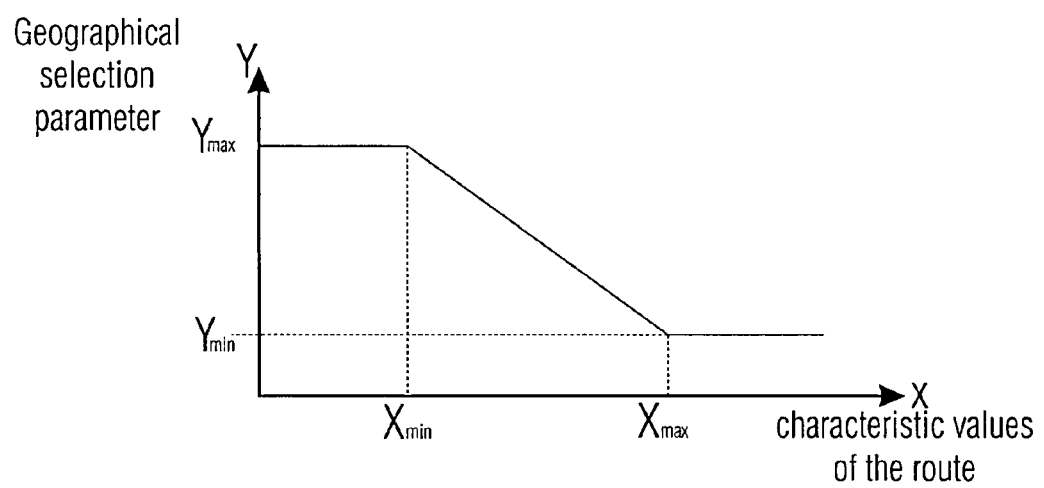
Figure 21:
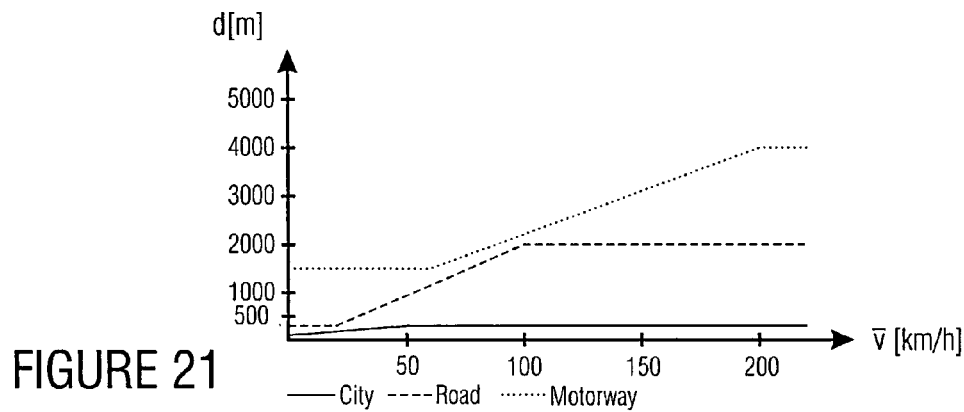
FIG. 21 is adaptation curves for the upper selection removal of the primary selection area for the respective situation.
Figure 22:
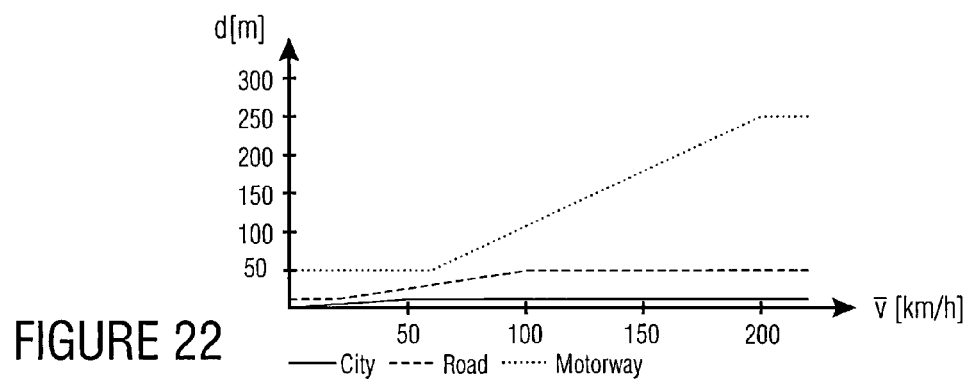
FIG. 22 is adaptation curves for the lower selection removal of the primary selection area for the respective situation.
Figure 23:
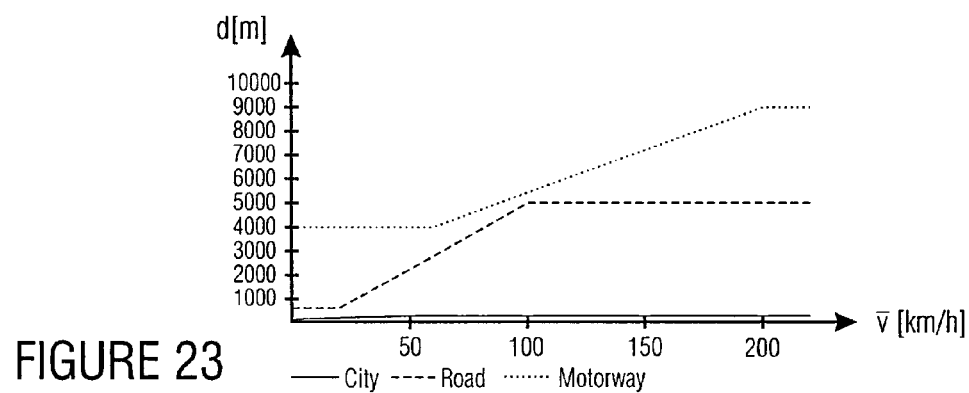
FIG. 23 is adaptation curves for the upper selection removal of the secondary selection area for the respective situation.
Figure 24:
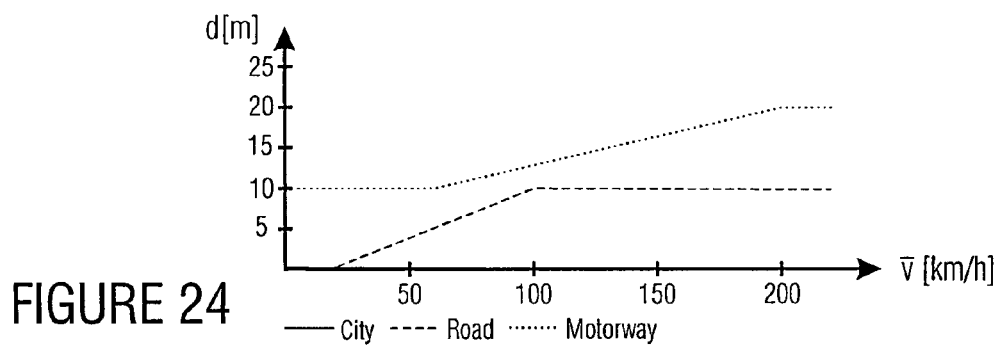
FIG. 24 is adaptation curves for the lower selection removal of the secondary selection area for the respective situation.

Two basic curve shapes exist. While the one curve has a falling shape, the other has a rising shape. Characteristic driving values, such as average speeds or changes of direction are used as input variables x. The output amounts are the geographical selection parameters. FIG. 20 shows the curve shapes and the required parameters for parameterization.

The parameterized curve functions describing the rising curve shape result according to Nuria L. Juan: Specification, implementation and evaluation of an auto-adaptive dynamic parameterization mechanism for a universal mobile information system, Friedrich-Alexander Universität Erlangen-Nürnberg, August 2002 to:

$$Y(x) = \begin{cases} Y_{\min} & \text{for } x \leq X_{\min} \\ Y_{\min} + \frac{(Y_{\max} - Y_{\min})(x - X_{\min})}{X_{\max} - X_{\min}} & \text{for } X_{\min} \leq x \leq X_{\max} \\ Y_{\max} & \text{for } x \leq X_{\min} \end{cases} \quad (3.4)$$

The falling curve shape is described by the following functions:

$$Y(x) = \begin{cases} Y_{max} & \text{for } x \leq X_{min} \\ Y_{max} + \dfrac{(Y_{max} - Y_{min})(x - X_{min})}{X_{max} - X_{min}} & \text{for } x_{min} \leq x \leq X_{max} \\ Y_{min} & \text{for } x \leq X_{min} \end{cases} \quad (3.5)$$

Averaging the speed over a medium time window is the base for calculating the selection distances for the primary and secondary selection area. Typical values for the length of this time window lie in the range of 180 seconds. The selection angles depend on the average values of the changes of direction, which are calculated by a short time window. The used window lengths are normally about 30 seconds.

The parameterization of the following curve is to achieve that starting from the selected situation, the selection areas only include relevant objects. When the user moves, for example, with low average speed, normally a built-up surroundings can be assumed, which probably obstructs the visibility range by buildings or other obstructions. For that reason, a small selection area should be selected in this case. Further, normally, in such regions, a high density of information objects, such as places of interest, is present, so that when using a smaller selection area, there are still enough objects available for selection. At higher average speeds, normally, driving on a road or motorway can be assumed. Due to the lower object density, larger selection areas are useful here.

The following adaptation curves (FIGS. 21-24) show the criteria recommended in Nuria L. Juan: Specification, implementation and evaluation of an auto-adaptive dynamic parameterization mechanism for a universal mobile information system, Friedrich-Alexander Universität Erlangen-Nürnberg, August 2002 for the choice of selection distances starting from the selected situation and the average speed at the selected time window length of 180 seconds.

Figure 25:
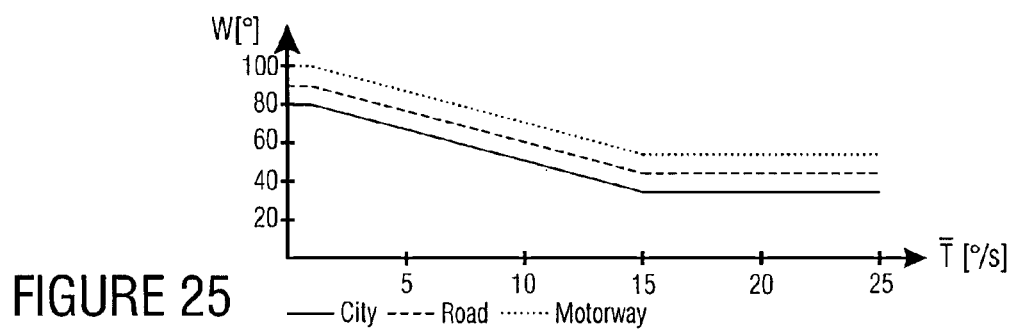
FIG. 25 is an adaptation of the upper opening angle of the primary selection area.
Figure 26:
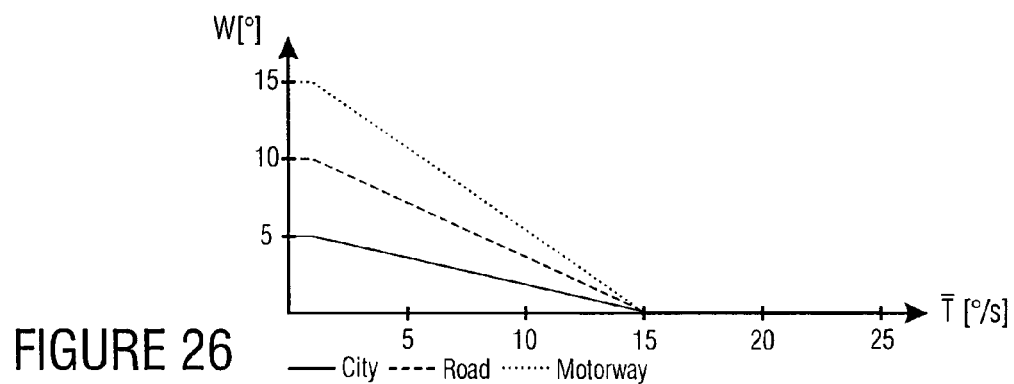
FIG. 26 is an adaptation of the lower opening angle of the primary selection area.
Figure 27:
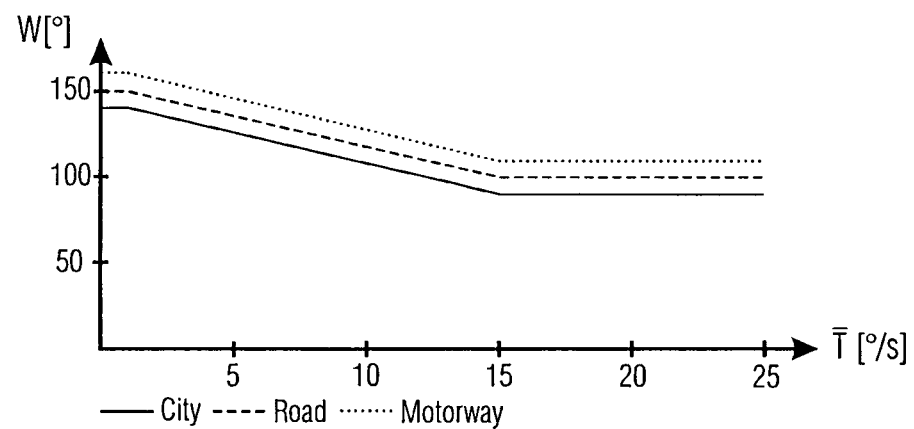
FIG. 27 is an adaptation of the upper opening angle of the secondary selection area.

The settings recommended in Nuria L. Juan: Specification, implementation and evaluation of an auto-adaptive dynamic parameterization mechanism for a universal mobile information system, Friedrich-Alexander Universität Erlangen-Nürnberg, August 2002 for the selection of the selection angles starting from the selected situation and the average values of the changes of direction at a selected time window length of 30 seconds are listed in the diagrams (FIGS. 25-27).

No adaptation occurs at the lower opening angle of the secondary selection area. This angle has the constant value zero.

The last step in dynamically adapting selection parameters is performed based on the object density in the selection area. The aim is to ensure that sufficient objects are available for selection for the system.

Figure 28:
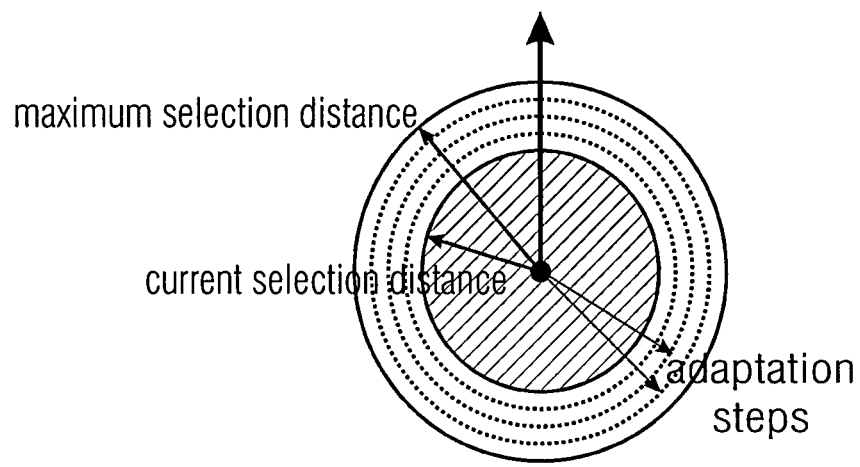
FIG. 28 is a successive adaptation of the selection removals according to the object density.

In this method, only the selection distances of the primary and the secondary selection area are increased step by step, until a minimum number or a fixed percentage of the registered objects is available. However, increasing these parameters is terminated when the fixed maximum values are achieved. The number of steps when increasing the distances can be adjusted in a flexible way (see FIG. 28).

Figure 29:
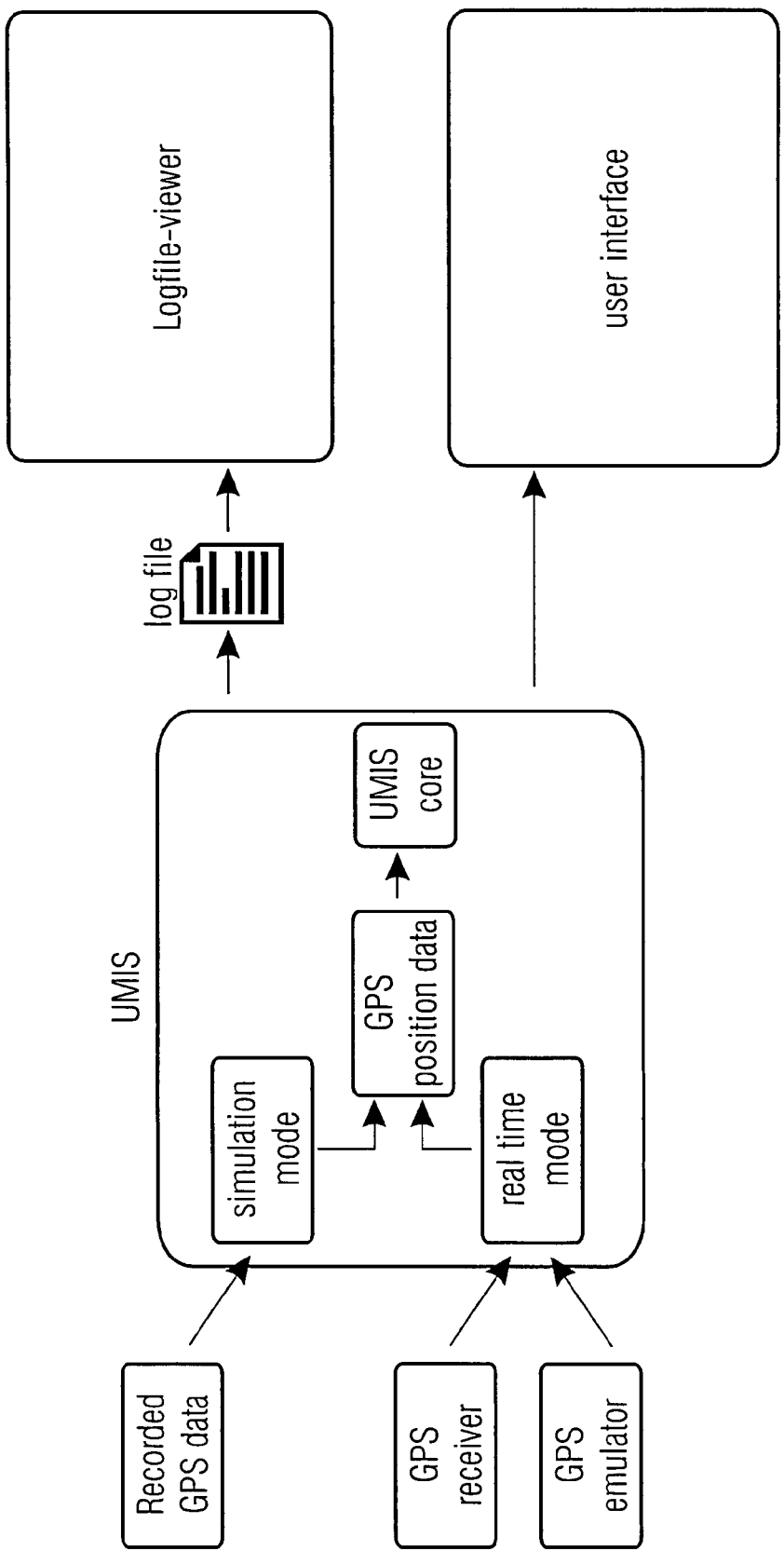
FIG. 29 is an overview over the test structure.

An overview over the basic test structure and the test process is shown in FIG. 29.

The present implementation of UMIS is able to receive GPS signals directly from an NMEA-compliant GPS receiver (e.g. of the brand "Garmin"). At the same time, there is the possibility to import position information by an integrated GPS simulation module, which allows the import of recorded or synthetically generated GPS signals on the lowest system level. The simulation is performed completely transparent for the residual UMIS system. In the real-time mode, there is further the possibility to pass GPS signals generated by a GPS emulator to the UMIS system via the respective interface. Both in the real-time mode and in the simulation mode, displaying information objects is performed unitarily via the corresponding output units, such as the user interface or the loudspeakers.

UMIS has a log mechanism for logging internal processes, decisions and system states. The data are stored in a text file for later evaluations. Then, the user has the possibility to view the contents of this log file with a normal text editor or to use the log file viewer. The log file viewer is a program illustrating the driven route and several other relevant information in a graphical way and allowing a later simulation of this drive. The next section deals in detail with the mode of operation of the log file viewer and further presents the updates developed within this paper.

Figure 30:
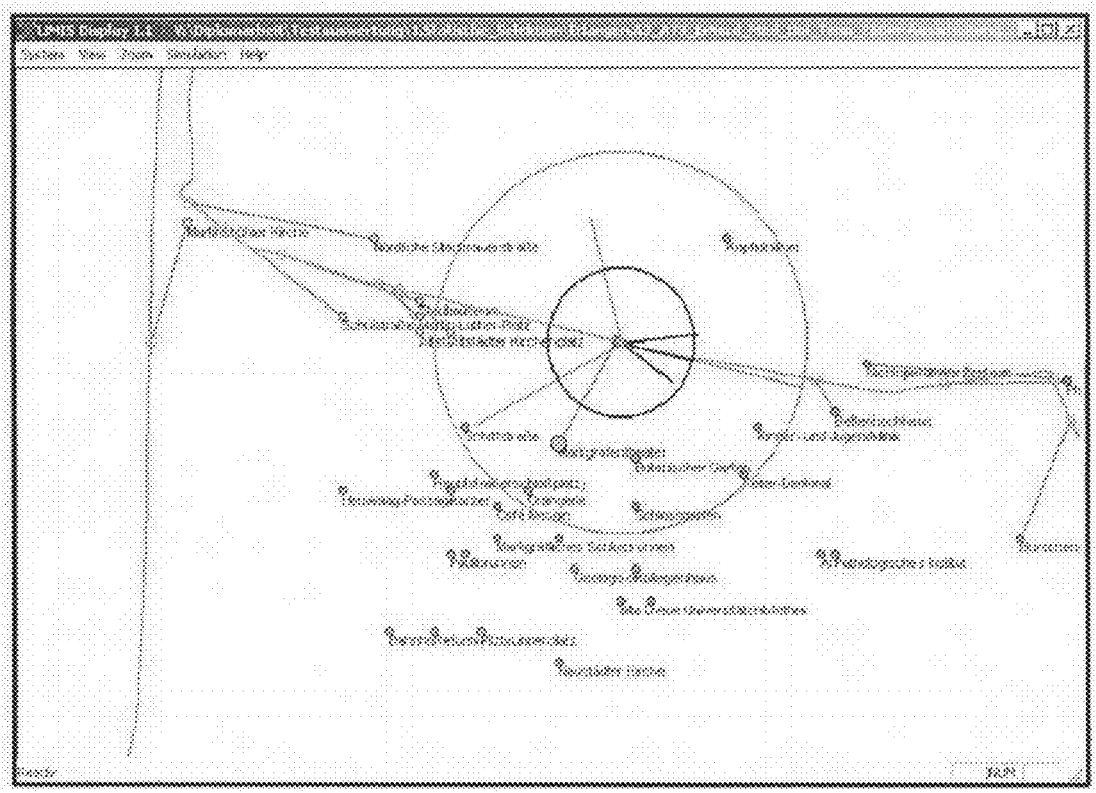
FIG. 30 is a user interface of the log file viewers during simulation.

The log file viewer allows to illustrate information of a log file in a graphical way, and to simulate the behavior of UMIS afterwards. The creation of the log file viewer resulted from the requirement to be able to reconstruct the behavior of the UMIS system. The most important characteristic is the simulation of an already recorded UMIS route. The temporal movement of the user can be simulated both in real time and in a faster speed. The adjustment of speed is partitioned in five stages, wherein the highest speed is the eightfold and the lowest stage half of the real-time speed. FIG. 30 shows the log file viewer in a simulation of an UMIS drive.

For representing the current user position, an error symbol is used, which additionally represents the current moving direction. Further, the primary and secondary selection areas are indicated. The selection distances are represented by circles around the user position and the selection angles by lines. The blue line shows the driven route, wherein the figure represents only part of the whole route. It is an enlarged sector. The log file viewer offers the possibility to enlarge or decrease a sector.

In the figure, small circles represent the locations of the information objects. Apart from the title given by the author of the information objects, the status is represented in a colored way. The yellow marked objects show, for example, the objects that have at least been selected once in the simulation. The green objects, on the other hand, are the objects not yet selected. The red information object is the current or the last selected object, respectively. Selection lines connect every objection position to the user position where the user was at the time of selecting the information object.

Figure 31:
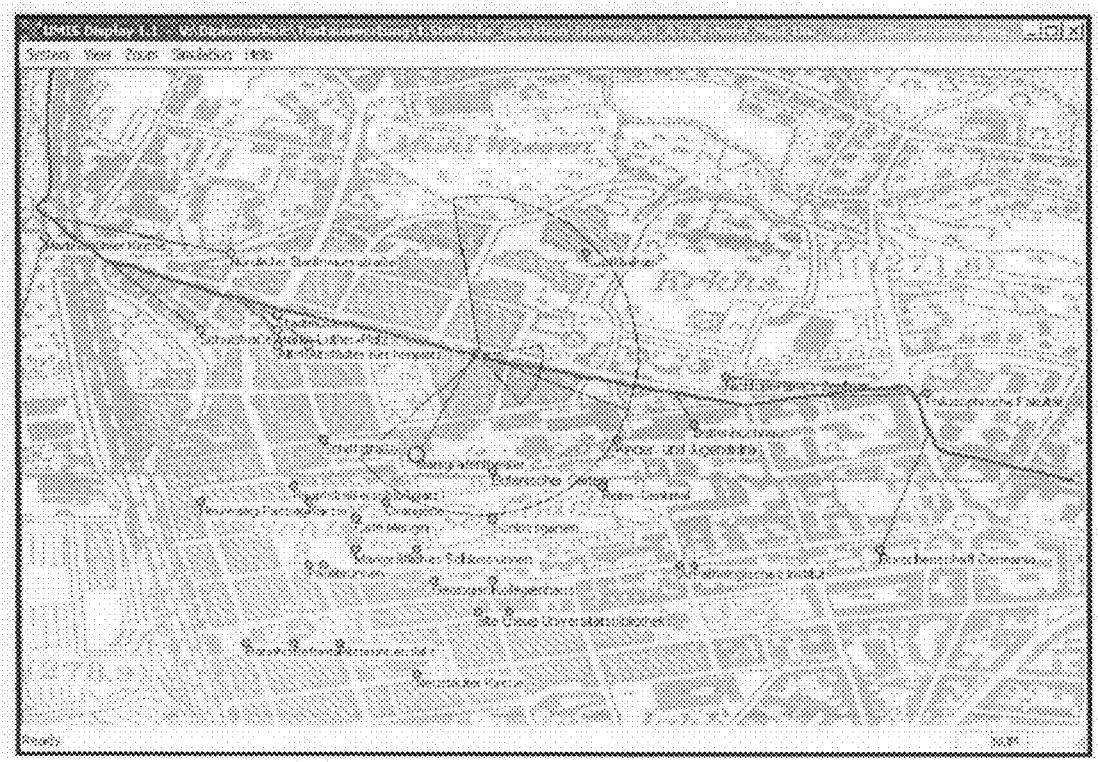
FIG. 31 is an extended user interface of the log file viewer with an improved graphical display and underlying road map.

For evaluating the previous selection method of UMIS, further extensions have been performed in the log file viewer. One improvement is, for example, the significantly more detailed and accurate representation of the primary and secondary selection areas, as can be seen in FIG. 31.

The new concept enables a better detection of these two areas. Further, it is now possible to read in certain digital map formats and represent those in combination with the previous information on the user interface. The read-in digital maps make it easier to arrange the objects, the user position and the whole driving route in a spatial manner.

During evaluation of the dynamical selection process, the previous log file viewer could not display the constantly changing geographical selection parameters, because the parameters of the selection areas where only read in once at the start of the program. For that reason, the log mechanism in UMIS has to be extended in that additionally to every user position, the corresponding selection areas are also logged. A corresponding adaptation in the log file viewer allows to readout and display these parameters from the log file written by UMIS. In the dynamical selection process, the detected situations, such as "city", "road" and "motorway" are represented in a colored way in the log file viewer, by marking the driving route according to the calculated situation in colored way.

In order to test the functionality of the system in different situations, several test routes have been fixed according to certain criteria at the beginning of the evaluation operation. These test routes are to represent a large part of the possible types of surroundings or situations, respectively, in which the user of UMIS can be.

In the following, the used routes are illustrated and their specific characteristics are listed.

Test Route Erlangen

The city of Erlangen has been selected for performing several test drives due to the favorable position to the Fraunhofer Institute. A further advantage are the digital maps of the city of Erlangen and surroundings provided by the Land Survey Office of Bavaria (Landesvermessungsamt Bayern), which are characterized by their accuracy (1:25,000) compared to other used maps. The city of Erlangen has both a typical old town area with the associated small little roads as well as the typical characteristics of a large city, such as multilane roads. Further, the city has a motorway passing in the immediate vicinity as well as further major and country roads.

Test Route Munich

The city of Munich represents a typical city having more than 1,000,000 inhabitants. The multilane highways within the city as well as large building complexes shape the cityscape. Here, the visibility range offered to the user as well as the moving speed are varied.

Test Route Fränkische Schweiz

This region offers several aspects that make it perfect for the selection as test region. It is a holiday region in Bavaria having a plurality of sights. The region lies in the triangle of the cities Bamberg, Bayreuth, Erlangen. The main road through the core region of the Fränkische Schweiz is selected as test route. The Fränkische Schweiz is a typical low mountain range landscape with small valleys, heights and winding roads.

Test Route Motorway A73

The A73 between Bamberg and Erlangen has been chosen as motorway test route, since the same also offers itself due to the immediate vicinity. A drive on the motorway is characterized by high average speeds and rare turning processes.

The following section describes the results and impressions gained by the practical and simulated UMIS drives. They are the basis for the later developed optimization approaches and new concepts for object selection. The presentation of the gained findings is divided in four sections. First, the results of the geographical selection process with statical selection parameters are presented. Then, the test results of the geographical selection based on dynamical selection parameters are presented. After testing the statical and dynamical selection process, several weak points of the existing UMIS system with regard to the selection are discussed, which are partly based on subjective impressions. Finally, a critical discussion of the internal geographical object management follows.

Figure 32:
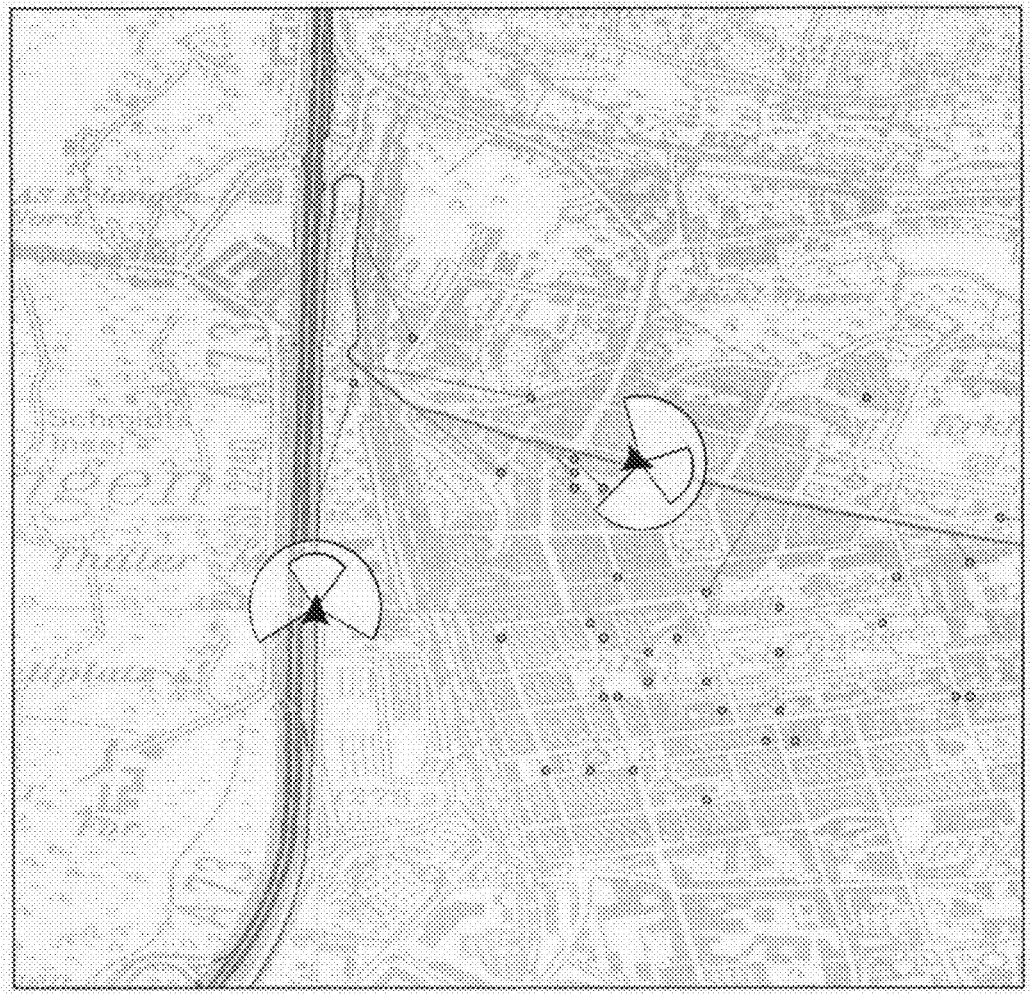
FIG. 32 is geographical selection areas in the statical selection process.

In the statical selection process in the conventional UMIS system, the geographical selection parameters are only read in at the system start. These parameters cannot be changed or adapted during the whole drive. The serious disadvantage of this method is that prior to the drive the destination area as well as the position of the object should be known in order to optimally set these parameters. In the last section, parameter settings optimized for different situation types have already been presented. The described problem will be illustrated in the following FIG. 32.

The figure shows the section of a test drive in Erlangen with different user positions, where the selection area can be seen. The lines connect the geographical position of an object (represented by a point) with the position where the selection was made. Prior to the drive, a small selection area has been selected, which had been optimized for a drive within the city. However, at the beginning of the drive, the user is on the motorway, where a large selection area should be set. During the drive to the city, those objects were displayed that are within the selection area adapted for this situation. When leaving the inner city area, the selection parameters were again too small and thus not adequate for the situation.

There are two possibilities in such cases. One possibility is a regular restart of the system with the selection parameters suitable for the current situation. However, this solution contradicts the basic idea of the UMIS system, which intends to reduce the user interactions to a minimum. A further possibility is that the user maintains the current parameters during the whole drive. However, this measure leads to unacceptable and unsuitable selection results. For example, during a motorway drive, a user will hardly get any object displays with a small selection area optimized for the city, since normally no sights or other information objects are in the immediate vicinity of motorways. A general selection of a large selection area provides also unfavorable selection results, since, for example, in the city, objects from a large distance or even outside the city might be selected.

In the dynamical selection process, the geographical selection parameters are to be adapted automatically corresponding to the situation of the user. This idea is to remove weak points of the statical selection process determined in the last section.

The adaptation of the geographical parameters is performed in two steps by the adaptation module. In a first step, the intention is to determine the current situation of the user based on specific moving characteristics of the drive. Thereby, a difference is made between the already mentioned three situations (city, road, motorway). Then, starting from the determined situation, the geographical parameters are adapted based on parameterized adaptation functions.

During evaluation, first, the situation determination had been tested. Then, the dynamical parameter adaptation and the selection results were checked.

Determining the situation of the surroundings is performed based on specific moving characteristics, which are continuously calculated from the determined data of the drive. A long-time window is used in the calculation of the average values. The moving characteristics used for determining the driving situation are the speed, the stop duration as well as the stop frequency.

Figure 33:
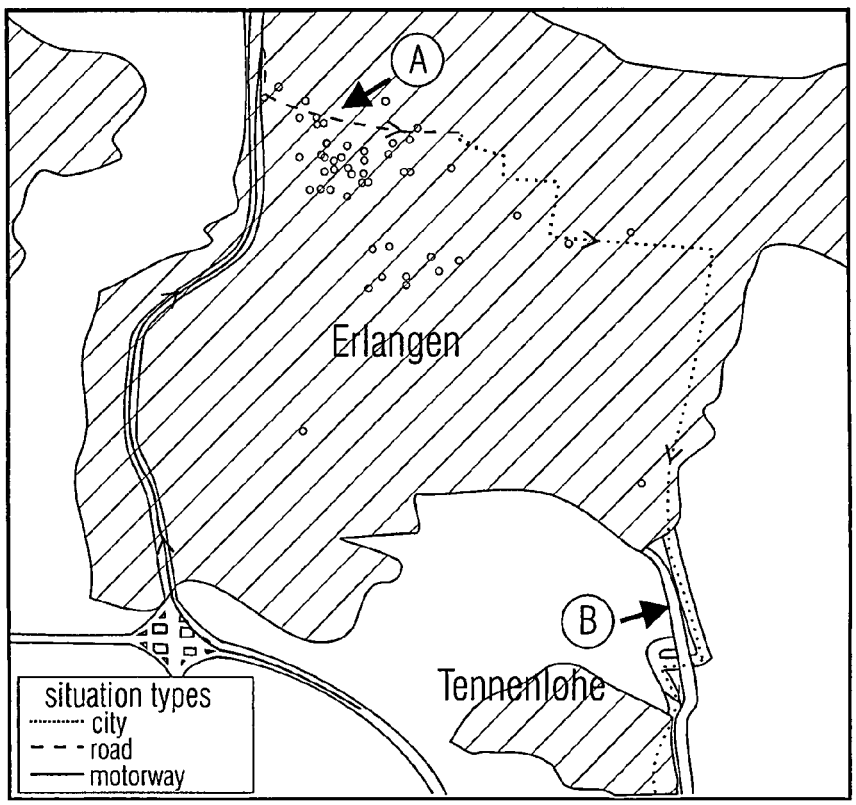
FIG. 33 is a situation determination with a long-time window of 600 seconds.

FIG. 33 shows a test drive in Erlangen. The test route is marked in a colored way corresponding to the determined situation. The blue color characterizes the situation type motorway, the green color the situation type road and the routes marked in red the situation type city. In this way, an illustrative overview over the reliability of the situation determination can be obtained. First, the value of 10 minutes used up to now had been chosen as long-time window, which had been determined during the development of the adaptation module within a thesis. Further, the following average values for situation determination, which had been determined from several test drives, have been recommended in this thesis.

Long-Time Window 600 Seconds:

It can be seen in FIG. 33 that the adaptation module erroneously detects the situation type road during the drive within the city for a longer time period after leaving the motorway. This area is indicated as area A in the illustration. The further drive within a city is correctly detected as situation type city. The inertia of the situation determination is so high that the area B, which lies outside the city and where partly a speed limit of 80 km/h applies, is still determined as city.

These results with a window length of 10 minutes showed an inert behavior in the situation determination. This inertia occurs in both directions, this means both the transition from a fast to a slow situation type and vice versa is always performed with a slight delay. Detection of the situation type city should take place with a delay as low as possible, so that no objects that are far away are selected in these surroundings, although relevant information objects might be in the immediate vicinity.

Figure 34:
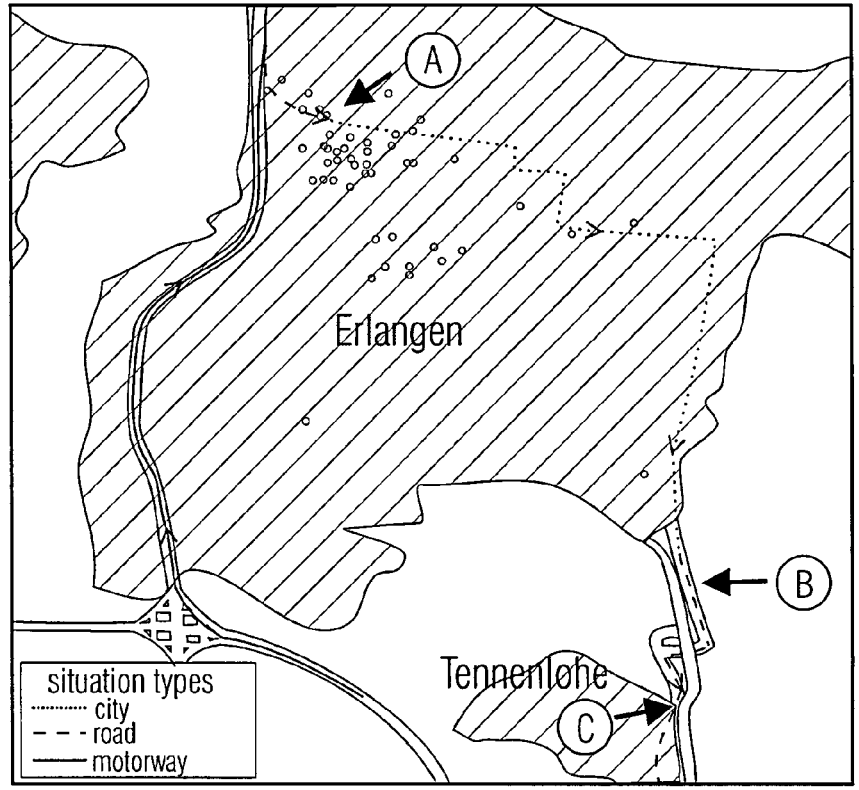
FIG. 34 is a situation determination with a long-time window of 300 seconds.

Long-Time Window 300 Seconds:

For performing a faster situation detection, the long-time window has been reduced to half the time. The result is shown in FIG. 34. A comparison with the previous FIG. 33 shows the significant improvements resulting by the smaller time window of 5 minutes. A significantly faster adaptation to the current situation results. However, due to the evaluation of the long-time window, a certain delay remains. The correct detection of the situation type city, after leaving the motorway for example, has been significantly increased, which is indicated in FIG. 34 by the area A. Leaving the city is detected properly with this window length, which can be seen in the area B. In the area C the detection was too slow. Here, driving into a city area could not be detected as such. The behavior of the adaptation module can be explained in that it detects a lower average speed when driving through the city, but the average values for the stop duration and stop frequency do not increase because the user did not have to stop at any time.

Long-Time Window 180 Seconds:

The too slow detection of the city is particularly objectionable. If, erroneously, a fast situation (road or motorway) is selected in a city, objects of a large distance are also selected, due to the large selection area. However, within a city, the user should only be presented with objects in his immediate vicinity, so that the user has the possibility to visually detect the object presented to him.

Figure 35:
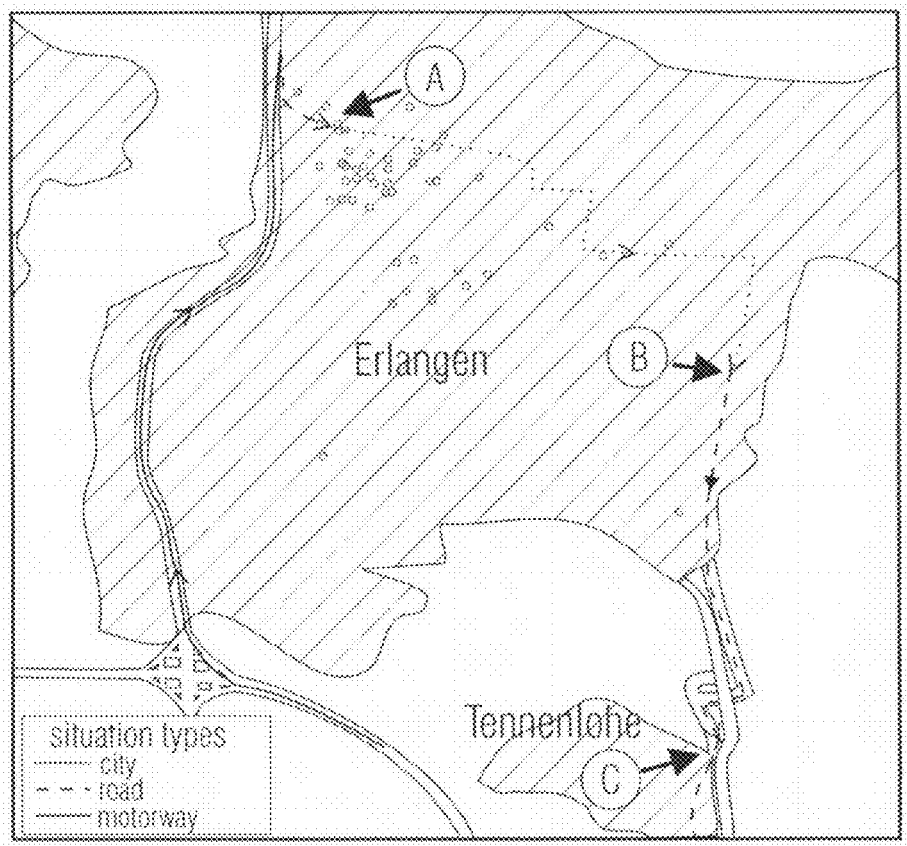
FIG. 35 is a situation determination with a long-time window of 180 seconds.

When leaving the motorway and during the subsequent drive into the city area, the situation type city is only detected slightly faster than when using the time window having the length of 300 seconds (FIG. 35). However, the transition from the situation type city to the situation type road in the area B was too fast, since in this area, the user is in the city area and moves with a maximum speed of 60 km/h. Analogously to the results with the window length of 300 seconds, the city area is not detected as such in the area C.

Figure 36:
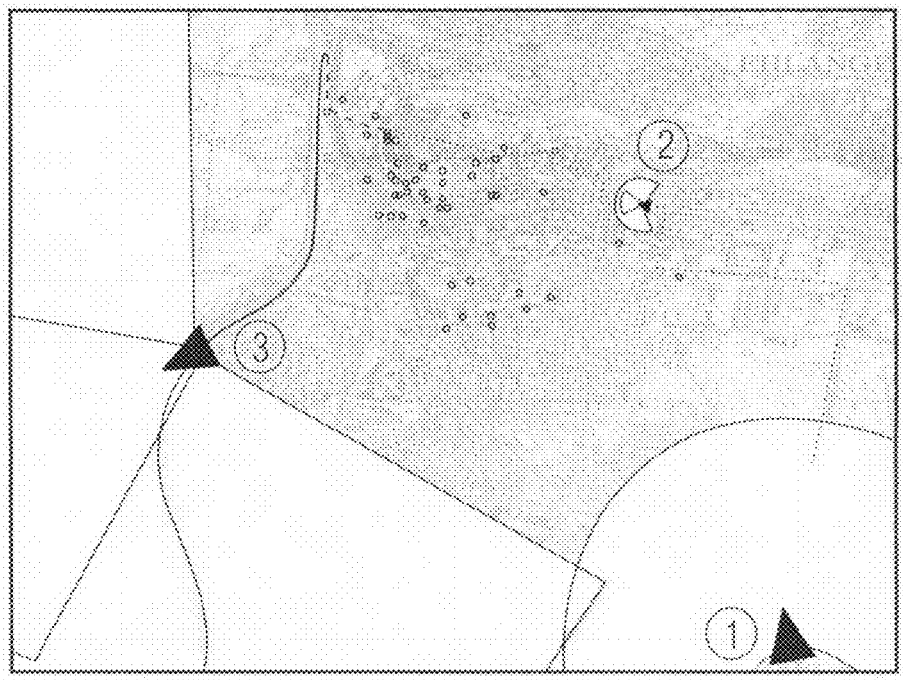
FIG. 36 is geographical selection areas in the dynamic selection process.

The second step in dynamical object selection after the situation determination is the adaptation of the geographical selection parameters based on parameterized adaptation functions. FIG. 36 shows a test drive with dynamical parameter adaptation. For a better illustration of the functionality, the user position and the associated selection area have been exemplarily represented for one situation. The first user position (1) shows the selection area for the situation type road. In the city, the adaptation module detects the situation type city based on the specific moving characteristics. The next user position (2) shows the dimensions of the section area resulting for this situation. The last section of the test drive is on the motorway. After detecting the situation motorway, the selection parameters are adapted correspondingly, as can be seen based on the last user position (3). The large selection area for the situation types motorway and road represented a serious problem for drives close to a city. Due to the selection distances of several kilometers, many objects that are actually intended for display in a city are already selected outside the city.

Figure 37:
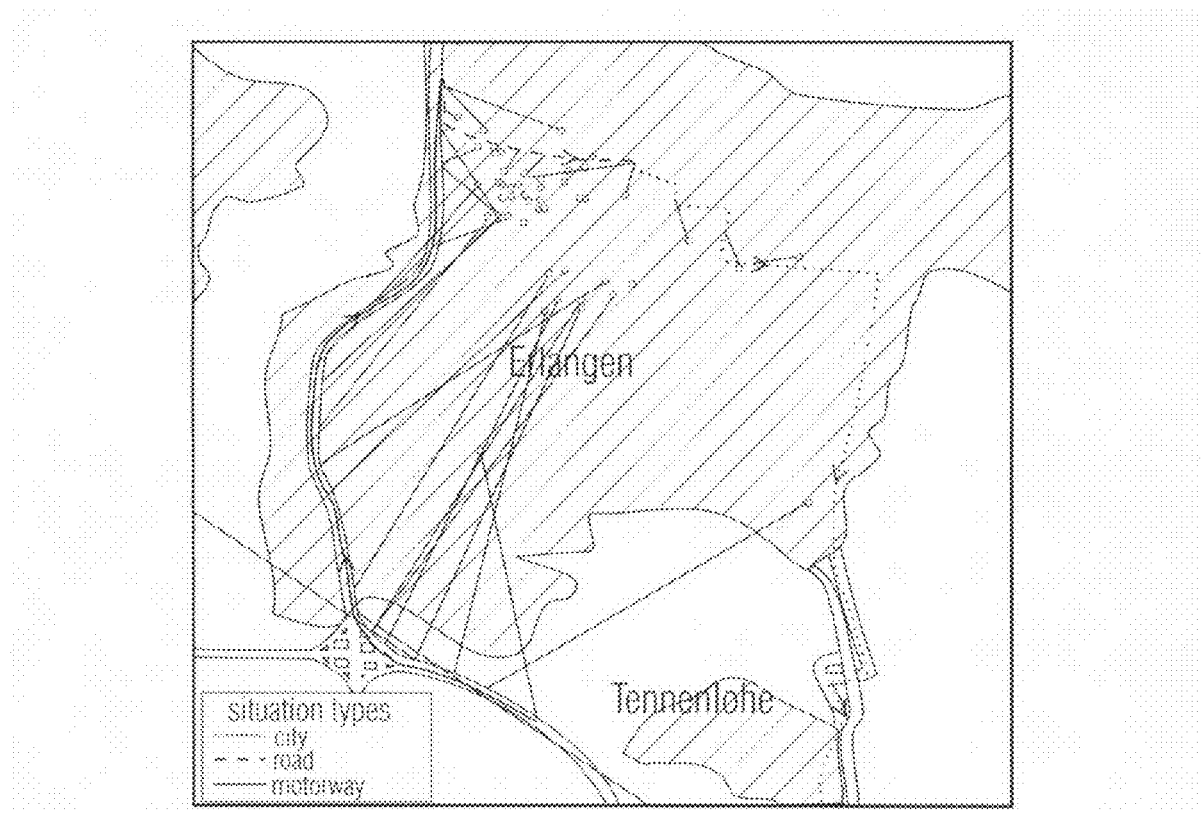
FIG. 37 is a selection of the objects with dynamic selection parameters.

FIG. 37 illustrates the described problem. It shows a test drive in Erlangen, where the user drives into the city via the motorway. While the user is on the motorway, objects from the city are selected and displayed continuously. The selection of an object is illustrated by selection lines connecting the object position to the position where the selection is made. This selection behavior has two significant disadvantages. One disadvantage is the inundation of the user with numerous object displays. Many information objects and their multimedia content are intended for display in the immediate vicinity. A further disadvantage is the repeated selection and display of an object that has already been selected from the motorway situation, and is not available for repeated selection, although the UMIS user is directly in front of this object. Objects are not available for a repeated selection when the specified repetition number has been reached.

The described problem does not only occur in cities. Generally, it turned out that a selection from a large distance is not desirable for many information objects.

Within this thesis, the UMIS system was also to be tested for a usage as pedestrian. Due to porting for UMIS for the operating system Windows CE, which is now available, it is now possible to use the system with a PDA as hardware platform.

The situation types for dynamical parameter adaptation when used in the adaptation module using UMIS when moving as pedestrian or with very low speeds, have partly shown to be unsuitable. The main problem resulted due to wrong direction indications, when the user changed his direction in short intervals, when he moved slowly (approximately 0 to 1.5 km/h), or not at all. The used selection distances were not always suitable for a clear display, since the selection areas were too large. For a clear display of the information objects, the selection areas should be chosen such that the displayed objects are in immediate proximity or visibility range, respectively.

In the previous selection methods, the specific character and geographical surroundings of an information object were not considered. The information objects are only described by their position. First, based on several selected examples, it will be shown that the previous geographical object description merely by longitude and latitude cannot guarantee a specific and clear display for all objects. Further, the problem of unpositioned objects will be discussed, which have no position but still, in certain cases, require specific display. This problem is to be illustrated below in more detail based on examples.

Information objects, such as buildings, do sometimes differ greatly in their dimensions. The different spatial dimensions have the effect that several information objects are already visible from a further distance. When generating the description file, the author has no possibility to define the visibility range of an object in the description. Based on an example, this problem will be clearly illustrated.

Figure 38:
FIG. 38 is objects in Munich with different visibility ranges, Olympic Tower (left) and small cinema with café (right)

In the test drives in Munich, the problem of different visibility ranges of objects has become particularly clear. The Olympic Tower, seen in FIG. 38, is a good example for an object that can be seen from a far distance. Further, a small shop in Munich is shown in the figure, which is, in contrary to the Olympic Tower, only visible for the user when he is in the immediate vicinity.

A further problem limiting a clear presentation of the objects are view obstructions, which partly or fully prevent a free view of the information object from the current position of the user. When displaying several objects, the author assumes that the user can see the object and generates the content of the display based on this assumption.

Figure 39:
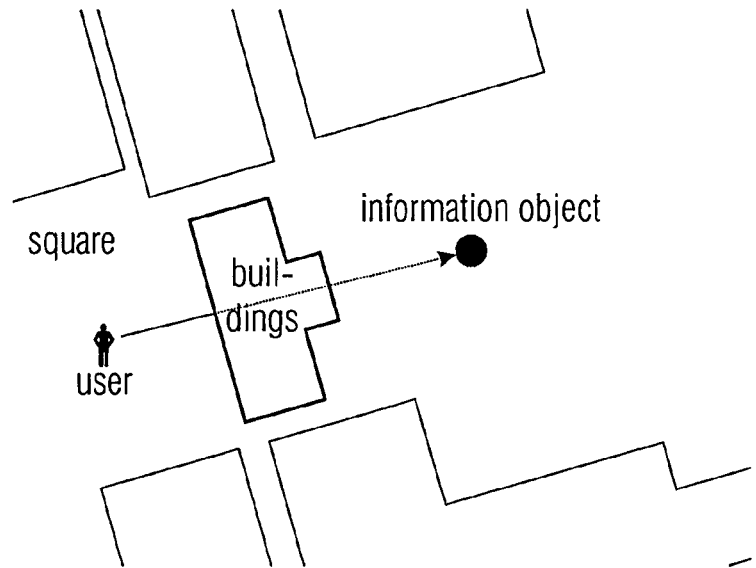
FIG. 39 is view obstructions in front of the information object.

In the following, an example is shown where the author assumes that the user has free view on the object and is in the immediate vicinity. The information object is, for example, the fountain in the castle garden of the city of Erlangen. FIG. 39 shows the corresponding test situation, where the user is close to the information object, but a building obstructs his view to the fountain.

Apart from the objects with clear position indication, there are information objects having no defined location. These are called "unpositioned objects". They are used, for example, for the display of general information or interlude music. A further field of application is the display of regional information that is relevant for a defined area but cannot be associated exactly to a position. The problem with using an unpositioned object as regional information is the specific display of the contribution in the relevant area. In the previous selection process, there was no possibility to display the selection of regional information in a specific way.

Based on the test route in "Fränkische Schweiz" some of the several problematic points will be shown:

Apart from the "positioned" objects, regional information exist for the region of "Fränkische Schweiz", which is present as "unpositioned object". This regional information serves to give the user general information about the Fränkische Schweiz before he moves into the region. For the specific announcement of this unpositioned information with the existing selection routines, the method described below will be used, which, however, represents an unsatisfying solution. In this method, first, all information objects of "Fränkische Schweiz" are stored in a file folder. Then, the user has to select this folder in UMIS and then start UMIS before he drives into the respective region. In this case, the regional information would be displayed immediately after starting the UMIS system, if no positioned object is in the selection area. This solution has several fundamental disadvantages. The basic idea of the system that the required user interactions are reduced to a minimum is not given here. The requirement that the user selects the file folder including the objects in his surroundings depending on his location, makes the system unattractive and inflexible for the user.

An important field of usage of UMIS is the support of sightseeing tours along fixed predetermined routes, where the author wants to determine the order of object displays as far as possible. Determining this order is established, however, only by the geographical position of the information objects and is limited in many situations. One example herefore is the usage of UMIS as a digital tour guide on a passenger ship of the Salzburg shipping company. For this sightseeing tour, the UMIS system has to be started again with a new set of data prior to the return journey, since otherwise objects determined for display on the return journey would already be displayed on the journey there.

The selection method with statical selection parameters has been proven as too inflexible in the test drives performed within this thesis. In this method, the current situation of the surroundings is not considered in the selection of the selection areas. Thus, the statical selection parameters lead to unsatisfying results in the geographical selection.

The extended selection method with dynamical selection parameters considers the current situation of the surroundings to adapt the geographical selection areas. The evaluation showed that the determination of the situation of the surroundings is the critical factor in dynamical parameter adaptation. Using average values when calculating moving characteristics caused an inert situation detection. In many cases, the inert situation detection had the effect, for example, of using selection areas that were too large. Since the clear display of information objects is in most cases only given in the immediate vicinity of the object, the selection of too large selection areas should definitively be avoided. The dynamical adaptation of the selection parameters has shown to be satisfying with correct situation detection.

Based on several exemplary situations, it has been shown that the mere description by geographical longitudes and latitudes is not sufficient for a clear display of information objects. For that reason, the previous geographical selection method cannot fulfill this requirement in certain cases.

For clear display, consideration of immediate surroundings, the visibility range and the spatial dimensions of the information objects is required. The insights gained in this section will be used in the next section to expand the geographical selection process in that way.

When evaluating the mode of operation of the adaptation module, mainly three problems occurred.

One problem is the reliable determination of the current situation of the surroundings of the user, which is significant for the following adaptation steps. Further, in large selection areas, objects, which are actually determined for a selection in the immediate vicinity, are selected from a large distance. Thereby, clear display is prevented. A further problem is the missing pedestrian situation. In the following, the optimization approaches for the mentioned problems will be presented.

When determining the current situation of the surroundings (city, road, motorway), three specific moving characteristics are used. The unit in the Physical Adaptation Module responsible therefore compares in which situation the calculated moving characteristics fulfill the most criteria. The situation type with the most matches is selected as the current situation.

In the evaluation test drives, the average values of speed, stop duration and stop frequency have been used for situation determination. The results showed that a reliable determination of the situation is only possible in a limited way based on these parameters. For that reason, several new approaches are to be presented, which allow a potential improvement of the situation detection.

Figure 40:
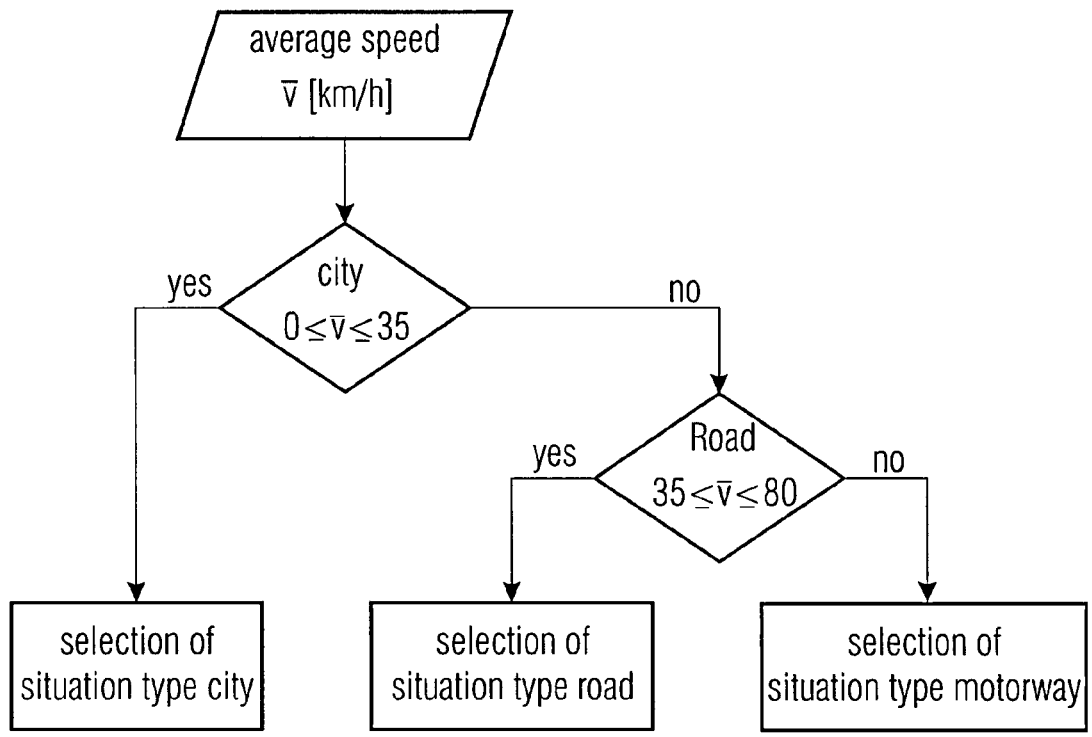
FIG. 40 is a situation determination based on the average speed.

As has already been determined, selection areas that are too large have to be avoided. In the previous situation determination, a drive into a city could not be detected as situation type city, as long as the user moves continuously without any stop processes. The missing elements stop frequency and stop duration exclude the situation type city in such cases. Thus, the following approach uses only the average speed and would cause here a faster detection of the "safer" small selection areas. The basic process is shown in FIG. 40. As soon as a new value for the average speed is present, first, it is tested whether this value lies between the minimum and maximum average speed for the situation type city (smallest selection areas). If the value lies in this range, this situation is assumed. If the value of the average speed does not lie within this range, it is checked in a next step, whether the value lies between the minimum and maximum value of the situation type road (medium selection area). If this condition is fulfilled, this situation is selected, otherwise the situation type motorway (large selection areas).

Figure 41:
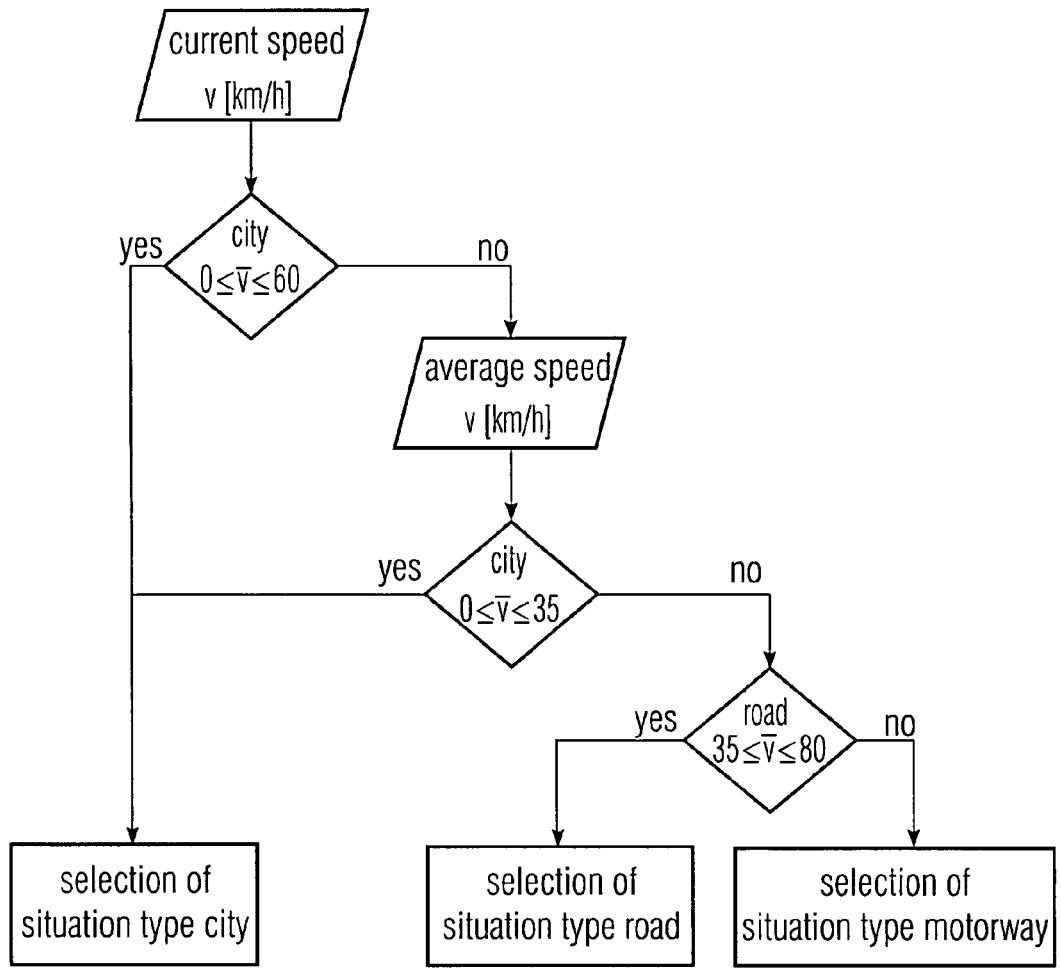
FIG. 41 is a situation determination based on the current and average speed.

The approach presented in the last section uses the average speed as single criterion for situation determination. This causes a relatively inert situation determination. By decreasing the time window, this inertia can be avoided, but in this case, the sensitivity of the situation determination to short-time speed variations is increased. Thus, for the following approach, for reliably determining the situation type city, apart from the average speed, the current speed is also considered. Here, the fact is used that for example in cities or generally in inhabitant regions where the situation type city is desired, low speed is mandatory. The associated flow diagram is illustrated in FIG. 41. The parameter values are exemplary values that have to be adapted correspondingly in the following evaluation.

The approach from the last section allows a fast situation detection of the situation type city from a "fast" situation. In a transition from the situation type city to a "faster" situation, increased inertia is desirable.

Figure 42:
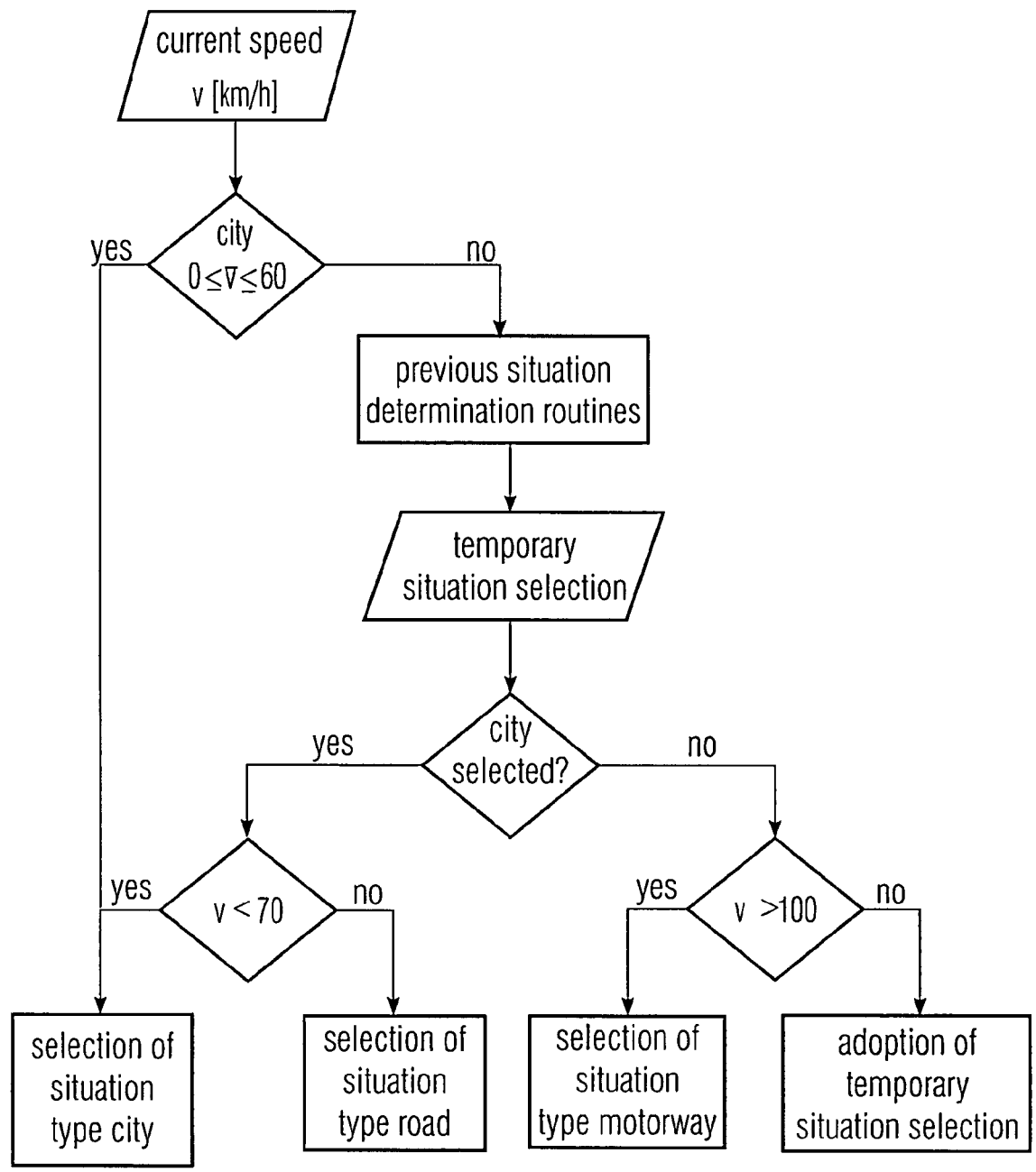
FIG. 42 is a situation determination based on the previous selection routines by using the current speed.

Thus, in the following approach, a combination of the previous situation determination with the additional usage of the current speed is used. This approach has the advantage that the situation type city can be quickly detected and still, when leaving the city the situation type road or motorway is not immediately selected, due to the inertia of the situation detection. When using the current speed, further limiting values can be introduced for the situation determination. FIG. 42 shows an extended approach basically divided into three steps. The first step consists of checking whether the current speed lies within the limiting values of the situation type city. When this condition is fulfilled, this situation type is immediately selected. If the limiting value does not lie within this range, the determination of the situation is performed with the previous selection routines, as has already been described. After this temporary situation selection, in the last step, the common speed limits of the three situation types are checked in order to reduce the inertia of the previous method.

As has already been indicated, the situation types for dynamical parameter adaptation used in the adaptation module are partly unsuitable when using UMIS as pedestrian or at very low speeds.

The main problem results from the wrong direction indications, when the user changes his direction in short intervals, moves slowly (approximately 0 to 1.5 km/h) or not at all. In those cases, direction announcements by the UMIS system should be suppressed, since the accuracy of these announcements cannot be ensured. Further, the selection area should be decreased, such that only objects within the visibility range or within the range of the user, respectively, are selected for a clear display.

Therefore, in this thesis, the adaptation module has been expanded by the situation type pedestrian. In the following, the individual adaptation steps for this new function type are presented.

Using the average stop duration or stop frequency as moving characteristic is not practical for determining this situation type, since the behavior of a pedestrian can be different. Due to the very low moving speed of a pedestrian, which is normally below 6 km/h, only the current speed is considered when detecting the situation.

The adaptation curves used for adaptation were parameterized correspondingly based on the results from the evaluation gained in this thesis.

Upper and Lower Selection Distances of the Primary Selection Area

Figure 43:
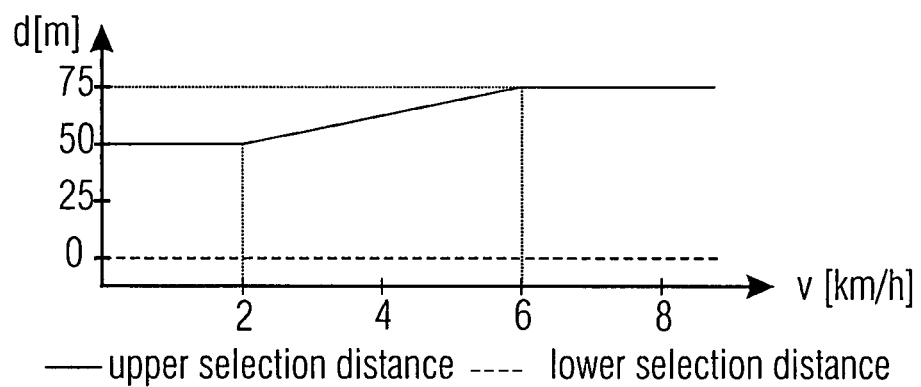
FIG. 43 is upper and lower selection removals of the primary selection area for the situation type pedestrian.

The curve in FIG. 43 shows the adaptation of the selection distance of the primary selection area. The upper selection distance lies between 50 and 75 meters. At speeds below 2 km/h, the direction indications provided by the GPS receiver are unreliable. Thus, due to the missing direction indication, only objects in the immediate vicinity or visibility range, respectively, of the user should be selected. At a speed above 2 km/h, the selection distance is increased. The lower selection distance lies constantly at zero.

Upper and Lower Selection Distances of the Secondary Selection Area

Figure 44:
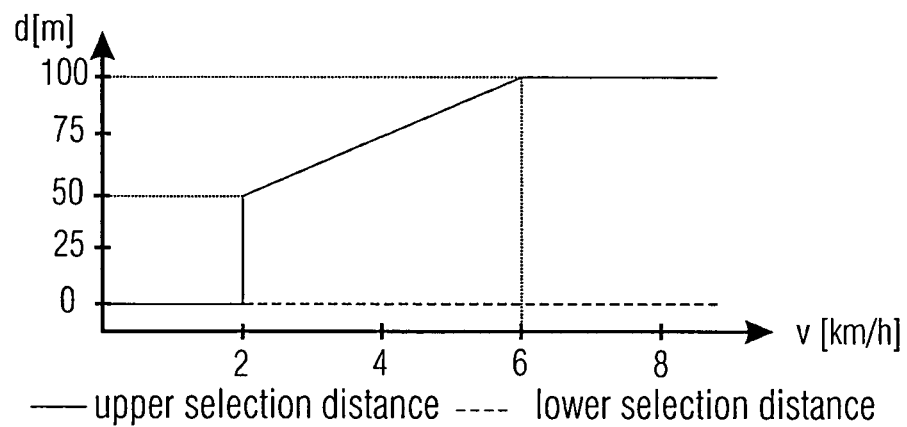
FIG. 44 is upper and lower selection removals of the secondary selection area for the situation type pedestrian.

The curve in FIG. 44 shows the lower and upper selection distance of the secondary selection area. At a speed below 2 km/h, the secondary area is no longer used. Below this speed, the direction announcements provided by the GPS receiver are not reliable. For that reason, objects that are not in the immediate vicinity, which means in the primary selection area, can hardly be localized without direction indication. Thereby, only objects in the primary selection area are considered. If the user moves with a speed above 2 km/h, the selection distance is increased.

Selection Angle

The selection angles play a minor role during adaptation within the situation type pedestrian. In this situation, there is no requirement to limit the selection area by a selection angle. The user walking on foot can stop any time without any problem and look at the information object in the announced direction. At low speeds below 2 km/h, the selection angles cannot be evaluated due to the missing direction indications.

The main problem in the previous dynamical object selection was the selection of information objects, which were determined for display in immediate vicinity, from a larger distance. The two resulting disadvantages are the inundation of the user with numerous object displays and the missing display of objects that have already been announced when the user approaches the same later directly.

Figures 45, 46:
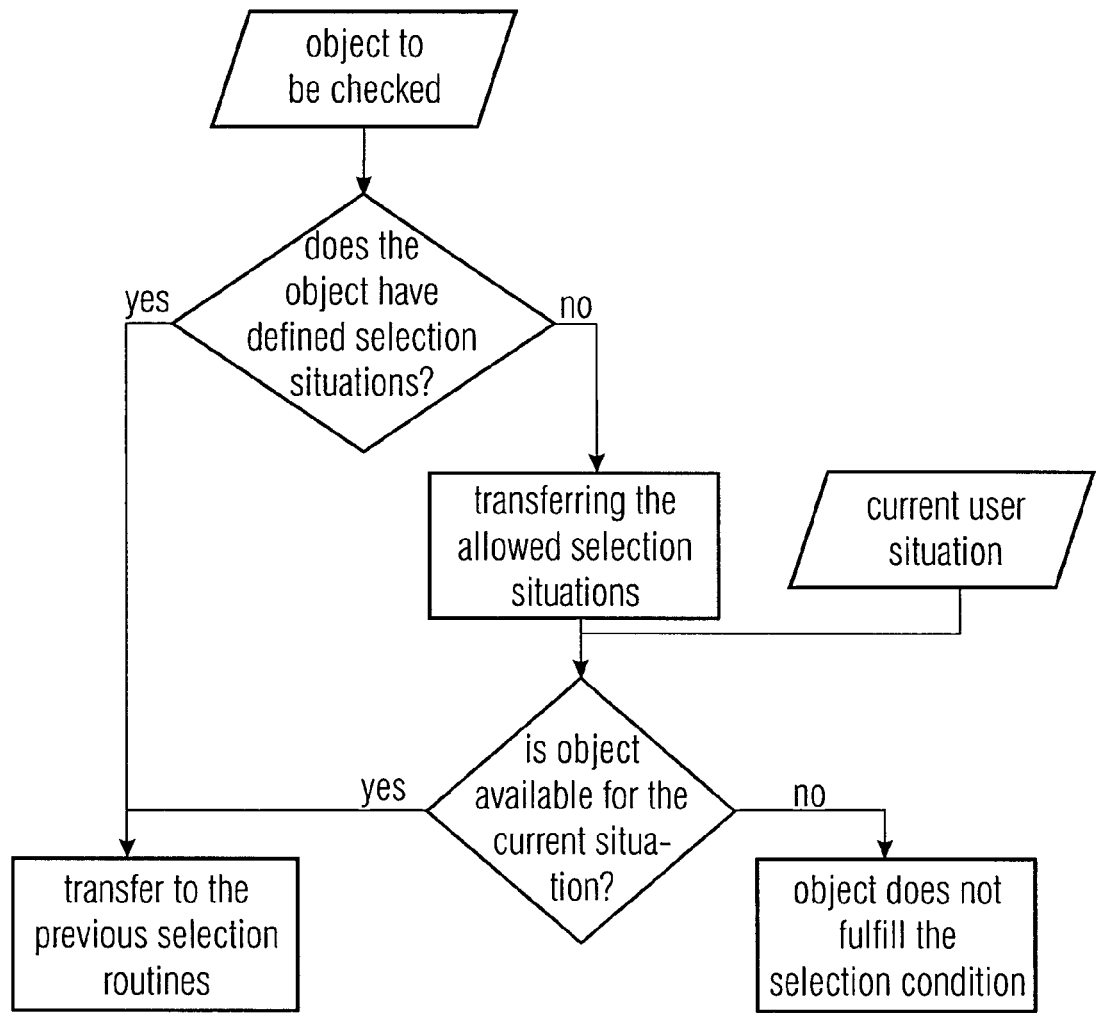
FIG. 45 is an exemplary entry for the situation-dependent selection (highlighted in black)
FIG. 46 is a flow diagram of the extended selection routine for the situation-dependent selection.

An extension of the object description file and a corresponding adaptation of the selection routine eliminate this problem. The new principle allows the author to define the situation types that are available for selection of the object. The possible situations are motorway, road, city and the newly introduced situation type pedestrian. The data field containing these indications has the name situation followed by the English names for the allowable situation types. The listed situation types are each separated by a comma. FIG. 45 shows the corresponding data field of a description file of a object that can only be selected from the situations city or pedestrian.

The course of the geographical object selection modified in this thesis is illustrated in FIG. 46.

Information objects having no explicitly defined selection situations are processed as before by the selection routine, and can thus be selected in any situation. This extension does not only eliminate the above-mentioned problems but accelerates the selection process in certain cases. An object, which is not available for the current situation, can already be detected as such after the first selection step, and unnecessary further requests are avoided. Thus, a significant reduction of the calculation time is possible in certain situations.

A new approach allowing a vital improvement in the geographical selection by introducing object-dependent selection areas will be presented in the following section. The necessity of a new concept generating precise selection of objects has been shown when evaluating different situations.

In a first step, the motivation is presented based on a short review of the evaluation results. Then, requirements to the new concept are listed. The principle prepared based on the requirements and the mode of operation will then be described. One section describes the implementation of the concept and the corresponding algorithms. Then, a combination between the previous and the new selection routine is discussed.

The geographical description of an information object only based on its geographical position has shown to be insufficient during the test drives and simulations performed within this thesis. It has been shown that a defined object-dependent relevance area is useful for many information objects. This is an area where the selection of an object is allowed. The motivations are manifold. The following list repeats the most important findings of the evaluation:

Different Selection Distances for Objects
Information objects, such as buildings, have different dimensions. In the previous system, the author has no possibility to define different visibility ranges or distances, respectively, from which an object can be selected. The Olympic Tower in Munich, for example, is only described based on its position, just like a restaurant in a small side street.

Announcements of Objects when they are Visible for the User
Particularly in the inner city area, an illustrative display of information objects is normally given when the objects are visible for the user during the display. For several objects, the author of the description file takes this for granted and correspondingly generates the content of the display. However, in a city, unobstructed view is in most cases given only partly or not at all due to view obstructions, such as buildings.

Specific Announcement of Regional Information
A further problem is the specific announcement of regional information. This information is relevant for a larger but well-defined area and should be displayed for that reason as soon as the user is within this region. The previous realization as positioned or unpositioned object is not suitable for this type of information. While positioned objects are displayed in a locally very limited area, the display of unpositioned objects is both temporally and spatially undefined.

Determining the Display Sequence
An important field of usage of UMIS is the support of sightseeing tours along fixed predetermined routes, where the author wants to fix the order of object displays as far as possible. However, determining this order is only established by the geographical position of the information objects and is limited in many situations. Based on the example of Salzburg, where UMIS is used as virtual travel companion on a passenger ship, the basic difficulties became clear. For this sightseeing tour, the UMIS system has to be started again with a new set of data prior to the return journey.

The previous geographical selection is only established in relation to the user, in dependence on position, direction and speed. The new method allows the author of the information objects to individually limit the area in which the object can be selected. For that reason, the object-dependent relevance areas are introduced. If an object-dependent relevance area is defined for an object, the following conditions will apply for the geographical selection:

First, the object has to be selected according to the current user position. This condition corresponds to the previous geographical selection.

Additionally, the user has to be in the object-dependent relevance area defined by the author of the information object. If this condition is not fulfilled, no selection will be made.

This section presents the detailed requirements to the new concept of object-dependent relevance areas. The requirements were mainly developed based on the results of the evaluations.

In the following, an overview over the specific requirements and abilities will be given, which seem to be useful when developing a new concept for the geographical selection based on object-dependent relevance areas. The detailed implementation of these requirements is described in the following sections.

Definition of Geometrical Basic Forms for the Object-Dependent Relevance Areas
When describing object-dependent relevance areas, different two-dimensional geometrical basic forms should be provided. The definition of the basic forms should be orientated at the typical problematic cases developed in practice.

Object-dependent relevance areas should be applicable both to the "positioned" and to the "unpositioned" objects.

The geometrical basic forms should have no defined sizes, but should be arbitrarily parameterizable.

The description of the geometrical basic forms is made, among others, by geographical standard coordinates. Further, distance and angle indications are provided.

In order to ensure easy generation and association of the management data to every object, the corresponding information are stored together with the respective object description in a separate file as before.

Determining the Relative Position of a User to an Object-Dependent Relevance Area
For the defined object-dependent relevance areas, the relative position of the user to an object-dependent relevance area is to be determinable. When determining the relative position, it is merely interesting whether the current user position is within an object-dependent relevance area or not.

Definition of an Object-Dependent Relevance Area
An object-dependent relevance area is to be established from the combination of the available geometrical basic forms. For that purpose, a Boolean approach has to be developed, which allows arbitrary connections of geometrical basic forms within a Boolean expression. Thereby, it should possible to explicitly include and exclude geometrical basic forms.

Compatibility of the New Selection Method with the Previous Method
The new concept should be able to completely replace the previous selection method and also be integratable as additional component. When using the same as additional component, the requirement is made that when no object-dependent relevance area is indicated, the system uses the previous selection method.

Extension of the Test Surroundings
For evaluating the new method, the log file viewer is to be extended by the representation of the object-dependent relevance areas.

The following section gives an overview over the principle of the object-dependent relevance areas. Then, a detailed description of the individual operating steps and the detailed mode of operation follows.

Figure 47:
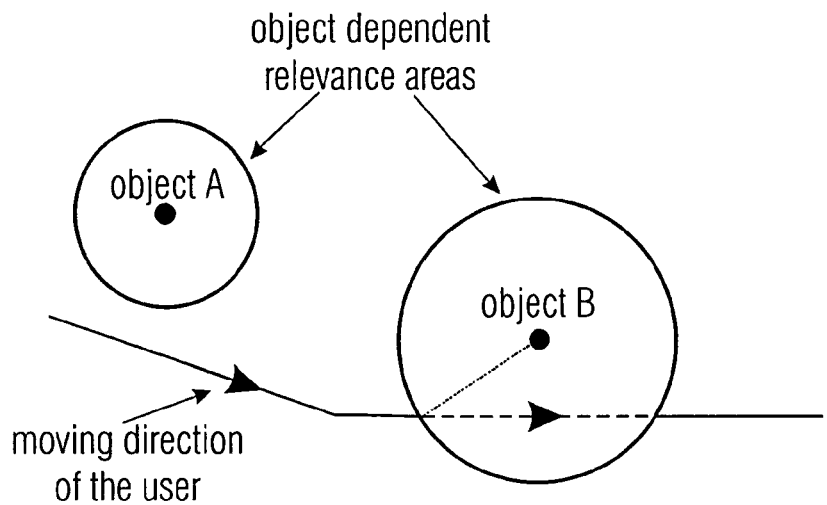
FIG. 47 is a basic mode of operation of the object-dependent relevance areas.

The basic principle of the object-dependent relevance areas is described based on FIG. 47. The figure shows two information objects and their relevance areas. Further, an exemplary route is illustrated. As long as the user moves outside an object-dependent relevance area, this object is not selected, even when the object selection according to the previous geographical selection method would be possible. The corresponding portions of the route are marked red in the figure. However, as soon as the user is within an object-dependent relevance area, the object is available for selection. In FIG. 47, for example, the information object A can be selected, as long as the user is in its object-dependent relevance area. The corresponding route is illustrated in green. The selection in this example takes place immediately after entering the object-dependent relevance area of object A, because no other objects are available for selection at this time.

This section introduces four geometrical basic forms, which are available for the description of object-dependent relevance areas. The following list presents the four geometrical basic forms together with the associated parameters, both generally and mathematically.

Circle

Figure 48:
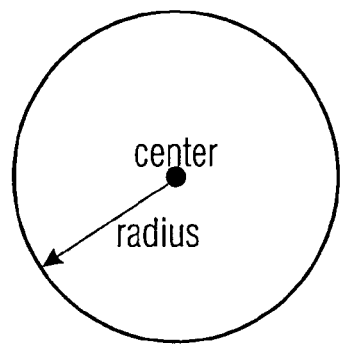
FIG. 48 is a circle form and required parameters.

A significant problem in object description by the author is the missing possibility to assign different selection distances. The introduction of the circle eliminates this problem. Merely the indication of the center in geographical standard coordinates and the radius in meters is required for the description. The center of the circle does not have to be identical to the position of the object. FIG. 48 shows the respective form and the required parameters.

Angle Area

Figure 49:
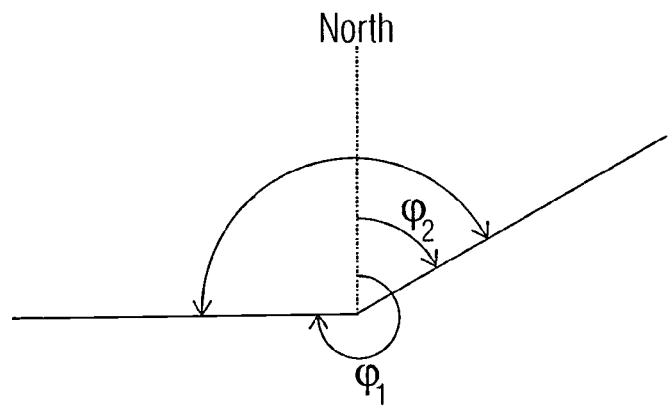
FIG. 49 is an angle area and required parameters.

In this basic form, an angle area can be indicated, which is not limited by the distance, but only by a defined start and stop angle. The area is determined by indicating an origin and two angles, as illustrated in FIG. 49. For indicating an angle, a common reference direction is required. As a common reference direction, the direction North is defined. The indication of the angles is made in relation to the direction North (corresponds to 0°). The angle area begins with the indication of the opening angle and terminates with the closing angle. Both values have to be in the range [0°-360°]. The orientation is made clockwise.

Segment of a Circle

Figure 50:
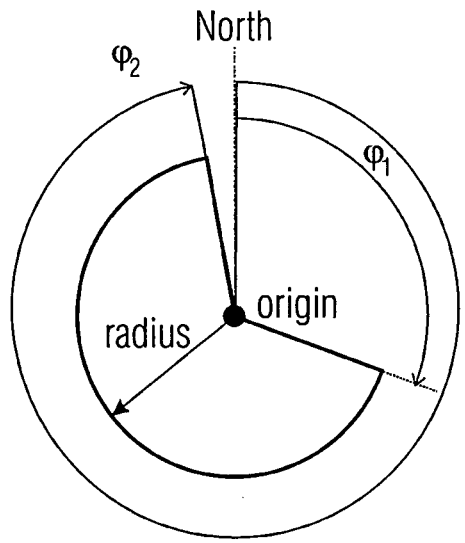
FIG. 50 is a segment of a circle and the required parameters.

The segment of a circle represents the combination of circle and angle area. This basic form allows the indication of a selection distance and an angle area. The required parameters are the set union of circle parameters and angle area parameters. FIG. 50 shows a segment of a circle together with the required parameters.

Polygon

Figure 51:
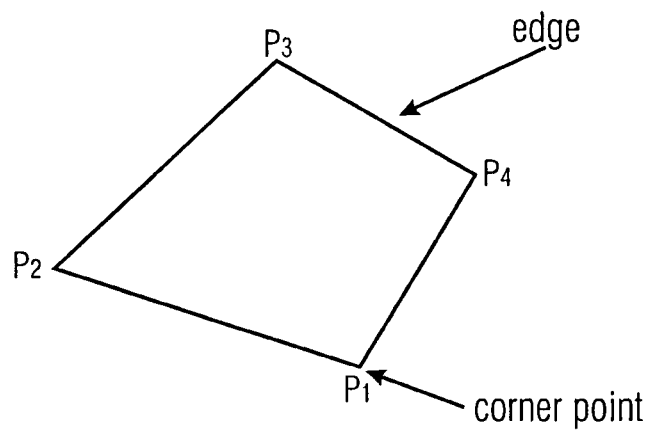
FIG. 51 is basic components of a polygon.

The polygon is a closed figure clearly defined by a tuple of n points $P = \{P_1, P_2, \ldots, P_n\}, P_n \in R^2.$ The points are referred to as corner points. A tuple designates an ordered combination of objects, where an order is fixed, in contrary to sets. The sides or edges of a polygon are determined by the lines $\overline{P_i P_{i+1}}$ (i=1, ..., n-1) and $\overline{P_n P_1}$. Further, a polygon has to have at least 3 corner points. The designations introduced here are illustrated in FIG. 51 for better illustration.

Figure 52:
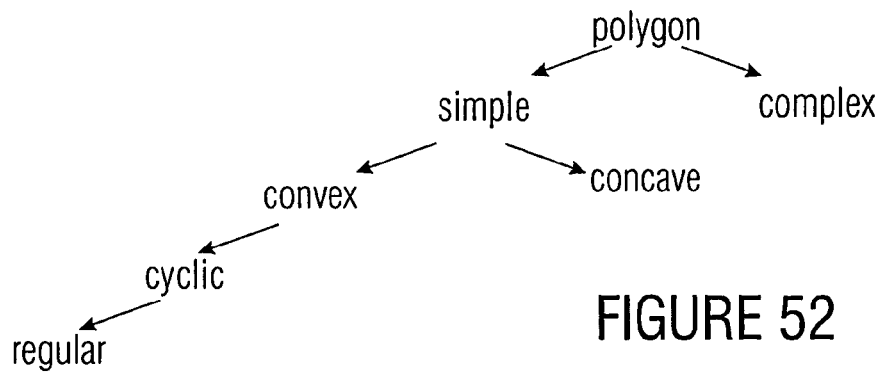
FIG. 52 is partitions of the different polygon types.

Polygons can be partitioned in different types, as illustrated in FIG. 52. First, polygons can be partitioned into simple and complex polygons. In a simple polygon, the edges only intersect at the corner points, otherwise it is a complex polygon.

Convex polygons have no internal angles of more than 180°. Otherwise, it is a concave polygon. A convex polygon is cyclic, when all corner points are on a common circle. Further, a cyclic polygon is regular, when all edges have the same length.

After introducing the geometrical basic forms available for UMIS for describing object-dependent relevance areas, the determination of the relative position of the user position to the respective geometrical basic forms will be discussed in this section. When determining the relative position, it is merely interesting whether the user is inside or outside a geometrical basic form. This information has to be determined as fast and efficient as possible, since dozens or even hundreds of such calculations might be required during a UMIS selection process.

Relative Position to a Circle

In a circle, it can be determined in an easy way whether the user is inside or outside. Merely the user position, the circle origin and the radius of the circle are required for the calculation. In a first step, the calculation of the distance between the center of the circle and the user position is performed. Then, a comparison is made whether the distance between the two points is higher than the circle radius. If the distance is higher, the user position is outside the circle, otherwise inside.

Relative Position to an Angle Area

Figure 53:
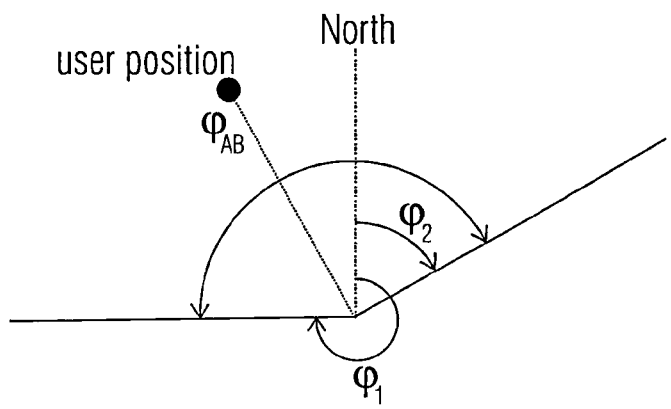
FIG. 53 is partitions of the different polygon types.

For describing the method calculating the relative position of a user to an angle area, FIG. 53 is used for better illustration. The value of the opening and closing angle lies between 0° and 360°. First, the angle $\phi_{AB}$ is calculated, which describes the user position in relation to the origin of the angle area. In a second step, it has to be differentiated whether the value of the opening angle $\phi_1$ is higher than the angle of the closing angle $\phi_2$. If $\phi_1$ is smaller than $\phi_2$, then the position of the user lies inside the angle area, if additionally $\phi_{AB}$ is not smaller than $\phi_1$ and not larger than $\phi_2$. The other case is present when $\phi_2$ is smaller than $\phi_1$. In this case, the user lies within the angle area, when $\phi_{AB}$ is not smaller than $\phi_1$, or $\phi_{AB}$ is not larger than $\phi_2$.

Relative Position to a Segment of a Circle

In the segment of a circle, the methods for determining the relative position of the circle and the angle area are combined. The method for determining the position in a circle determines first, whether the user is inside the radius of the segment of a circle. If this is not the case, then the user position is outside the segment of the circle and the decision method ends. However, if the position of the user is inside this radius, then the user is in the segment of the circle, when the user position lies additionally in the defined angle area.

Relative Position to a Polygon

There are different methods for determining whether a point lies within a polygon. In this thesis, the ray shooting method was chosen, because it can be applied to arbitrary polygons and is very efficient (Bjarne Stroustrup: Die C++ Programmiersprache, Addison-Wesley, 1997.

Figure 54:
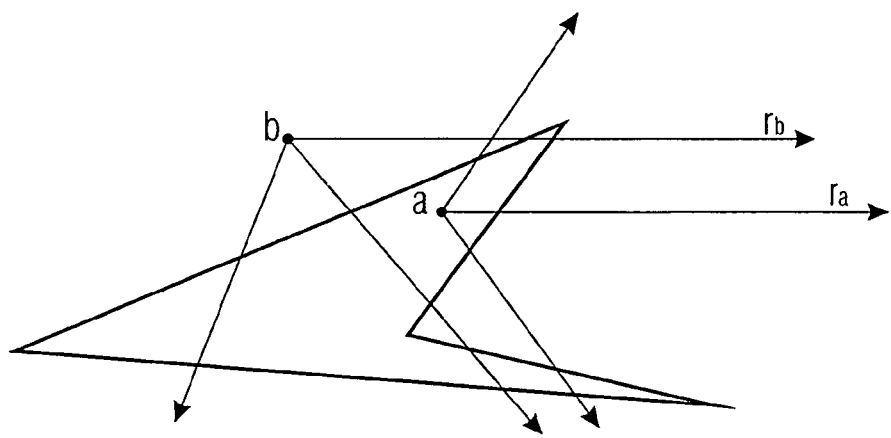
FIG. 54 is a number of the intersections with the edges of the polygon for every half-line, whose origin is the point a, odd, and for every half-line, whose origin is the point b, even.

The determination of the position of a point a inside or outside a polygon p in a two-dimensional space is based on the following theoretical consideration: Somebody moves from a faraway point on a straight line to the point a. Until the point a is reached, the edges are intersected not once or several times. If an edge of the polygon is intersected once, the person is inside the polygon. After the next intersection, the person is again outside the polygon, again until an edge is intersected. Generally, the indication can be made that the point a lies within the polygon p, when during the movement from the faraway point to the point a the number of intersections of the ray with the polygon edges is odd. With a straight number of intersections, the point a lies the outside the polygon p. An example illustrated in FIG. 54 illustrates this line of thought. The number of intersections of the half-line having their origin in a is odd. An odd number means that the point lies within the polygon. The number of half-lines starting from the point b is even, because this point lies outside the polygon.

In the following, this algorithm will be discussed in detail. Any half-line having its origin in the point a (FIG. 54) can be used for that purpose. For simplicity reasons, the half-line $\vec{r}_a$ is used, which has its origin in a and runs horizontally to the x axis. The direction of $\vec{r}_a$ runs in the positive x-axis direction. Further, it applies that the order of intersections with the edges of a polygon is irrelevant. Thus, the decision is based only on the parity (parity is the characteristic of a number to be even or odd) of the number of intersections. Based on this realization, it is thus fully sufficient that the algorithm can merely detect the intersection of an edge and sets the parity correspondingly. Thus, computation-intensive simulation of a movement on a half-line is omitted.

The basic procedure is the consideration of the individual edges of the polygon. When considering an edge, it is determined whether the half-line $\vec{r}_a$ intersects the same. In this case, the value of a parity bit, which had been initialized to zero, is inverted. After processing all edges, the point a lies within the polygon when the value of the parity bit is 1. Otherwise, the point lies outside.

Figure 55:
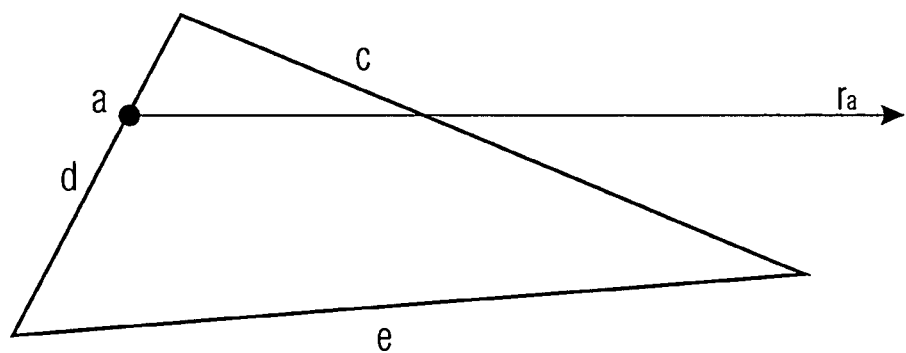
FIG. 55 is three different possibilities how the half-line $\vec{r}_a$ can intersect the edges of a polygon.
Figure 56:
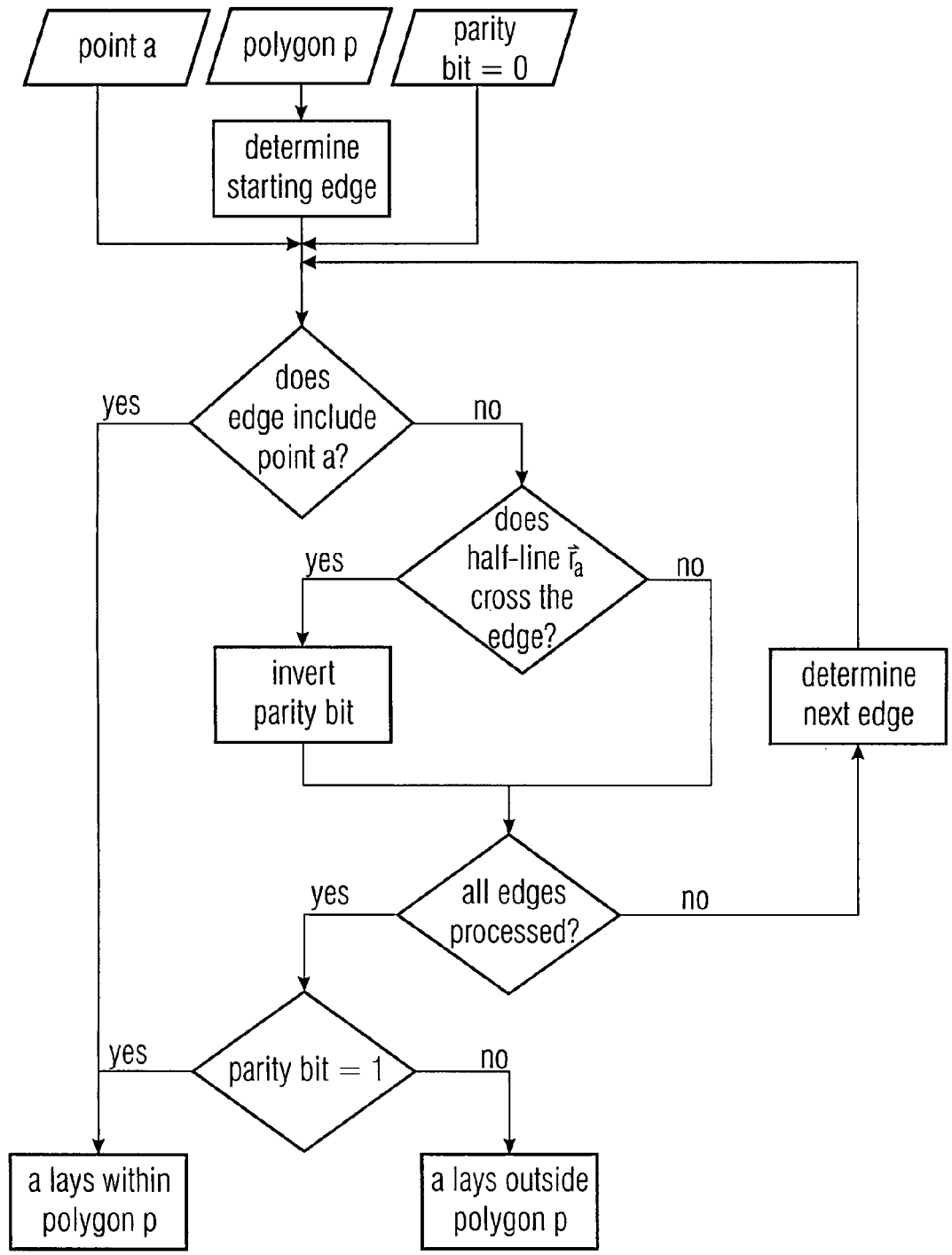
FIG. 56 is an algorithm for determining whether the point a lies within the polygon.

The half-line $\vec{r}_a$ can intersect an edge of the polygon in three different ways. The origin of the half-line $\vec{r}_a$ can, for example, itself lie on the edge of a polygon. The significant two possibilities are that $\vec{r}_a$ intersects the edge or does not touch the same at all. The edge d in FIG. 55 includes, for example, the point a, the edge c is intersected by $\vec{r}_a$. The edge e, however, is not touched by $\vec{r}_a$. The flow diagram in FIG. 56 shows the algorithm used in this thesis for determining whether a given point a lies within a polygon p. Thereby, the algorithm considers the individual polygon edges and inverts the value of the parity bit, when the edge of $\vec{r}_a$ is intersected. If the value of the parity bit is 1 after processing all edges, then the point a lies within the polygon, otherwise outside. If an edge includes the point a, then the algorithm will immediately provide the result that the point lies inside the polygon.

Figure 57:
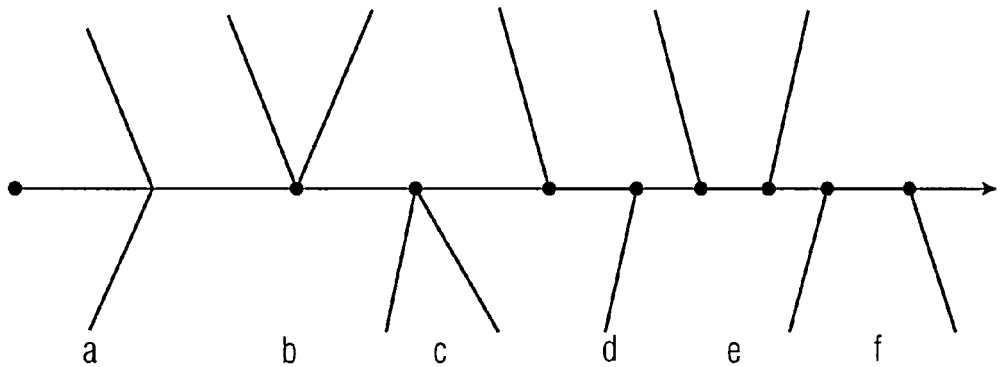
FIG. 57 is specific cases: at (a) and (d) the parity bit is inverted, at (b) and (e) the parity bit is never inverted; a twofold inversion is performed at (c) and (f)

In the flow diagram, several specific cases are considered in the decision whether $\vec{r}_a$ intersects the edge. The specific cases occur as soon as $\vec{r}_a$ intersects the corner point of an edge. In the case (a) in FIG. 57, the parity bit has to be inverted, although $\vec{r}_a$ actually intersects two edges. In the cases (b) and (c), the value of the parity bit may not change. If the two corner points of an edge lie on the half-line (d-f), then the parity may also not change. This behavior can be obtained when "intersecting" an edge in this algorithm is seen as follows:

An edge is not considered as intersected by $\vec{r}_a$, when $\vec{r}_a$ intersects both corner points of the edge.

An edge is not referred to as intersected by $\vec{r}_a$, when $\vec{r}_a$ intersects the corner point with the lower y coordinate value.

An object-dependent relevance area for the information objects in UMIS is to be established from the combination of available geometrical basic forms. For that purpose, a Boolean approach is used, which allows arbitrary connections of the geometrical basic forms to an object-dependent relevance area. The logical operators AND "&", OR "|" and NONE "!" can be used when establishing a Boolean expression. The elements in the Boolean expressions can only assume the values "true" or "false".

Figure 58:
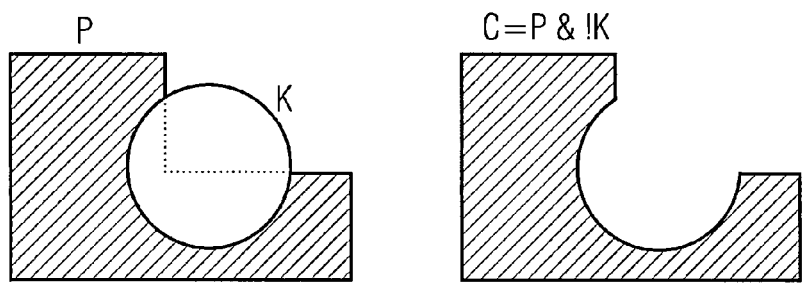
FIG. 58 is an example for the definition of an object-dependent selection area.

The definition of an object-dependent relevance area based on an Boolean expression is shown in FIG. 58.

In the presented example, a polygon P and a circle K are used as geometrical basic forms. The Boolean expression P&!K defines the object-dependent relevance area C. The truth values of the elements of the expressions P and K are each 0, when the user position lies outside these geometrical basic forms. If, for example, the user position lies inside the polygon, then the element P gets the value 1. An information object in UMIS is only considered for the selection when the whole Boolean expression has the value 1 and the user is thus inside the object-dependent relevance area defined by the author.

The extremely flexible principle presented here allows a plurality of possibilities in the definition of an object-dependent relevance area for an information object, several of which will be presented exemplarily below.

Based on several examples, this section shows that the new concept of the object-dependent relevance areas fulfills the requirements and can be applied in a flexible way for a plurality of problems. The following examples treat typical problems that cannot be solved satisfactorily with the previous geographical selection, but can be avoided in a simple way by defining object-related relevance areas. A solution will be described for every presented problem.

Different Selection Distances for Objects

Figure 59:
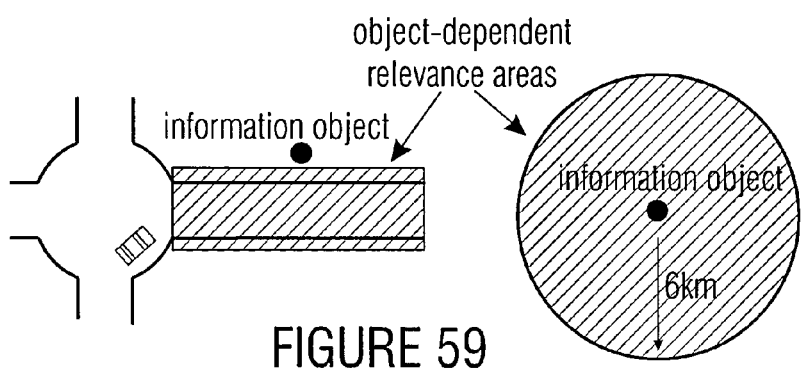
FIG. 59 is different relevance areas or selection distances of information objects, respectively.

With the object-dependent relevance areas it is now possible that information objects have different selection distances. A higher selection distance can be assigned, for example to the Olympic Tower in Munich than to a restaurant in a small side street. The Olympic Tower, which is to be selected from a far distance, can have a circular area around its geographical position, for simplicity reasons. For the restaurant, the limitation applies that it can only be selected when the user is in the same street as the restaurant. In this case, it is recommended to describe the relevance area by a polygon, because in that way, the desired selection area can be defined best. FIG. 59 shows the described relevance areas of these two information objects. The author has now the possibility to define different selection distances together with the object description. However, it should be noted that the selection distances of an information object can only be limited and never be enlarged above the geographical selection parameters.

Announcement of Objects when they are Visible for the User

Figure 60:
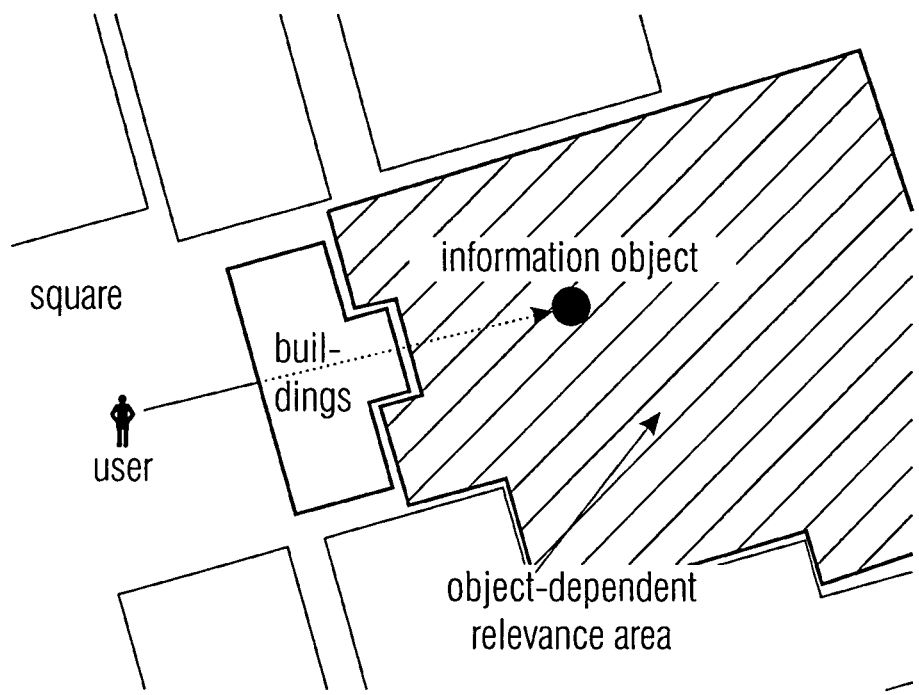
FIG. 60 is a consideration of the visibility of an object by the object-dependent relevance areas.

Particularly in cities, a clear display of information objects is given when the described object is visible for the user during the display. The object-dependent relevance areas can fulfill this requirement. For example, the information object in FIG. 60 is only to be selected when it is visible for the user. The illustrated object-dependent selection area marks the corresponding area.

Distance-Dependent Object Description

With the help of object-dependent relevance areas, distance-dependent object descriptions can be displayed. For example, two information objects with different relevance areas can be generated for the Olympic Tower. The one information object, for example, is to be displayed from a far distance, wherein the degree of detail is to be low because of the far distance. In contrary to that, the other information object is to be selected only in the immediate vicinity, but with a higher degree of detail.

Specific Announcement of Regional Information

Figure 61:
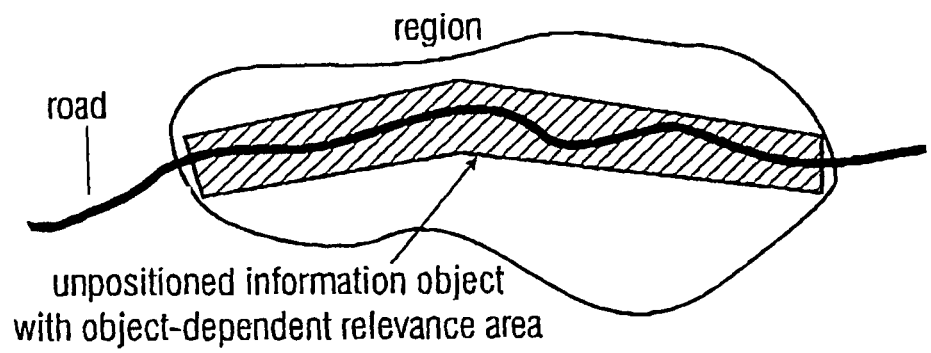
FIG. 61 is a specific announcement of region information.

The specific announcement of information that are only to be displayed in a certain region is no longer a problem, due to introducing the concept of object-dependent relevance areas. The unpositioned objects defined for such situations can now be specifically limited in their "validity" to a certain region by an object-dependent relevance area, without having to indicate an exact position. FIG. 61 shows how the road in one region is marked as relevance area by a polygon. Here, this object-dependent relevance area belongs to an unpositioned information region. The presented scenario allows the unique general presentation of the region, as soon as the user moves into the region (independent of the direction from where he visits the region), as soon as no positioned information objects are available.

Preparing Sightseeing Tours

Figure 62:
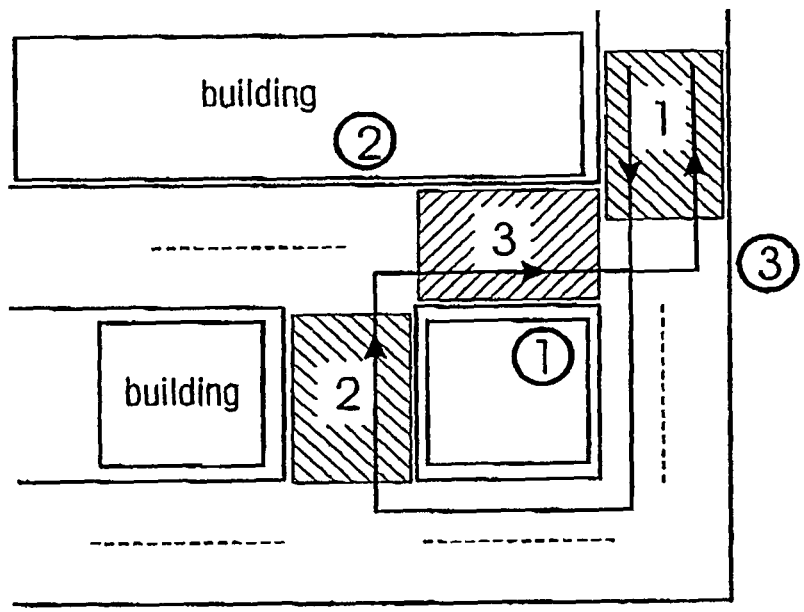
FIG. 62 is the usage of the object-dependent relevance areas for creating sightseeing tours.

An important field of usage of UMIS is the preparation of sightseeing tours, where the author mostly determines the order of object displays. FIG. 62 shows a route, where the objects are to be displayed in a certain order. The used numbers show which object-dependent relevance area belongs to which information object. Further, they show the desired order of display.

While the object-dependent selection method represents an individual solution for a geographical selection, together with a standard method, a combination with the dynamical selection method offers further advantages.

In the object-dependent selection, all available objects remaining at the end of all selective selection steps have to be checked in every new selection process, whether the user is in the object-dependent relevance area. For a large number of objects, this procedure is very computation-intensive. The solution is a clever combination of the dynamical selection process with the object-dependent selection.

In this case, as before, the geographical coarse selection provides those objects from a set of the registered information objects that are actually available according to the current geographical selection parameters. The geographical selection parameters are adapted to the current situation of the surroundings by the dynamical adaptation method. The preselected objects now have to be checked for their compliance with geographical and abstract minimum requirements. The following minimum requirements are checked in this combined selection method in the listed order:

The first step checks whether the object can be selected from the current situation of the surroundings. This step allows to remove many objects, which are not available for the current situation of the surroundings, from the selection list in advance.

If no valid situation types are specified in the object description, this requirement is always considered as fulfilled.

The next step includes the previous geographical and abstract selection criteria, which further reduce the number of available objects (selective non-directed selection).

In the last step, a check is performed whether the object has an object-dependent relevance area and whether the user is in this selection area. If no object-dependent relevance area is defined, this requirement is also automatically considered as fulfilled.

An object fulfilling all these criteria is added to the temporary selection. Then, the weighted selection is performed, in order to determine the most relevant object for the user from the set of all valid objects. The object remaining as the currently most relevant after the final selection is returned for display.

Figure 63:
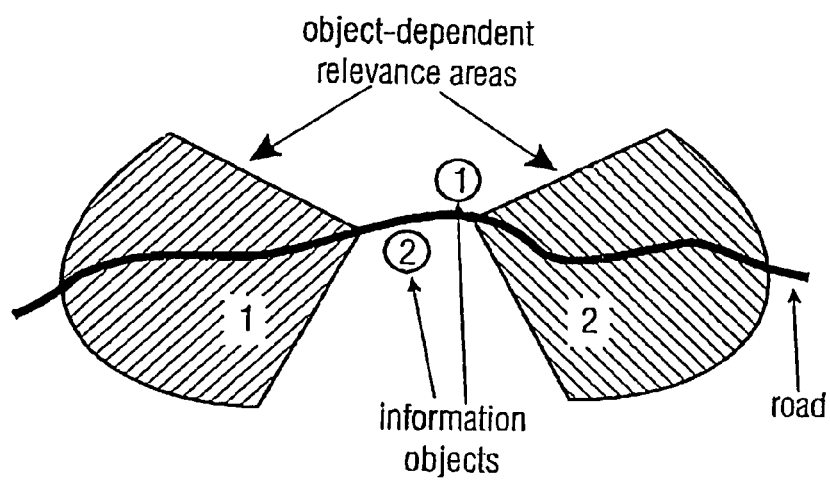
FIG. 63 is a direction-dependent selection of information objects.

Further, the combined selection method opens up new possibilities for the specific display of objects. An object-dependent relevance area can be fixed such that a direction-dependent selection is possible. FIG. 63 shows exemplarily two information objects that can only be announced from a certain direction.

The information object number 1 is only to be presented when the user moves towards the object from the West. This is the other way round for the information object number 2.

This new possibility is later used during evaluation in different situations, to solve previous problematic situations.

The already present UMIS system has a modular structure, which is also reflected in the implementation. This means that functional units have been encapsulated and they communicate with each other exclusively via exactly defined interfaces. Thus, the UMIS system has been implemented in ANSI C++. This programming language allows a modular and object-oriented software development. Further, this programming language is present in many platforms and operating systems.

The concept of object-dependent selection areas allows to specifically limit the display area of an object. Therefore, geographical areas are defined, in which a selection is possible. For an object to be displayed, the existing geographical and abstract criteria have to be fulfilled. Additionally, it has to be checked whether the user is within an allowed display area. When using complex selection areas, this computation can be very computation-intensive. Thus, this additional selection step is only performed at the end of the previous selection process. The selection steps for the extended selection process are thus performed in the following sequence.

geographical coarse selection
selection according to geographical and abstract criteria
checking the object-dependent relevance areas
final selection All previously present selection steps have been performed in the selection module. Thus, this module is extended by the new selection step. This selection process will be briefly described below:

At the beginning of the selection process, the geographical coarse selection determines the amount of objects basically available for selection. For that purpose, a maximum selection area is calculated. Successively, all objects in this maximum selection area are supplied back. For every object supplied back, the selection module checks in a second step the previous geographical and abstract minimum requirements. All objects fulfilling these criteria are stored in an object list. Then, the selection module removes all objects whose relevance areas allow no display for the current position from this list. If two or more objects remain in the object list after this step, the individual objects will be compared in the final selection and exactly one object is selected for display.

As has already been mentioned in this section, object-dependent relevance areas can be defined by a Boolean combination of geometrical basic forms. Thus, the following information is required for defining object-dependent relevance areas.

lists of used geometrical basic forms
description of the Boolean operation

Figure 64:
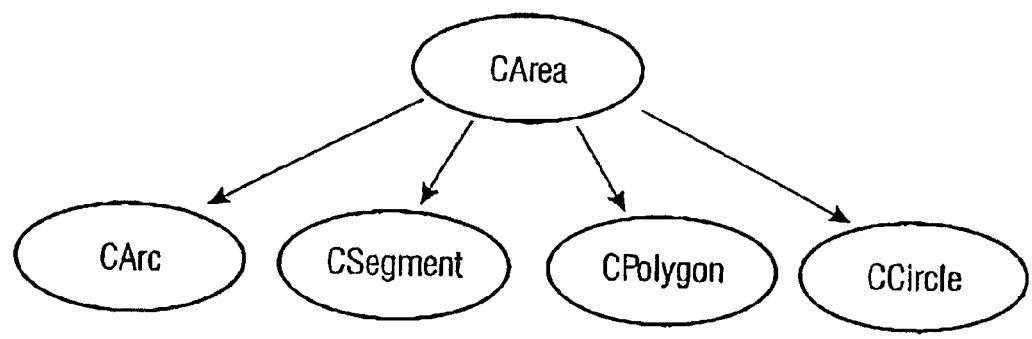
FIG. 64 is a realization of the geometrical basic forms.

The geometrical basic forms were realized with the modules illustrated in FIG. 64. A corresponding C++ module exists for every required geometrical basic form. All represented classes are derived from the basis class CArea, which includes the basic functionalities.

Figure 65:
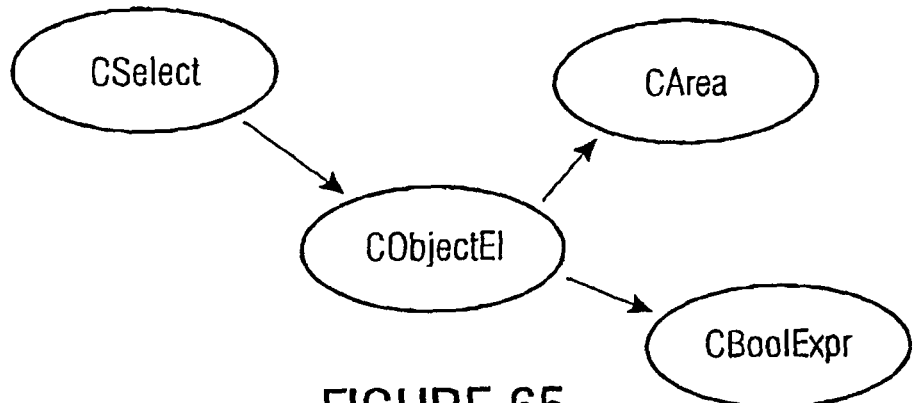
FIG. 65 is an overview over the implementation of the object-dependent relevance areas.

FIG. 65 shows an overview over the modules participating in the evaluation of the object-dependent relevance areas.

The class CObjectElement has been extended and is now able to administrate a list of the above-described geometrical basic forms. Additionally, the class is now able to store the description of the Boolean operation of geometrical basic forms at runtime. The Boolean operation is stored as string in the class CObjectElement.

The class CBoolExpression is used to evaluate the Boolean operation indicated in the description file.

For an efficient selection of information objects, the number of information objects available at runtime has to be limited at any time. The present section deals with a possible approach to also reduce the amount of metadata to be maintained in the memory at UMIS runtime. Reducing the number of information objects according to geographical criteria is performed in UMIS on the one hand during program start and during initialization, and on the other hand cyclically in every selection process in the geographical preselection.

In order to maintain the number of information objects in every selection process as low as possible, so far, information objects can be stored in directories according to regions. Before starting a drive, a certain region can be selected in UMIS by selecting a file. In that case, only the information objects belonging to the selected region are read in by UMIS. One advantage is the lower memory requirement and calculating time by the limited number of objects. The serious disadvantage of this procedure is the interaction of the user who has to know his route in advance.

The initialization of the object list module allows to set minimum and maximum values for the longitude or latitude, respectively, of the objects to be read in. All objects lying outside this area are not considered and already discarded during initialization of the UMIS system. This mechanism has the disadvantage that the area selected at the beginning cannot be changed during runtime. Thus, it takes for granted that the route is already completely known prior to starting the drive, which contradicts the basic idea of UMIS with regard to complete moving freedom as user.

As has been described above, a right-angled selection area is calculated in the geographical coarse selection in dependence on the position of the user. Only the objects in this selection area are considered for the subsequent selection methods. The implementation of the geographical coarse selection UMIS has the disadvantage that all information objects have to be read in already during initialization. Thereby, the required length of the program start and the memory requirements are increased. Further, the described raster for calculating the selection area has so far been chosen relatively coarse, so that a free preselection of the objects relevant at all is only possible in a limited way.

For avoiding the above-mentioned problems, the following requirements for future object management in UMIS have been developed within this thesis:
  user interactions have to be minimized
  during initialization, only objects may be loaded that are in the above-mentioned selection area
  the selection area for the geographical coarse selection has to be refined
  objects must be dynamically loadable from the UMIS system during runtime
  objects must be dynamically removable from the UMIS system during runtime
  objects may only be loaded when required
  no significant delays must occur in the system at runtime due to the dynamic update of the object list The method for geographical preselection has been refined within this thesis. The basic idea is to perform intelligent latching of information objects. Here, only objects that are relevant at the current time should be held in the memory. Additionally constant adaptation of the relevance area is to be performed, and unloading or reloading of the information objects based on the parameters speed, moving direction, situation of the surroundings, etc., connected therewith.

During the initialization of the system, the following tasks are to be performed in the order described below with regard to the geographical selection.
  determine the position of the user via GPS
  determine currently relevant selection area
  load information objects in the defined selection area
  determine position of all available information objects Determining the position of all available objects in the first step has to be performed such that loading the object files is not required. In contrary to existing systems, not all objects present in a region predetermined by the user are loaded during initialization, but only the objects within the calculated currently maximum relevant selection area. The selection area is calculated in dependence on the location of the user during the program start, which is why the availability of GPS during initialization is required.

Figure 66:
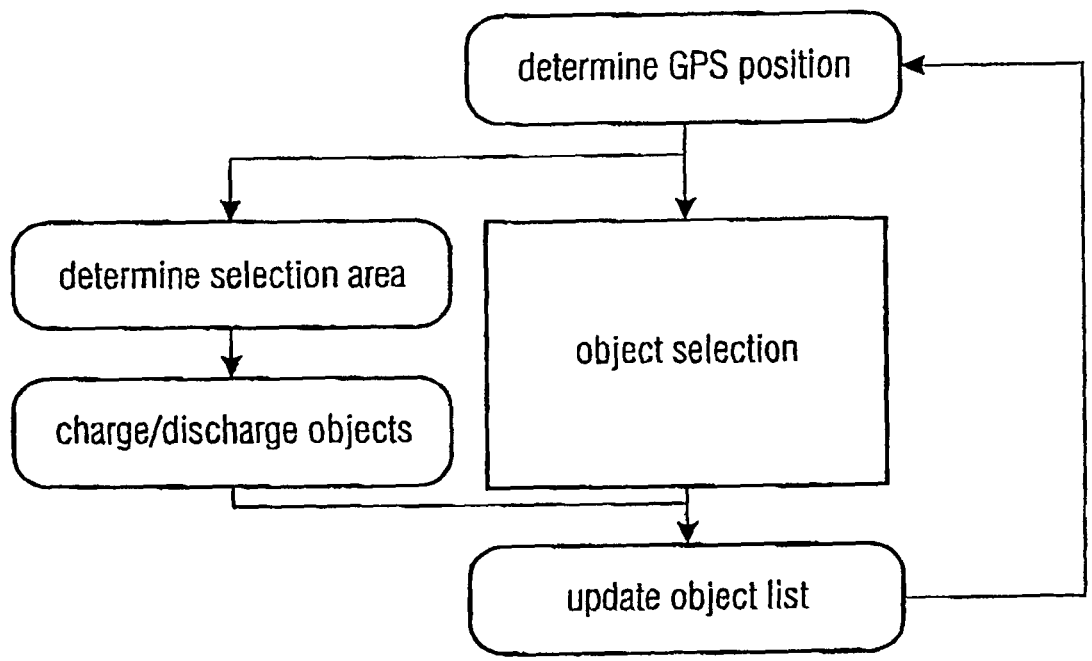
FIG. 66 is a dynamic object-update of the UMIS system at runtime.
Figure 67:
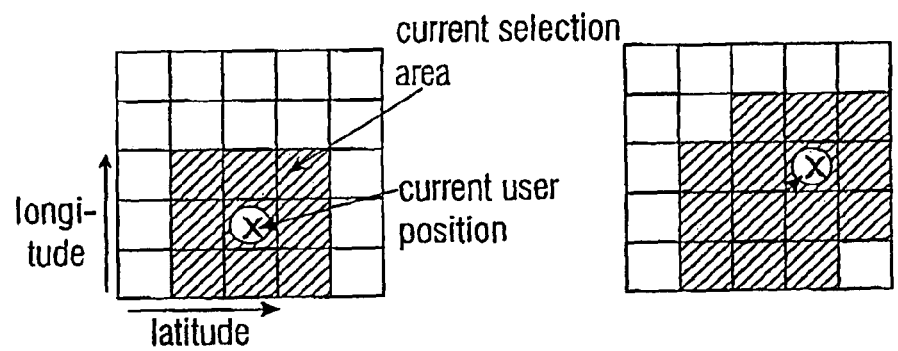
FIG. 67 is update of the selection area by using raster-partitioning; already loaded fields are marked black, fields to be loaded are marked green and fields to be deleted are marked red.

Dynamical reloading or unloading of objects, respectively, has to be performed in parallel to the selection process, as illustrated in FIG. 66, so that the selection process is not interrupted for a long time due to loading objects.

The reloaded objects are inserted in the object management after the object selection. Objects, that are no longer in the selection area, have to be removed from the object list storage. Updating the object list can only be performed at the end of the selection process, since otherwise accesses to the object list by the UMIS main module would become inconsistent. Thus, the object list should be "blocked" during the object selection by the UMIS main module.

One example for changing the selection area is illustrated in FIG. 7. In the two raster fields, the field where the user is actually, is marked by an "X". The area shaded in black marks the current selection area. The objects in these fields are already loaded in the system and are available for the selection process. The fields shaded in green shown areas where objects have to be reloaded. Fields, whose information objects are no longer required, are shaded in red.

The order of the objects to be loaded has to be selected independence on the distance. This means that objects with a smaller distance to the user are loaded earlier and thus are available more quickly for the subsequent selection process. This procedure has several advantages. On the one hand, the objects required earlier in time are also available earlier for the selection process, as has already been mentioned. On the other hand, the system is less sensitive against frequent changes of the selection area. Objects that are required earlier in time in the selection process are maintained in the memory. Removing objects should be performed in the reverse order, for the discussed reasons. This means that objects with the largest distance to the user are removed first.

For realizing the above-discussed concept of a location-dependent dynamical update of the object list, a new module is introduced as control instance. This module implements the run control for the "quasi parallel" processes illustrated in FIG. 66 and is responsible for updating the object list. Thus, for the new module, the ObjectLoader, the following subtasks result:

determine maximum selection area for the object selection
make up a list of objects to be loaded or objects no longer required, respectively
load objects
update object list For realizing the mentioned subtasks, the ObjectLoader can access the already present modules. The ObjectList module is, for example, required to store the objects loaded by the ObjectLoader in a temporary object list. The object list of the UMIS main module may not be used during object update, so that the access of the UMIS main module to the object list remains consistent. For loading the objects, the ObjectLoader accesses the ObjListInit-Module.

Figure 68:
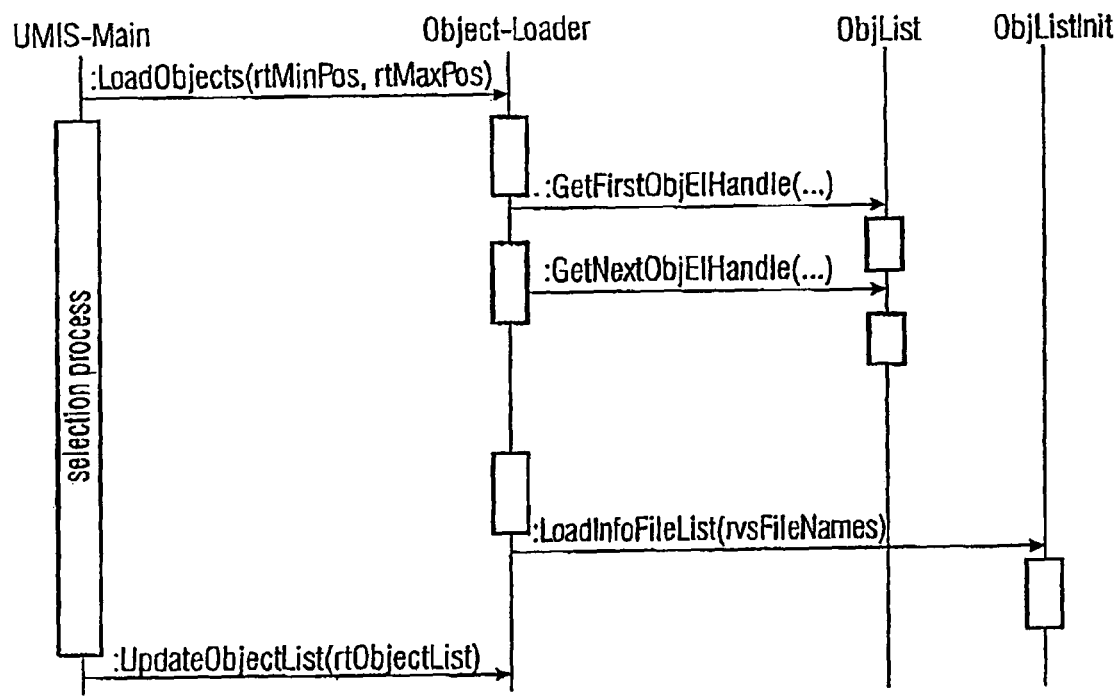
FIG. 68 is a sequence diagram of the update process.

Based on a UML sequence diagram (UML=unified modeling language), the described steps will be illustrated in FIG. 68. The sequence diagram represents the participating objects (horizontal arrangement) and the temporal call sequence (vertical representation) of their functions. After the UMIS main module has calculated the minimum and maximum value of the longitudes and latitudes of the selection area, these values are transferred to the ObjectLoader. The ObjectLoader passes these values to the ObjectList module. The object list module calculates the associated selection fields. Then, the ObjectLoader determines all objects in the selection area by repeatedly calling the function GetNextObjElHandle. Then, the ObjectLoader can load the objects to be loaded from the file system of the respective computer, with the help of the ObjListInit-module. Thereby, a reference to the object list of the ObjectLoader and a list of file names is transferred to the ObjListInit-module. The UMIS main module interrupts this process, as soon as the selection process is terminated. The UMIS main module transfers a reference of its object list to the ObjectLoader. The ObjectLoader updates the object list transferred by the UMIS main module with the help of the temporary object list generated by the same.

By dynamically adapting the geographical selection parameters, the selection areas are continuously adapted to the situation of the surroundings of the UMIS user.

In a first step, the method tries to determine the current situation of the surroundings of the user. After the situation determination, the geographical selection parameters, for example the selection distance, are adapted according to the detected situation type. During the evaluation of the previous UMIS system, it has been determined that the reliable situation determination is the main problem in this method. For that reason, the situation determination for this method has been optimized. Further, additionally, an extension of the geographical selection process has been presented, which allows the situation-dependent selection of information objects. Additionally, the dynamical parameter adaptation has been extended by a new type of surroundings. Based on test results, the obtained improvements will be shown below.

A significant problem in the previous dynamical selection method was the reliable determination of the current situation of the surroundings of the user, which is significant for the following adaptation steps in the dynamical selection method.

Three different situation types are distinguished in the previous method for dynamical parameter adaptation, which consider the normal situations of the surroundings of a UMIS user. The situation types city, road and motorway are used. The situation type city represents densely populated surroundings with a high density of information objects. The situation type motorway is provided for surroundings with low density of information objects and for resulting large selection areas. For surroundings whose density of information objects lies between the two named situations, the situation type road is used.

In the previous method, determining the situation was performed based on considering the average speed, stop duration as well as stop frequency.

As has been shown in the evaluation performed in this thesis, the mere consideration of the three mentioned average moving characteristics leads to an inert situation detection. This might lead to the selection of a selection area that is too large, which has the effect of inundating the user with information.

Thus, three approaches for improved and faster situation determination have been presented. For allowing a better comparison between the three approaches, in the following verification of the optimization results, the presented test drives are simulated with a uniform GPS dataset. The used test route is in the city and the surroundings of Erlangen and includes all three described situation types.

The presented approach considers merely the determined average speed in the decision about the current situation of the user. The minimum and maximum speed values for the respective situations are listed in FIG. 69. The moving characteristics stop duration and stop frequency are neglected in this approach, in order to avoid a wrong situation detection when stop processes are missing. This problem occurs, for example, in a transition from a "fast" to an "slow" situation type. The above-described problem occurred, for example, in the area A (see FIG. 70) and has already been realized.

Figure 70:
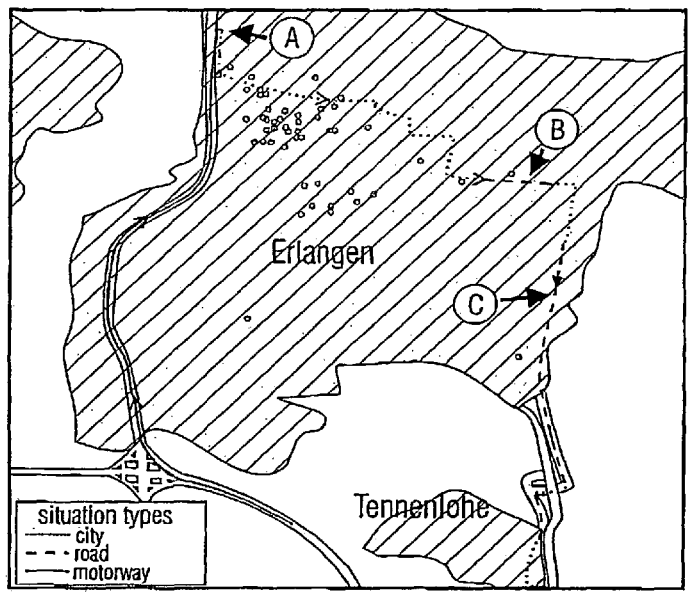
FIG. 70 is a situation determination based on the average speed of the longtime window of 300 seconds.
Figure 71:
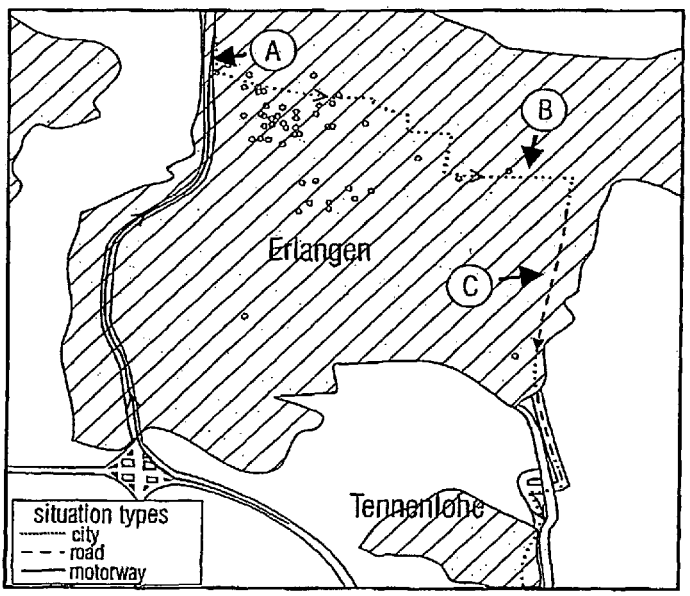
FIG. 71 is a situation determination based on the current and the average speed with a longtime window of 600 seconds.

FIG. 70 shows the course of the used test route. The course of the test route has been marked in color corresponding to the detected situation. Red route sections correspond to the same situation type city. The situation type motorway is illustrated in blue and the situation type road in green. In the area A, the transition from the situation type motorway to the situation type is illustrated. Due to on the missing stop processes on the motorway, the previous situation detection provided wrong results. Neglecting the stop duration and the stop frequency accelerates the situation detection in this area, as can be seen in FIG. 70.

Additionally, in this test, the window length has been shortened from 600 to 300 seconds, in order to further decrease the inertia of the situation detection. However, as expected, undesired side effects occurred. By limiting the window length and neglecting the stop processes, the system becomes more sensitive to short-time speed variations (see area B).

In the area C, the reduced inertia of the situation determination had an adverse effect due to a wrong situation selection. Generally, a large inertia is desired in the transition from a "slow" to a "fast" situation type, in order to avoid large selection areas.

The test results confirmed the assumptions that using the average speed as single criterion does reduce the inertia of the situation determination, but also causes the already mentioned undesired effects. Due to the mentioned disadvantages, this approach has not been selected for final implementation.

In order to reduce the inertia of the situation determination, the window length has been shortened in the previous section. However, this also simultaneously caused an increase of the sensitivity to speed variations. For that reason, in this approach, the additional window length of 600 seconds is selected again. Additionally, the current speed is considered, so that still a fast detection of the situation type city is performed. Therefore, in a first step, it is tested whether the current speed lies in the range between 0 and 60 km/h. In this case, the situation type city is detected immediately. If the current speed lies outside this range, the situation determination is performed based on the average speed, as described above.

Figure 72:
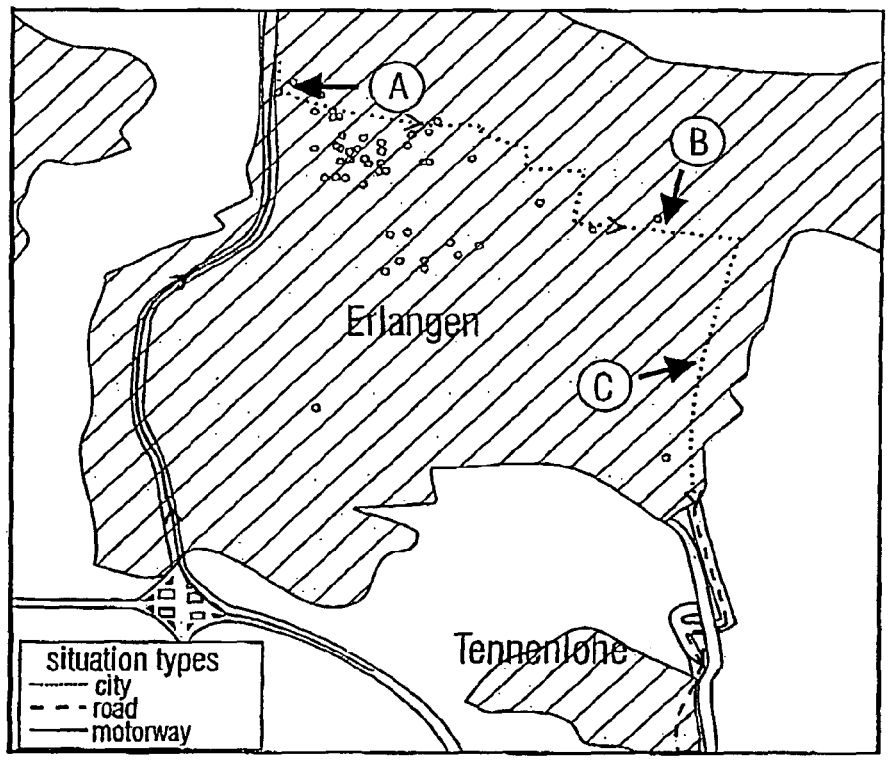
FIG. 72 is using the current speed and the previous method with a longtime window of 600 seconds for determining the current situation.

As can be seen in FIG. 72, the section B, which had been detected wrongly in the previous approach, is detected correctly in this approach due to the increased inertia. However, it can also be seen that in this approach in certain route sections, the situation type road has also been detected erroneously within the city. The cause of this error are longer drives in the city with a speed of over 60 km/h. The approach used here shows an improved situation determination compared to the previous approach by incorporating the current speed. However, the test drives have shown that the additional consideration of the moving characteristics stop duration and stop frequency is required to obtain an even higher inertia when detecting a faster situation.

The main goal in optimizing the situation detection was the avoidance of too large selection areas in the "slow" situation type city. The approach tested in the last section provides faster situation determination in transitions from "fast" situation types to the "slow" situation type city. However, it has been shown in the last section, that the inertia of situation detection has to be increased in the transition from the "slow" to "fast" situation types, to remain sufficiently long in small selection areas. For that reason, in this approach, the consideration of the current speed is combined with the previous situation detection, which considers the average stop duration and stop frequency in addition to the average speed. In order to limit the inertia of the system in general, apart from that, in the last step of the situation detection, the normal speed limits of the used situation types are taken into consideration.

As can be seen in FIG. 72, this method provides very good results in a situation detection for the used test route. Compared to the previous method, the situation type city is continuously detected as such.

Compared to the original method, this approach provides a fast detection of the situation type city and further shows a sufficiently high inertia in transitions to "faster" situation types. These two characteristics avoid the selection of too large selection areas and thus effect a significant improvement of the previous situation detection.

Since the approach used here also provided the best results in situation detection in other test routes, it is selected for final implementation.

A further problem during object selection with dynamical selection areas is the selection of information objects from a larger distance, which are actually determined for display in the immediate vicinity. This has already been determined and is again represented in FIG. 73.

Figure 73:
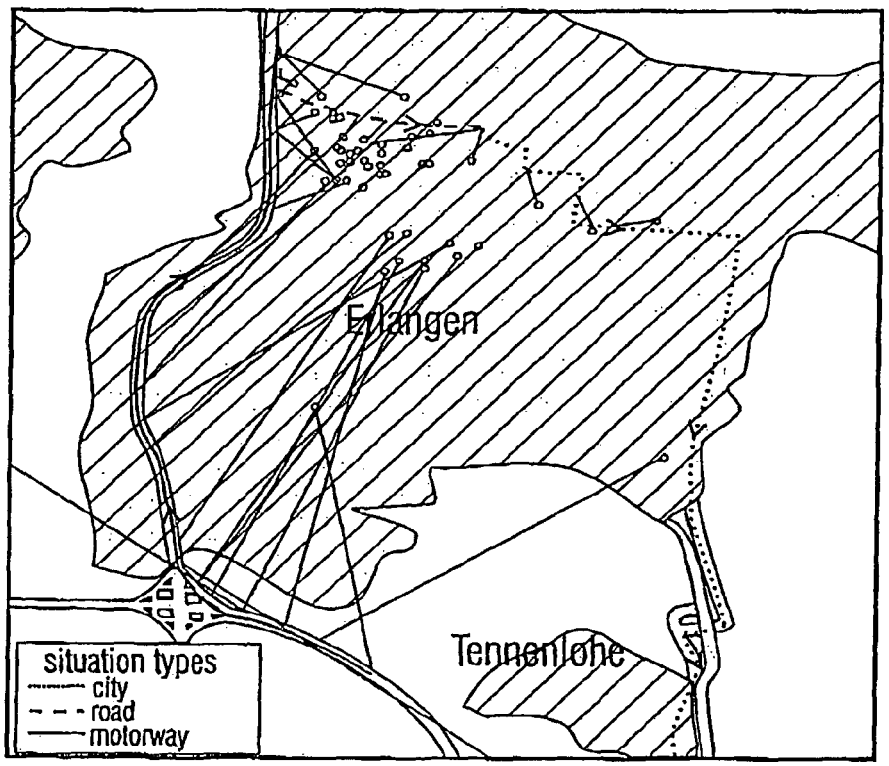
FIG. 73 is an erroneous selection of objects with dynamic selection parameters without considering the situation.

The figure shows a test drive in Erlangen, where the user drives into the city via the motorway. As long as the user is on the motorway, erroneously, objects from the city are selected and displayed continuously, due to the large selection areas. The selection of an object is illustrated in FIG. 73 by selection lines, which connect the object position with the position of the user where the selection was made. The two resulting disadvantages are an inundation of the user with numerous object displays and the missing display of objects that had already been announced, when the user approaches them later directly. Objects are not available for a repeated selection, when the maximum specified number of repetitions (typically 1) has been achieved.

Figure 74:
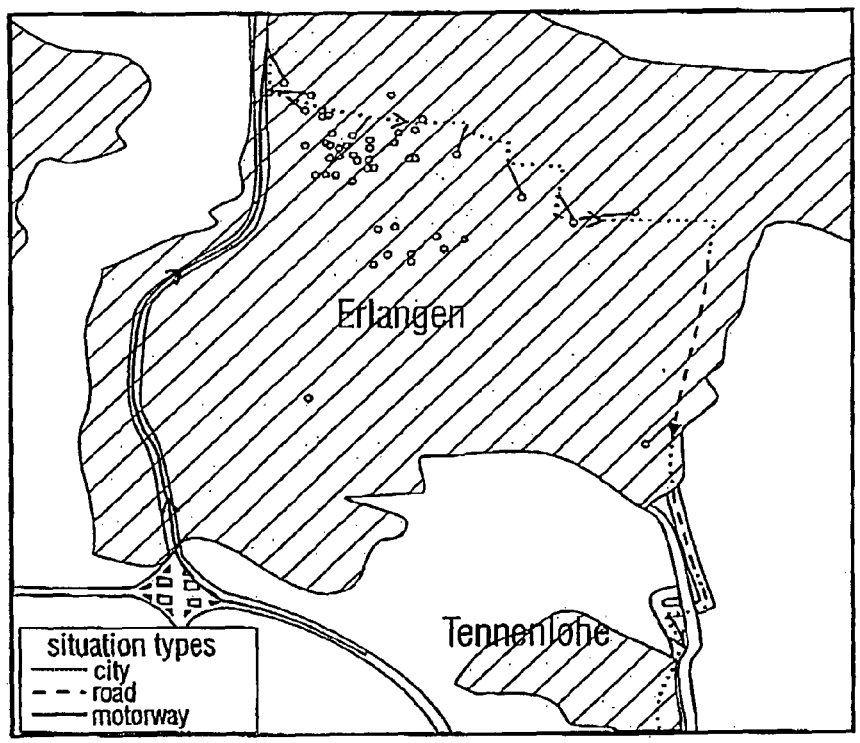
FIG. 74 is a situation-dependent selection of information objects.

Thus, an extension of the geographical selection has been introduced. This extension allows the author of the information objects to define the situation types, which are available for selection of the object. FIG. 74 shows the obtained improvement when using the situation-dependent selection.

All information objects in this figure were only defined for a selection from the situation city. For that reason, in contrary to the previous selection method, no information objects have been selected for the situation type motorway, in contrary to the previous selection method. Thus, an inundation of the user with information has been avoided. As desired or defined, respectively, all information objects have been selected from the situation city. Further, the required computing time of the selection process could be accelerated. Objects that were no available for the current situation, were no longer considered in the following selection processes after this selection step.

In this thesis, the UMIS system has also been tested for a usage during movement as pedestrian. As has already been determined, the selection areas used in the dynamical parameter adaptation have been too large for a clear display. Further, wrong direction indications resulted, when the user changed his direction in short intervals, moved slowly (approximately 0 to 1.5 km/h) or not at all. Thus, the new situation type pedestrian, which considers these problems, has been introduced in the dynamical parameter adaptation.

Figure 75:
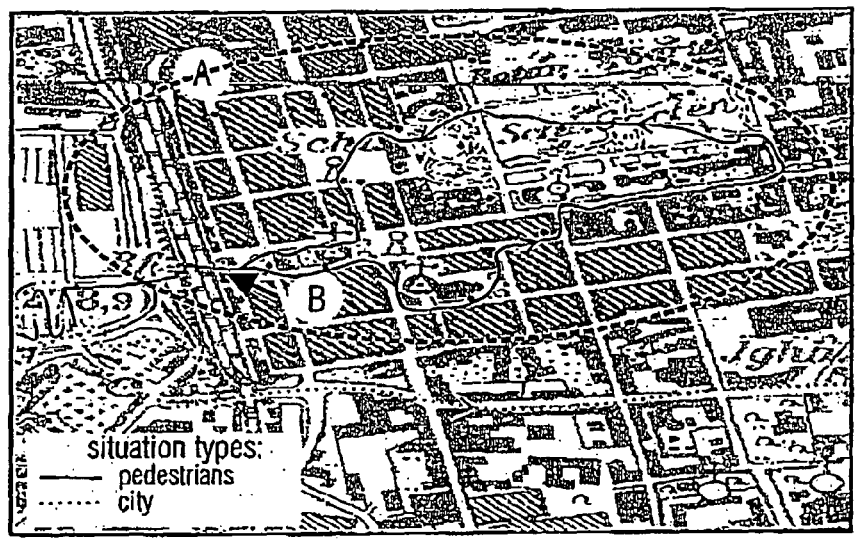
FIG. 75 is a situation-determination for the newly added situation type pedestrian.

In the following, the evaluation results for the newly introduced situation type pedestrian are introduced in two steps. In the first step, the dynamical situation determination for the situation type pedestrian is tested. Then, a consideration of the selection results is performed with the selection parameters specified for this situation. FIG. 75 gives an overview over the route and the detected situation types. Routes marked in red were detected as situation type city. The routes marked in brown represent the newly introduced situation type pedestrian. This figure shows a typical field of application, where the user uses the UMIS system both during driving in the car and when walking. In the presented case, the system has been continuously used, without performing a restart. The situation determination of the new situation type pedestrian has been performed, as described in 5.1.2, only based on the current speed. If the same was below 6 km/h, the situation type pedestrian has been selected immediately. The figure shows that the route walked on foot in the area A has been almost continuously detected correctly. Merely in the area B, a wrong situation type has been detected, since the user was in a pedestrian underpass and there was no GPS signal.

Figure 76:
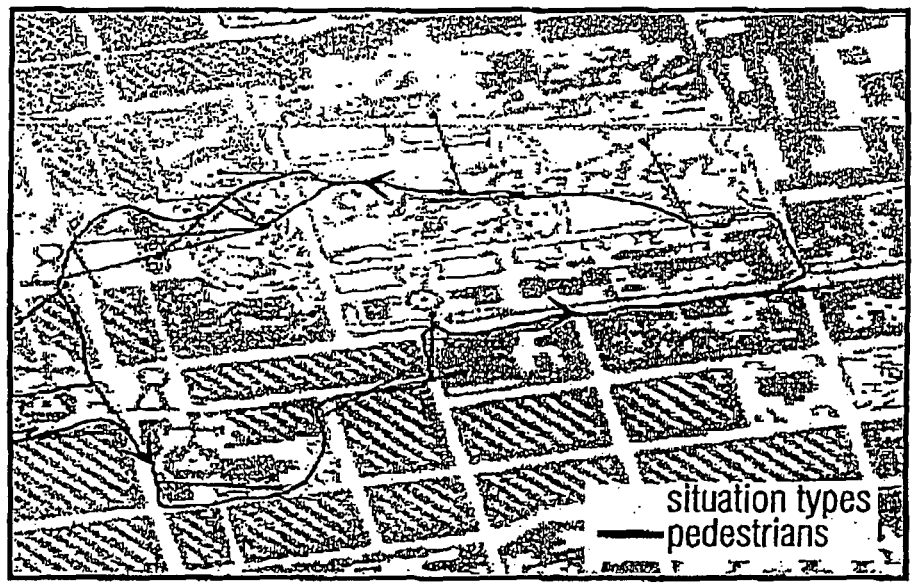
FIG. 76 is an object selection for the situation type pedestrian.

In the following, the selection results for the newly introduced situation type pedestrian are presented. FIG. 76 shows an overview over the selection results. The route covered during the test is illustrated in brown. The selection of an object is represented by selection lines in FIG. 76, which connect the object position to the position where the selection was made. The selected information objects were almost continuously in visibility range, due to the selection distances, which allowed a clear display of the information objects. At a speed below 2 km/h, the selection distance of the secondary selection area has been set to zero, because no reliable direction indication is possible. In these cases, the selection was only made based on the primary selection area, which in this case had a minimum selection distance of 50 meters. In this selection distance, in most cases, objects within the visibility range of the user were selected. From a speed of 2 km/h onwards, the selection distances had been increased to a maximum value of 100 meters. This maximum distance has been proven sufficient for the new situation type.

As the presented test results show, the introduction of the new situation type pedestrian has proven to be useful. In contrary to the previous method, the adaptation method extended by this situation type allows an almost continuously clear display of information objects when using the UMIS system as pedestrian.

In the previous geographical selection method, the particular structure and the geographical surroundings of information objects could not be considered. The information objects could only be described by their geographical position. Based on selected representative examples, it has been determined that a more differentiated consideration of the information objects is required to allow a specific and clear display of the different information objects. Thus, the concept of object-dependent relevance areas has been introduced above. This new concept allows the author of the information objects to individually define the geographical area wherein the object can be selected.

In this section, the evaluation results of the object-dependent relevance areas are presented, which are to confirm the effectivity and flexibility of the newly introduced concept. Thus, the following examples take up situations, that where problematical up to now, and show how a simple solution can be obtained by the specific definition of object-dependent relevance areas for individual problematic information objects.

A clear display of information objects is normally given when the displayed object is visible for the user. Object-dependent relevance areas can fulfill this requirement. With these, geographical areas can be defined, in which an object is visible and is to be displayed.

Figure 77:
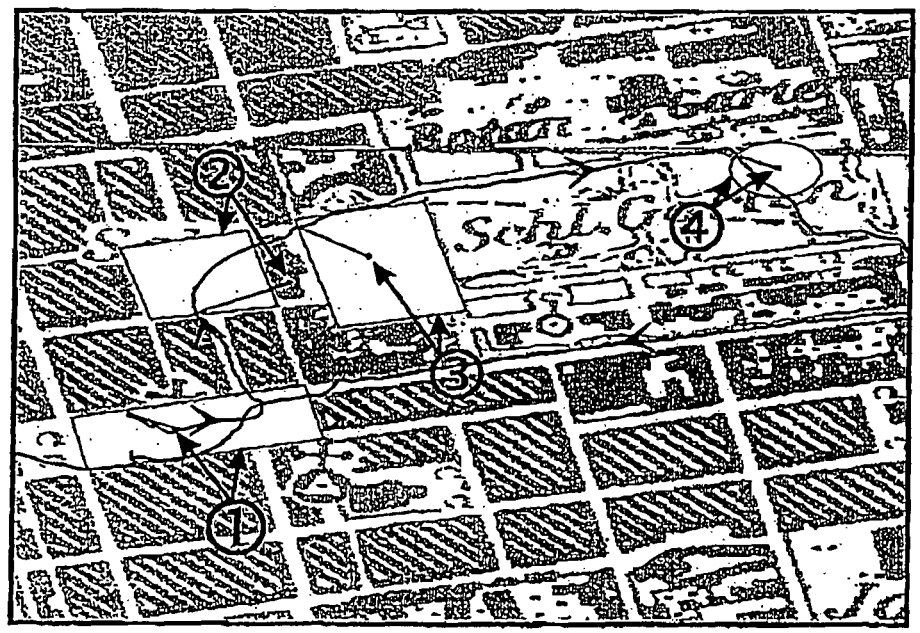
FIG. 77 is a selection of information objects with object-dependent relevance areas.

The aspect of visibility has also been underlying in the definition of object-dependent relevance areas of the four information objects in FIG. 77. Object and associated relevance area are provided with a number. The curve of the traveled test route is illustrated in dark brown. The test route begins in the relevance area of object 1, which has been selected immediately for display for that reason. In the further objects, a selection had taken place, as soon as the user entered the respective relevance area.

Object 2 is the castle of Erlangen, which is very well visible from the market place (relevance area 2). The objects 3 and 4 are the Hugenotten fountain and a small monument in the castle garden, which are also only well visible within the selected relevance areas. In the illustrated example, by describing the visibility areas, the objects have been visible for the user at the time of display. Thereby, a clear display could be obtained.

For a clear display of information objects, object-dependent selection distances are required, since for example the spatial dimensions of the objects can be very different. So far, an object could only be described by its geographical coordinates, which had the effect that the above-mentioned requirements could not be fulfilled. With the object-dependent relevance areas, different selection distances can be obtained by the definition of geographical display areas.

Figure 78:
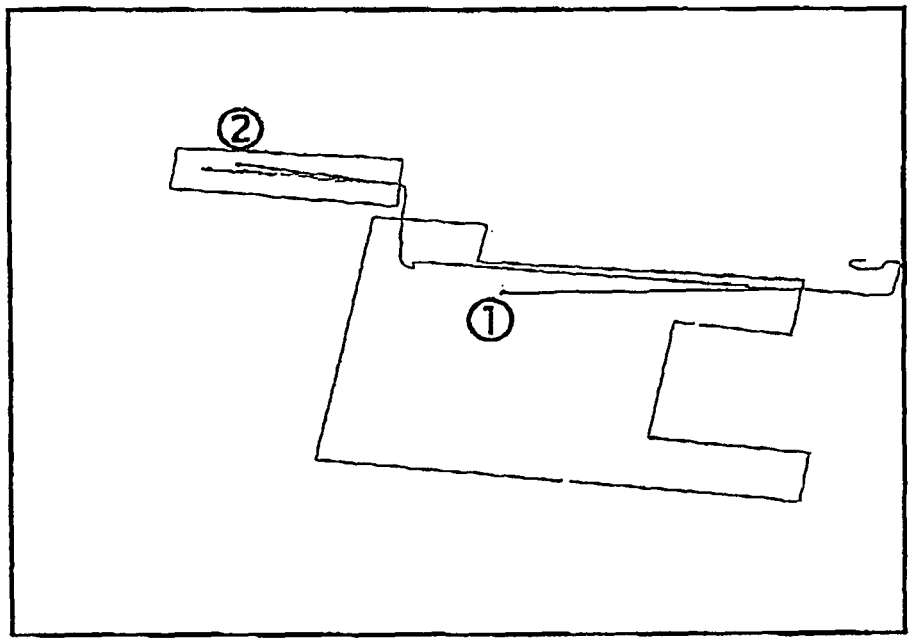
FIG. 78 is different selection distances for two information objects by defining object-dependent relevance areas.

The example in FIG. 78 shows two information objects, which have different selection distances due to a respective definition of their relevance areas. Object 1 has a large spatial extension and has thus been provided with a large relevance area by the author of the information object, to allow the selection from a large distance. Correspondingly, object 2 has been provided with a small relevance area due to its low spatial dimensions. The selection of the information objects took only place after entering the respective relevance areas. As can be seen in FIG. 78, the object 1 has been selected from a large distance. Object 2, however, was only selected in the immediate surroundings.

Figure 79:
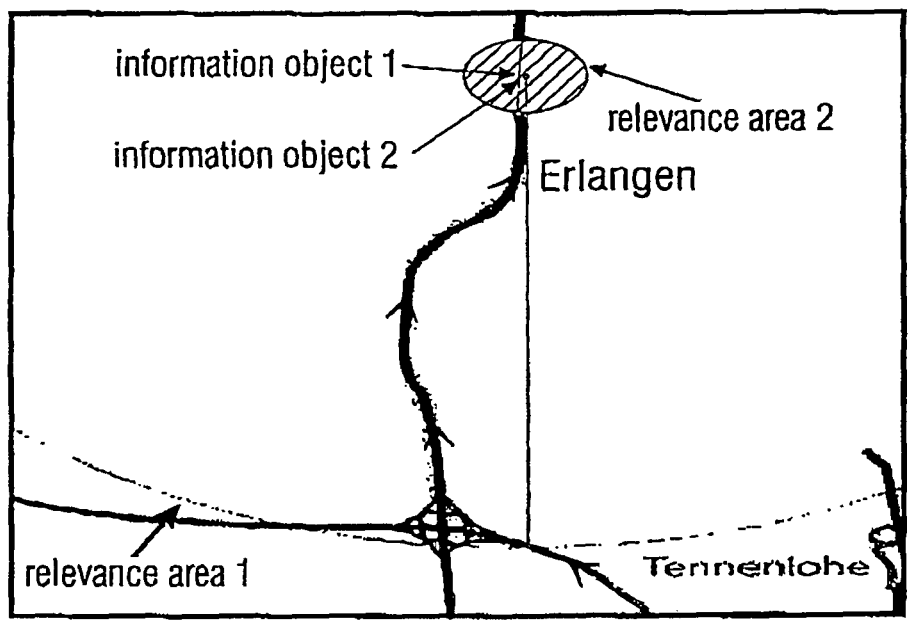
FIG. 79 is a distance-dependent selection of an information object for reproducing announcements with different degree of detail.

With the help of the object-dependent relevance areas, distance-dependent object descriptions can be displayed. This can be used, for example, to design the degree of detail of a display according to the distance. A detailed description is normally only useful for small selection distances, since only here a clear display is given. A distance-dependent object description can be obtained by creating several information objects with different display contents for a real object. By the object-dependent relevance area, an individual display area or an individual display distance, respectively, can be defined for every single information object. Two information objects describe the real object illustrated in FIG. 79. The same have different relevance areas and display contents. The information object 1 can already be selected from a large distance, while the information object 2 can only be displayed in the immediate vicinity.

In certain fields of application of UMIS, a direction-dependent object selection is required. An important field of usage of UMIS is the support of sightseeing tours along fixed pre-determined routes. Normally, the author wants to determine the order of the object displays for such routes.

Figure 80:
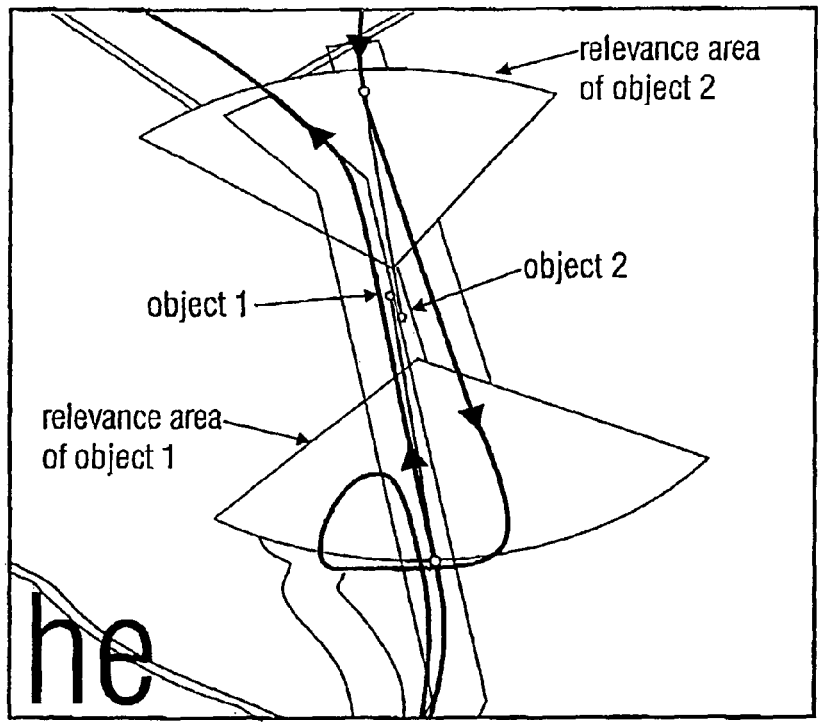
FIG. 80 is a direction-dependent selection of information objects.

So far, this could not be obtained by merely describing an information object based on its geographical coordinates. The following example describes how a direction-dependent selection order is obtained by combining the object-dependent relevance areas and the selection area of the user. FIG. 80 shows the solution of such a problem. Object 1 is to be selected when the user approaches from the South. Object 2 is to be displayed from the Northern direction. When driving from the southern direction, the user enters first the relevance area 1. At this time, object 1 and object 2 are in the selection area of the user. Both objects are equivalent with regard to their further selection parameters, with the exception of their geographical position and their relevance areas. For that reason, in the previous selection method, object 2 would have been selected due to its lower distance to the user. In the presented example, this object cannot be selected, since the user is not in his relevance area. Instead, object 1 is selected, since the user is within its relevance area. For the drive from the northern direction, the selection takes place in reverse order.

A further problem with the previous selection method was the specific announcement of regional information. These information have no fixed geographical position, but are relevant for a larger well-defined region. For that reason, regional information are only to be displayed when the user is within this area.

The previous realization as positioned or unpositioned object was not suitable for this type of information. While positioned objects were displayed in a spatially very limited area, the display of unpositioned objects was both temporally and locally undefined.

For that reason, the concept of unpositioned objects designed for such situations has been extended. They can now be specifically limited in their "validity" to a certain region by indicating an object-dependent relevance area, without having to indicate an exact position.

Figure 81:
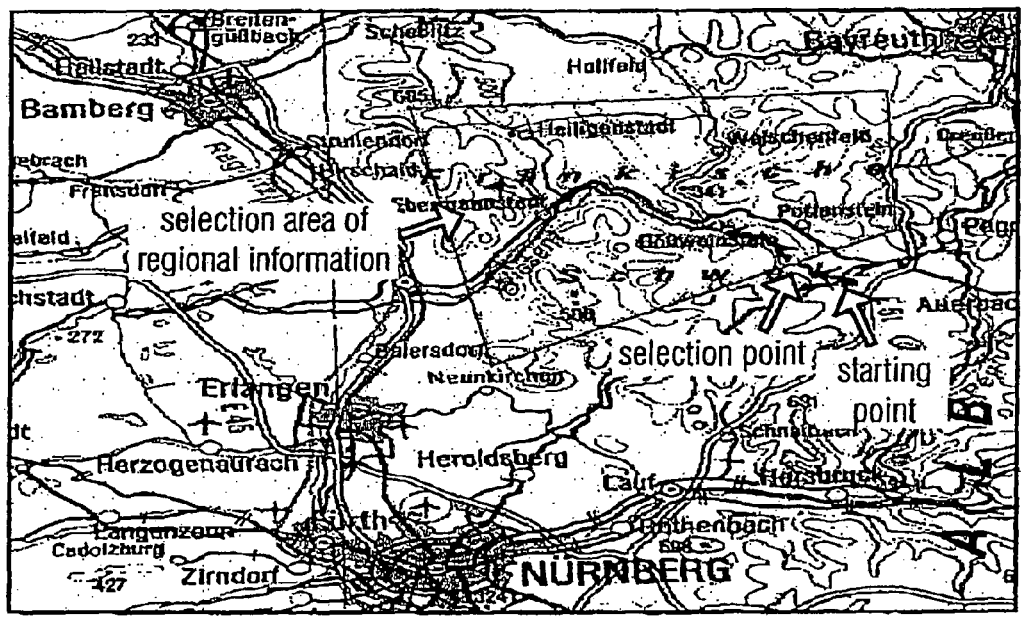
FIG. 81 is a region information for the area of the "Fränkische Schweiz" ("Franconian Switzerland").

The following example takes up the problem again. Regional information is to be created for the area of Fränkische Schweiz. Therefore, an unpositioned information object is generated with the relevance area provided in FIG. 81.

As can be seen in the figure, the regional information was displayed after entering the relevance area. Thus, the regional information allows the creation and usage of a totally new type of information objects.

Depending on the situation, the inventive methods can be implemented in hardware or in software. The implementation can be made on a digital memory media, particularly a disc or CD with electronically readable control signals, which can cooperate with a programmable computer system, such that the respective method is performed. Thus, generally, the invention consists also in a computer program product with a program code stored on a machine-readable carrier for performing at least one of the inventive methods when the computer program product runs on a computer. In other words, the invention can be realized as computer program with a program code for performing the method when the computer program runs on a computer.

While this invention has been described in terms of several preferred embodiments, there are alterations, permutations, and equivalents, which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A mobile information terminal having a processor and a memory, comprising:
    a provider for providing a data structure having entries about different objects, wherein a limited geographical area is associated to every object, and wherein object information is associated to every object, and wherein the limited geographical area defines an individual object-related relevance area, in which the mobile information terminal has to be so that the object information to which the relevance area belongs can be selected, wherein the object-related relevance area is defined by an angle area or by a segment of a circle or by a polygon or by a Boolean combination of geometrical forms;
    a determiner for determining a geographical position of the mobile information terminal;
    an examiner for examining whether the geographical position of the mobile information terminal lies in the geographical area associated to an object; and
    a provider for providing object information associated to an object, if the examiner has determined that the mobile information terminal lies in the geographical area of the object.

2. The mobile information terminal according to claim 1, wherein a geographical area associated to an object depends on a topology of the surroundings where the object is located.

3. The mobile information terminal according to claim 1, wherein a geographical area associated to an object depends on a topology of the surroundings where the object is located and on a geographical area associated to a further object.

4. The mobile information terminal according to claim 1, wherein an object attribute is associated to a geographical area associated to an object.

5. The mobile information terminal according to claim 4, wherein the object attribute comprises a selectable object relevance, wherein the selectable object relevance indicates a relevance of the object for a user of the mobile information terminal.

6. The mobile information terminal according to claim 1, wherein a geographical area comprises a plurality of subobject areas, which are at different distances to the object, wherein different information is associated to every subobject area.

7. The mobile information terminal according to claim 1, wherein the determiner for determining the geographical position comprises a GPS receiver.

8. The mobile information terminal according to claim 1, wherein the determiner for determining the geographical position is implemented to determine a speed of the mobile information terminal, and wherein the examiner is implemented to determine that the mobile information terminal lies in the geographical area, when the mobile information terminal is in the geographical area within a predetermined time interval.

9. The mobile information terminal according to claim 1, wherein the determiner for determining the geographical position is implemented to detect a speed direction of the mobile information terminal, and wherein the examiner is implemented to determine that the mobile information terminal lies in the geographical area, when the object lies within an angle area, determined by a selection angle relative to the driving direction, and to determine that the mobile information terminal lies outside the geographical area when the object lies outside the angle area.

10. The mobile information terminal according to claim 9, wherein the provider for providing the data structure is implemented to indicate object information in dependence on a speed or a speed direction of the mobile information terminal.

11. The mobile information terminal according to claim 1, wherein the determiner for determining the geographical position is implemented to detect a speed direction of the mobile information terminal, and wherein the examiner is implemented to determine that the mobile information terminal lies in the geographical area, when the object is located in front of the mobile information terminal, or to determine that the mobile information terminal does not lie in the geographical area, when the object is behind the mobile information terminal.

12. The mobile information terminal according to claim 1, wherein a geographical area is defined by a Boolean operation of geometrical forms.

13. A method for information selection implemented with a processor and a memory, comprising the steps of:
    providing a data structure having entries about different objects, wherein a limited geographical area is associated to every object, and wherein object information is associated to every object, and wherein the limited geographical area defines an individual, object-related relevance area, in which the mobile information terminal has to be so that the object information to which the relevance area belongs can be selected, wherein the object-related relevance area is defined by an angle area or by a segment of a circle or by a polygon or by a Boolean combination of geometrical forms;
    determining a geographical position of the mobile information terminal;
    examining whether the geographical position of the mobile information terminal lies in the geographical area associated to an object; and
    providing object information associated to an object if it has been determined that the mobile information terminal lies in the geographical area of the object.

14. A non-transitory computer readable medium having stored thereon a computer program comprising program code for performing, when running on a computer, a method for information selection, comprising:
    providing a data structure having entries about different objects, wherein a limited geographical area is associated to every object, and wherein object information is associated to every object, and wherein the limited geographical area defines an individual, object-related relevance area, in which a mobile information terminal has to be so that the object information to which the relevance area belongs can be selected, wherein the object-related relevance area is defined by an angle area or by a segment of a circle or by a polygon or by a Boolean combination of geometrical forms;

determining a geographical position of the mobile information terminal;

examining whether the geographical position of the information point mobile information terminal lies in the geographical area associated to an object; and providing object information associated to an object if it has been determined that the mobile information terminal lies in the geographical area of the object.

\* \* \* \* \*

UNITED STATES PATENT AND TRADEMARK OFFICE
CERTIFICATE OF CORRECTION

PATENT NO. : 8,949,284 B2
APPLICATION NO. : 11/724993
DATED : February 3, 2015
INVENTOR(S) : Alexander Zink et al.

Page 1 of 1

It is certified that error appears in the above-identified patent and that said Letters Patent is hereby corrected as shown below:

Title page item (73) Assignee: "Fraunhofer-Gesellschaft zur Foerderung der Angewandten Forschung E.V." should read --Fraunhofer-Gesellschaft zur Foerderung der angewandten Forschung e.V.--

Signed and Sealed this
Second Day of August, 2016

Michelle K. Lee
*Director of the United States Patent and Trademark Office*